US012574677B2

(12) United States Patent
Zhou et al.

(10) Patent No.: US 12,574,677 B2
(45) Date of Patent: Mar. 10, 2026

(54) SENSOR DEVICES WITH LIQUID-FILLED CAVITY AND AIR CAVITY

(71) Applicant: SHENZHEN SHOKZ CO., LTD., Shenzhen (CN)

(72) Inventors: Wenbing Zhou, Shenzhen (CN); Wenjun Deng, Shenzhen (CN); Yongshuai Yuan, Shenzhen (CN); Yujia Huang, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 249 days.

(21) Appl. No.: 18/344,905

(22) Filed: Jun. 30, 2023

(65) Prior Publication Data

US 2023/0353932 A1    Nov. 2, 2023

Related U.S. Application Data

(63) Continuation of application No. PCT/CN2022/088558, filed on Apr. 22, 2022.

(30) Foreign Application Priority Data

Apr. 23, 2021    (CN) .......................... 202110445739.3

(51) Int. Cl.
H04R 1/20    (2006.01)
G01H 11/08    (2006.01)
(Continued)

(52) U.S. Cl.
CPC .............. H04R 1/222 (2013.01); G01H 11/08 (2013.01); G01N 29/036 (2013.01);
(Continued)

(58) Field of Classification Search
CPC . H04R 1/222; H04R 1/08; H04R 1/20; H04R 17/02; H04R 17/10; H04R 19/04;
(Continued)

(56) References Cited

U.S. PATENT DOCUMENTS 5,146,435 A       9/1992   Bernstein
2013/0303835 A1   11/2013  Koskowich
(Continued)

FOREIGN PATENT DOCUMENTS

CN        107995570 A    5/2018
CN        109005492 A    12/2018
(Continued)

OTHER PUBLICATIONS

International Search Report in PCT/CN2022/088558 mailed on Jul. 21, 2022, 7 pages.

*Primary Examiner* — Mark Fischer
(74) *Attorney, Agent, or Firm* — METIS IP LLC

(57) ABSTRACT

One of the embodiments of the present disclosure provides a sensor device, including: a housing and a transducer unit, wherein the housing has an accommodating cavity inside, the transducer unit includes a vibration pickup structure configured to pick up a vibration of the housing and produce an electrical signal, and the transducer unit in the accommodating cavity separates the accommodating cavity to form a front cavity and a rear cavity on opposite sides of the vibration pickup structure. At least one cavity of the front cavity and the rear cavity is filled with liquid, the liquid is in contact with the vibration pickup structure, and an air cavity is formed between the liquid and the housing.

18 Claims, 34 Drawing Sheets

2500

(51) Int. Cl.

| | |
|---|---|
| *G01N 29/036* | (2006.01) |
| *G01N 29/24* | (2006.01) |
| *G01P 1/02* | (2006.01) |
| *H04R 1/08* | (2006.01) |
| *H04R 1/22* | (2006.01) |
| *H04R 17/02* | (2006.01) |
| *H04R 17/10* | (2006.01) |
| *H04R 19/04* | (2006.01) |

(52) U.S. Cl.
CPC ..... *G01N 29/2406* (2013.01); *G01N 29/2437* (2013.01); *G01P 1/023* (2013.01); *H04R 1/08* (2013.01); *H04R 1/20* (2013.01); *H04R 17/02* (2013.01); *H04R 17/10* (2013.01); *H04R 19/04* (2013.01); *G01N 2291/014* (2013.01); *G01N 2291/022* (2013.01)

(58) Field of Classification Search
CPC .. G01H 11/08; G01N 29/036; G01N 29/2406; G01N 29/2437; G01N 2291/014; G01N 2291/022; G01P 1/023
See application file for complete search history.

(56) References Cited

U.S. PATENT DOCUMENTS

| | | | | |
|---|---|---|---|---|
| 2014/0254850 | A1* | 9/2014 | Elian | H04R 17/025 |
| | | | | 381/355 |
| 2015/0126805 | A1 | 5/2015 | Miller | |
| 2015/0350792 | A1* | 12/2015 | Grosh | H10N 30/50 |
| | | | | 257/416 |
| 2016/0052246 | A1* | 2/2016 | Egger | B32B 27/288 |
| | | | | 381/426 |
| 2016/0299026 | A1 | 10/2016 | De Jong et al. | |
| 2017/0089943 | A1 | 3/2017 | Chen et al. | |
| 2017/0280218 | A1 | 9/2017 | Wang et al. | |
| 2017/0289702 | A1* | 10/2017 | Inoue | H04R 31/00 |
| 2020/0037069 | A1 | 1/2020 | Park et al. | |
| 2021/0099793 | A1 | 4/2021 | Shams et al. | |
| 2023/0020424 | A1 | 1/2023 | Zhao | |

FOREIGN PATENT DOCUMENTS

| | | |
|---|---|---|
| CN | 111970615 A | 11/2020 |
| GB | 1546521 A | 5/1979 |
| WO | 2021143084 A1 | 7/2021 |

* cited by examiner

SENSOR DEVICES WITH LIQUID-FILLED CAVITY AND AIR CAVITY

CROSS REFERENCE TO RELATED APPLICATIONS

The present disclosure is a Continuation of International Application No. PCT/CN2022/088558 filed on Apr. 22, 2022, which claims priority to Chinese patent application No. 202110445739.3 filed on Apr. 23, 2021, the entire contents of each of which are incorporated herein by reference.

TECHNICAL FIELD

The present disclosure relates to electronic devices, and in particular to sensor devices.

BACKGROUND

For a sensor device (e.g., a microphone), when a frequency of an external vibration signal is close to its intrinsic resonant frequency, a relatively large amplitude can be produced, thereby outputting a relatively large electrical signal. Therefore, a response of the sensor device to the external vibration may exhibit a higher sensitivity near the resonant frequency and a lower sensitivity at other frequencies (e.g., mid-to-low frequencies), causing a non-flat output gain of the sensor device.

Therefore, it is desirable to provide a sensor device with a flat output gain and a high sensitivity within a wider frequency range.

SUMMARY

According to one of the embodiments of the present disclosure, a sensor device is provided, including: a housing and a transducer unit. The housing has an accommodating cavity inside, the transducer unit includes a vibration pickup structure configured to pick up a vibration of the housing and produce an electrical signal, the transducer unit in the accommodating cavity separates the accommodating cavity to form a front cavity and a rear cavity located on opposite sides of the vibration pickup structure. At least one cavity of the front cavity and the rear cavity is filled with liquid, the liquid is in contact with the vibration pickup structure, and an air cavity is formed between the liquid and the housing.

In some embodiments, a gas-liquid interface may be formed between the liquid and the air cavity.

In some embodiments, a first flexible membrane may be provided between the liquid and the air cavity.

In some embodiments, the first flexible membrane may be provided with a mass block.

In some embodiments, the transducer unit may include a piezoelectric transducer, and the piezoelectric transducer may include at least a piezoelectric membrane or a piezoelectric beam.

In some embodiments, the piezoelectric transducer may include a plurality of piezoelectric beams, a gap is formed between two adjacent piezoelectric beams in the plurality of piezoelectric beams, and a location where the gap is located is provided with a filling component.

In some embodiments, the filling component may be arranged at least at one location of the gap of the piezoelectric beam, an upper surface of the piezoelectric beam, or a lower surface of the piezoelectric beam, and a stiffness of the filling component is lower than a stiffness of any one of the plurality of piezoelectric beams.

In some embodiments, the piezoelectric transducer may include a plurality of piezoelectric beams, and a gap between two adjacent piezoelectric beams in the plurality of piezoelectric beams is not greater than 20 μm.

In some embodiments, the vibration pickup structure may include a plurality of piezoelectric beams and a vibrating membrane, the vibrating membrane covers surfaces of the plurality of piezoelectric beams to prevent the liquid from passing through the transducer unit.

In some embodiments, the plurality of piezoelectric beams may vibrate to produce resonant peaks of different frequencies.

In some embodiments, the transducer unit includes a capacitive transducer, and the capacitive transducer at least includes a perforated backplate and a vibrating electrode membrane.

In some embodiments, the liquid may be capable of permeating into a space between the perforated backplate and the vibrating electrode membrane through holes on the perforated backplate.

In some embodiments, an air domain may be formed between the perforated backplate and the vibrating electrode membrane.

In some embodiments, the housing may further have a gas cavity, one cavity of the front cavity and the rear cavity is filled with liquid, and the gas cavity is communicated with another cavity of the front cavity and the rear cavity that is not filled with the liquid.

In some embodiments, a porous medium material or a metamaterial may be provided in the gas cavity.

In some embodiments, one cavity of the front cavity and the rear cavity is filled with liquid, and an air hole is provided on a portion of the housing corresponding to another cavity of the front cavity and the rear cavity that is not filled with the liquid.

In some embodiments, the air holes may be covered with a second flexible membrane.

In some embodiments, a ratio of a projected area of the liquid in a vibration direction of the vibration pickup structure to a projected area of the vibration pickup structure in the vibration direction may be within a range of 1 to 30.

In some embodiments, a ratio of a filling size of the liquid in at least one cavity of the front cavity and the rear cavity in the vibration direction of the vibration pickup structure to a size of the transducer unit in the vibration direction may be not less than 0.5.

According to one embodiment of the present disclosure, a microphone is provided, and the microphone include the above sensor device.

A portion of additional features of the present disclosure may be illustrated in the following description. A portion of the additional features of the present disclosure will be apparent to those skilled in the art from a study of the following description and corresponding accompanying drawings or from an understanding of production or operation of the embodiments. The features of the present disclosure may be realized and achieved by practicing or using aspects of the methods, tools, and combinations discussed in detail in the examples below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, where like reference numerals represent similar structures throughout the several views of the drawings, and wherein:

FIGS. 25B-25D are schematic diagrams illustrating structures of exemplary sensor devices according to some embodiments of the present disclosure;

DETAILED DESCRIPTION

Figure 1:
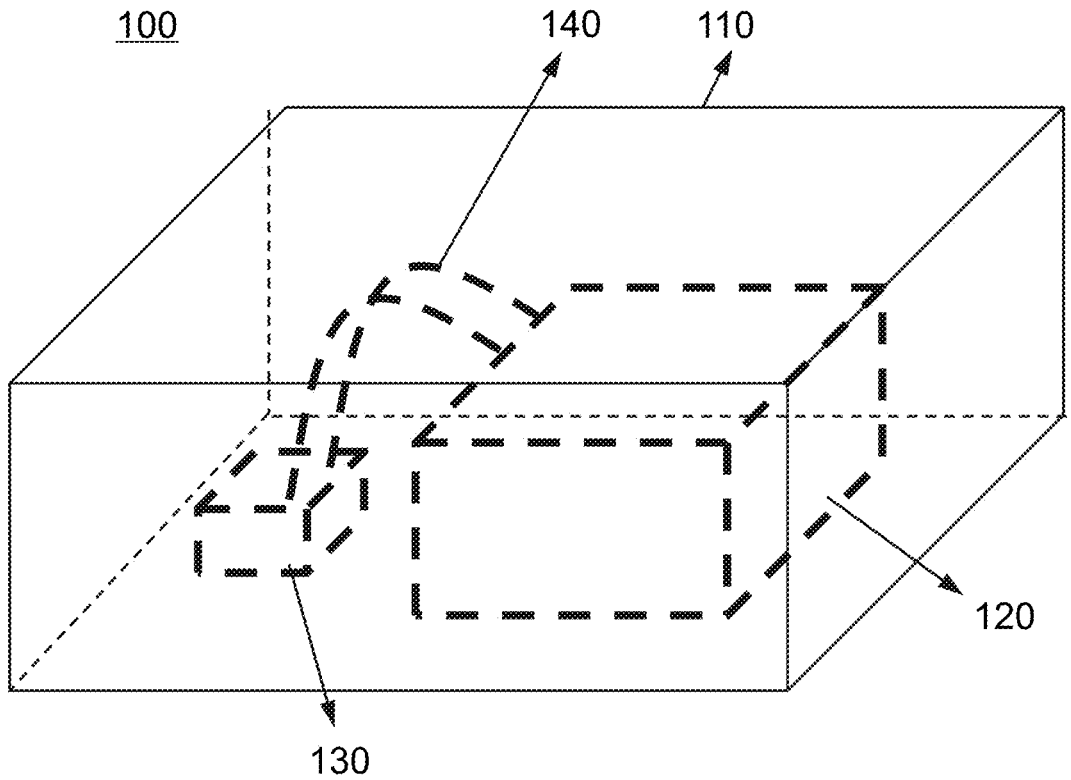
FIG. 1 is a schematic diagram illustrating an exemplary sensor device according to some embodiments of the present disclosure.

In order to illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without further creative efforts, may apply the present disclosure to other similar scenarios according to these drawings. Unless apparent from the locale or otherwise stated, like reference numerals represent similar structures or operations throughout the several views of the drawings.

It will be understood that the term "system," "device," "unit," and/or "module" used herein are one method to distinguish different components, elements, parts, sections, or assemblies of different levels in ascending order. However, the terms may be displaced by another expression if they achieve the same purpose.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

In the description of the present disclosure, it is to be understood that the terms "first," "second," "third," and "fourth" are merely used for purposes of description and are not to be understood as indicating or implying relative importance or implicitly specifying the count of technical features indicated. Therefore, the features qualified with "first," "second," "third," and "fourth" may expressly or implicitly include at least one such feature. Unless apparent from the locale or otherwise stated, "plurality" means at least two, e.g., two, three, etc., in the description of the present disclosure.

In the present disclosure, unless otherwise expressly specified and limited, the terms "connection," "fixed," etc., shall be understood in a broad sense. For example, the term "connection" may refer to a fixed connection, a detachable connection, or an integral part; a mechanical connection, or an electrical connection; a direct connection, or an indirect connection through an intermediate medium; a connection within two components or an interaction between two components, unless otherwise expressly limited. Those skilled in the art may understand the specific meaning of the above terms in the present disclosure based on specific situations.

Embodiments of the present disclosure provide a sensor device. The sensor device may convert an external signal (e.g., an acoustic signal, a vibration signal, a pressure signal) into a target signal (e.g., an electrical signal). The sensor device may include a housing and a transducer unit. The housing has an accommodating cavity inside, and the transducer unit includes a vibration pickup structure configured to pick up a vibration of the housing to produce an electrical signal. The transducer unit in the accommodating cavity may separate the accommodating cavity to form a front cavity and a rear cavity located on opposite sides of the vibration pickup structure. At least one cavity of the front cavity and the rear cavity is filled with liquid, and the liquid is in contact with the vibration pickup structure.

In some embodiments, the vibration pickup structure may have a resonant frequency (e.g., a first resonant frequency), and the resonant frequency is related to a property of the vibration pickup structure (e.g., a shape, a material, a structure, etc.). In some embodiments, an air cavity may exist in the front cavity and/or the rear cavity filled with the liquid. A volume of the air cavity may change as the liquid vibrates. The combined action of the liquid and/or the air cavity in the front cavity and/or the rear cavity may affect a response of the sensor device to the external signal, which may form an additional resonant system that provides the sensor device with an additional resonant frequency (e.g., a second resonant frequency), thereby causing a frequency response curve of the sensor device flatter. In some embodiments, the air cavity may exist inside the liquid (e.g., in a form of a bubble). In some embodiments, in order to facilitate the preparation of the sensor device and to improve the stability of the sensor device, the air cavity may be located between the liquid and the housing. Further, a first flexible membrane may be provided between the liquid and the air cavity.

In some embodiments, when only one cavity of the front cavity and the rear cavity is filled with the liquid, the resonant frequency (e.g., the first resonant frequency) of the sensor device may be adjusted by adjusting the equivalent stiffness of gas in another cavity that is not filled with liquid. For example, an equivalent stiffness of the gas in the another cavity that is not filled with liquid may be reduced by providing an air hole in a location of the housing corresponding to the cavity, thereby shifting the resonant frequency of the vibration pickup structure (i.e., the first resonant frequency) and/or an additional resonant peak of the additional resonant system to a lower frequency. As another example, the equivalent stiffness of gas in the another cavity that is not filled with liquid may be changed by changing an air pressure of the gas, thereby adjusting the location of a first resonant peak and/or the additional resonant peak. As another example, the location of the first resonant peak and/or the additional resonant peak may be adjusted by changing a size of the another cavity that is not filled with liquid.

In this way, a relationship between the first resonant frequency and the second resonant frequency may be changed by adjusting one or more parameters (e.g., the size of the air cavity, the mass of the liquid, the viscosity of the liquid, etc.) of the vibration pickup structure and/or the additional resonant system, thereby achieving a purpose of, for example, increasing the sensitivity or reliability of the sensor device within a relatively wide frequency range (especially in a mid-to-low frequency range), or making an output gain of the sensor device in a required frequency band (e.g., a mid-to-low frequency range) flatter.

FIG. 1 is a schematic diagram illustrating an exemplary sensor device according to some embodiments of the present disclosure.

A sensor device 100 may produce deformation and/or displacement based on an external signal, such as a mechanical signal (e.g., pressure, mechanical vibration), an acoustic signal (e.g., sound waves), an electrical signal, an optical signal, a thermal signal, etc. The deformation and/or the displacement may be further converted to a target signal by a transducer component of the sensor device 100. In some embodiments, the target signal may be an electrical signal, a mechanical signal (e.g., mechanical vibration), an acoustic signal (e.g., sound waves), an optical signal, a thermal signal, etc. In some embodiments, the sensor device 100 may be a microphone (e.g., an air-conduction microphone or a bone-conduction microphone), a speaker (e.g., an air-conduction speaker or a bone-conduction speaker), an accelerometer, a pressure sensor, a hydrophone, an energy harvester, a gyroscope, etc. The air-conduction microphone or the air-conduction speaker is a microphone or a speaker where sound waves are conducted through the air. The bone-conduction microphone or the bone-conduction speaker is a microphone or a speaker where the sound waves are conducted through a solid (e.g., bone) in a form of a mechanical vibration.

Exemplarily, as shown in FIG. 1, the sensor device 100 may include a housing 110, a transducer unit 120, and a processing circuit 130 (e.g., an integrated circuit (IC)).

The housing 110 may be a regular or irregular three-dimensional structure with an internal accommodating cavity (i.e., a hollow portion). For example, the housing 110 may be a hollow frame structural body includes, but is not limited to, a regular shape such as a rectangular frame, a circular frame, a square polygon frame, and any irregular shape. The housing 110 may be used to accommodate the transducer unit 120 and/or the processing circuit 130. In some embodiments, the housing 110 may adopt one or more packaging techniques such as plastic packaging, metal packaging, etc. In some embodiments, the housing 110 may contain one or more of gas, liquid, solid, etc., in the accommodating cavity. In some embodiments, the accommodating cavity may also include a vacuum structure.

The transducer unit 120 may be located in the accommodating cavity of the housing 110 or at least partially suspended in the accommodating cavity of the housing 110. The transducer unit 120 may be used to convert the external signal to the target signal. Taking the bone-conduction microphone (also called a vibration sensor device), as an example, the external signal is a mechanical vibration signal and the target signal is an electrical signal. The transducer unit 120 may include a vibration pickup structure. The vibration pickup structure may be flexible. For example, the vibration pickup structure may be a vibrating rod (e.g., a cantilever beam), a vibrating membrane, a vibration block, etc. The vibration pickup structure may produce the deformation and/or the displacement in response to the mechanical vibration signal. The transducer unit 120 may convert the deformation and/or the displacement into the target signal (e.g., an electrical signal). In some embodiments, the transducer unit 120 may include a piezoelectric transducer, an acoustic transducer, an electromagnetic transducer, a capacitive transducer, etc. In some embodiments, the transducer unit 120 may be electrically connected to the processing circuit 130 through one or more leads 140.

The processing circuit 130 may be configured to process data and/or signals. In some embodiments, the processing circuit 130 may include one or more of a bipolar integrated circuit (e.g., a logic gate circuit, an emitter coupled logic circuit, etc.), a unipolar integrated circuit (e.g., a field effect tube integrated circuit, an n-channel field effect tube integrated circuit, etc.), and the like.

In some embodiments, the processing circuit 130 may be located in the accommodating cavity of the housing 110 or at least partially suspended in the accommodating cavity of the housing 110. In some embodiments, the processing circuit 130 may also be located outside of the accommodating cavity of the housing 110. For example, the processing circuit 130 may be located on an outer surface of the housing 110 and communicated with the transducer unit 120 through leads. In some embodiments, the processing circuit 130 may process the target signal. Continuously taking the bone-conduction microphone as an example, the processing circuit 130 may convert the target signal to voice data or send the target signal or the voice data corresponding to the target signal to a cloud and/or other terminal devices. In some embodiments, the transducer unit 120 and the processing circuit 130 may be arranged in a side-by-side arrangement (as shown in FIG. 1), a top and bottom arrangement, or internally integrated.

In some embodiments, the sensor device 100 may also include the lead(s) 140. The lead(s) 140 may be used for signal communication between the transducer unit 120 and the processing circuit 130. For example, the lead(s) 140 may transmit the target signal or other signals (e.g., a configuration instruction, a collection instruction, etc.). In some embodiments, the lead(s) 140 may not be necessary and its function may be achieved by other manners of communication. For example, the transducer unit 120 and the processing circuit 130 may be arranged stacked up and down, and the transducer unit 120 and the processing circuit 130 can transmit data by directly contacting their ports to replace the function of the lead(s) 140.

Figure 2:
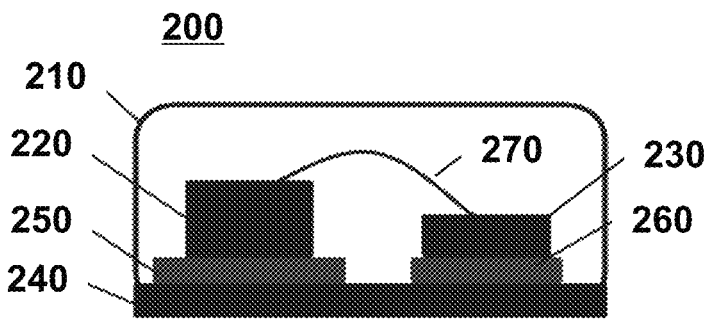
FIG. 2 is a schematic diagram illustrating a structure of an exemplary microphone according to some embodiments of the present disclosure.

FIG. 2 is a schematic diagram illustrating a structure of an exemplary microphone according to some embodiments of the present disclosure.

As shown in FIG. 2, a microphone 200 may include a housing 210, a transducer unit 220, a processing circuit 230, and a printed circuit board (PCB) 240.

The PCB 240 may be a phenolic PCB paper substrate, a composite PCB substrate, a glass fiber PCB substrate, a metal PCB substrate, a laminate multilayer PCB substrate, etc. In some embodiments, the PCB 240 may be an FR-4 grade fiberglass PCB substrate made of epoxy fiberglass cloth. The PCB 240 may be provided (e.g., by laser etching, chemical etching, etc.) with a circuit and other components of the microphone 200. In some embodiments, the PCB 240 may also be a flexible printed circuit board (FPC). In some embodiments, the transducer unit 220 and the processing circuit 230 are fixedly connected to the PCB 240 through a transducer unit fixing adhesive 250 and a processing circuit fixing adhesive 260, respectively. In some embodiments, the transducer unit fixing adhesive 250 and/or the processing circuit fixing adhesive 260 may be a conductive adhesive (e.g., a conductive silver adhesive, a copper powder conductive adhesive, a nickel-carbon conductive adhesive, a silver-copper conductive adhesive, etc.). The conductive adhesive may be a conductive glue, a conductive adhesive film, a conductive adhesive ring, a conductive adhesive tape, etc. The transducer unit 220 and/or the processing circuit 230 are electrically connected to other components through circuits arranged on the PCB 240, respectively. The transducer unit 220 and the processing circuit 230 may be directly connected to each other through a wire 270 (e.g., a gold wire, a copper wire, an aluminum wire, etc.).

The housing 210 may be a regular or irregular three-dimensional structure with an internal cavity (i.e., a hollow portion). For example, the housing 210 may be a hollow frame structural body includes, but is not limited to, a regular shape such as a rectangular frame, a circular frame, a square polygon frame, and any irregular shape. The housing 210 is provided over the PCB 240 to seal the transducer unit 220, the processing circuit 230, and the PCB 240 and the circuit and other components provided thereon. The housing 210 may be made of metal (e.g., stainless steel, copper, etc.), plastic (e.g., polyethylene (PE), polypropylene (PP), polyvinyl chloride (PVC), polystyrene (PS), and acrylonitrile-butadiene-styrene co-polymer (ABS), etc.), composite materials (e.g., metal matrix composites or non-metal matrix composites), etc. In some embodiments, the material used for the housing 210 is brass.

The transducer unit 220 may convert an external vibration signal into an electrical signal. Taking a bone-conduction microphone as an example, the transducer unit 220 may include a substrate structure, a layered structure (i.e., a vibration pickup structure), and at least one damping structure layer. In some embodiments, the substrate structure and the layered structure may be located in the housing 210 of the bone-conduction microphone. The substrate structure is fixedly connected to an inner wall of the housing 210 and the layered structure is carried on the substrate structure. In some embodiments, at least a portion of the layered structure is physically connected to the substrate structure. The term "physically connected" in the present disclosure may be understood as a connection between different parts of the same structure, or after preparing different parts or structures separately, each separate part or structure is fixedly connected by welding, riveting, clamping, bolting, adhesive bonding, etc., or during a process of preparation, a first component or structure is deposited on a second component or structure through a manner of physical deposition (e.g., physical vapor deposition) or chemical deposition (e.g., chemical vapor deposition). In some embodiments, at least a portion of the layered structure may be fixed to an upper surface or a lower surface of the substrate structure, and at least a portion of the layered structure may also be fixed to a sidewall of the substrate structure. For example, the layered structure may be a cantilever beam, which may be a plate-like structure, one end of the cantilever beam may be connected to the upper surface, the lower surface, or a sidewall of the substrate structure where the cavity of the substrate structure is located, and the other end of the cantilever beam may not be connected to or in contact with the substrate structure, such that the other end of the cantilever beam is suspend in the cavity of the substrate structure. As another example, the bone-conduction microphone may include a vibrating membrane layer (also referred to as a suspended membrane structure), the suspended membrane structure is fixedly connected to the substrate structure, and the layered structure is provided on the upper surface or the lower surface of the suspended membrane structure. As another example, the layered structure may include a mass element and one or more supporting arms. The mass element is fixedly connected to the substrate structure by the one or more supporting arms, one end of the supporting arms is connected to the substrate structure, and another end of the supporting arms is connected to the mass element, such that a portion of the mass element and a portion of the supporting arms are suspended in the cavity of the substrate structure. It should be noted that "located in the cavity" or "suspended in the cavity" in the present disclosure may mean suspended in the interior, lower part, or above the cavity.

In some embodiments, the layered structure may include a vibration unit and a signal conversion unit (which may also be referred to as an acoustic transducer unit). The vibration unit is a portion of the layered structure that is susceptible to deformation by an external force, and the vibration unit may be used to transmit the deformation caused by the external force to the signal conversion unit. The signal conversion unit is a portion of the layered structure that converts the deformation of the vibration unit into an electrical signal. In some embodiments, the substrate structure may produce the vibration based on the external vibration signal, and the vibration unit deforms in response to the vibration of the substrate structure. The signal conversion unit produces the electrical signal based on the deformation of the vibration unit. It should be noted that the description of the vibration unit and the signal conversion unit herein are merely provided for the purpose of facilitating an introduction of the working principle of the layered structure, and does not limit an actual combination and the structure of the layered structure. In some embodiments, the vibration unit may not be necessary and its function may be fully implemented by the signal conversion unit. The signal conversion unit may produce the electrical signal directly in response to the vibration of the substrate structure. For example, the signal conversion unit may be a piezoelectric cantilever beam.

In some embodiments, the vibration unit and the signal conversion unit overlap to form the layered structure. The signal conversion unit may be located on an upper layer of the vibration unit, or the signal conversion unit may be located on a lower layer of the vibration unit.

In some embodiments, the signal conversion unit may include at least two electrode layers (e.g., a first electrode layer and a second electrode layer) and a piezoelectric layer. The piezoelectric layer may be located between the first electrode layer and the second electrode layer. The piezoelectric layer refers a structure that can produce a voltage at its two side surfaces when subjected to an external force. In some embodiments, the piezoelectric layer may produce the voltage in response to the deformation stress of the vibrating unit, and the first electrode layer and the second electrode layer may collect this voltage (the electrical signal).

Taking a bone-conduction microphone as an example, the vibration unit may include at least one elastic layer. The signal conversion unit may include a first electrode layer, a piezoelectric layer, and a second electrode layer provided sequentially from top to bottom. The elastic layer is located on a surface of the first electrode layer or a surface of the second electrode layer, and the elastic layer may deform during vibration. The piezoelectric layer produces the electrical signal based on the deformation of the elastic layer. The first electrode layer and the second electrode layer may collect the electrical signal. Merely by way of example, the vibration unit may include a first elastic layer and a second elastic layer provided sequentially from top to bottom. The first elastic layer and the second elastic layer may be in a form of a plate structure that is made of a semiconductor material. In some embodiments, the semiconductor material may include silicon dioxide, silicon nitride, gallium nitride, zinc oxide, silicon carbide, etc. In some embodiments, materials of the first elastic layer and the second elastic layer may be the same or different.

In some embodiments, the piezoelectric layer may be a piezoelectric polymer membrane obtained through a deposition process (e.g., magnetron sputtering, MOCVD) of a semiconductor. In some embodiments, the material of the piezoelectric layer may include a piezoelectric crystal material and a piezoelectric ceramic material. The piezoelectric crystal refers to a piezoelectric single crystal. In some embodiments, the piezoelectric crystal material may include crystal, sphalerite, aragonite, tourmaline, rhodochrosite, GaAs, barium titanate and its derived structural crystals, $KH_2PO_4$, $NaKC_4H_4O_6 \cdot 4H_2O$ (rosin salt), or the like, or any combination thereof. The piezoelectric ceramic material refers to piezoelectric polycrystal formed by an irregular collection of microfine grains obtained through solid-phase reactions and sintering between powder grains of different materials. In some embodiments, the piezoelectric ceramic material may include barium titanate (BT), lead zirconate titanate (PZT), lead barium lithium niobate (PBLN), modified lead titanate (PT), aluminum nitride (AlN), zinc oxide (ZnO), or the like, or any combination thereof. In some embodiments, the material of the piezoelectric layer may also be a piezoelectric polymer material, e.g., polyvinylidene fluoride (PVDF), etc. In some embodiments, the first electrode layer and the second electrode layer are structures made of electrically conductive materials. Exemplary conductive materials may include metal, alloy material, metal oxide material, graphene, etc., or any combination thereof. In some embodiments, the metal and alloy material may include nickel, iron, lead, platinum, titanium, copper, molybdenum, zinc, etc., or any combination thereof. In some embodiments, the alloy material may include a copper-zinc alloy, a copper-tin alloy, a copper-nickel-silicon alloy, a copper-chromium alloy, a copper-silver alloy, etc., or any combination thereof. In some embodiments, the metal oxide material may include $RuO_2$, $MnO_2$, $PbO_2$, NiO, etc., or any combination thereof.

The damping structure layer may refer to a structural body having damping properties. In some embodiments, the damping structure layer may be a film-like structure or a plate-like structure. Further, at least one side of the damping structure layer may be connected to the substrate structure. In some embodiments, the damping structure layer may be located on the upper surface and/or the lower surface of the layered structure or between multiple layers of the layered structure. For example, when the layered structure is a cantilever beam, the damping structure layer may be located on the upper and/or lower surface of the cantilever beam. As another example, when the layered structure includes a supporting arm and a mass element, the damping structure layer may be located on the lower surface of the mass element and/or the upper surface of the supporting arm when the mass element projects downward relative to the supporting arm. In some embodiments, for a macro-sized layered structure and a substrate structure, the damping structure layer may be directly bonded to the substrate structure or the layered structure. In some embodiments, for a microelectromechanical system (MEMS) device, the damping structure layer may be connected to the layered structure and the substrate structure using a semiconductor process, e.g., vapor deposition, spin coating, micro-assembly, etc. In some embodiments, the damping structure layer may have a regular or irregular shape such as a circle, ellipse, triangle, quadrilateral, hexagon, octagon, etc. In some embodiments, an output of the electrical signal of the bone-conduction microphone may be improved by selecting the material, the size, the thickness, etc., of the damping structure layer.

When the housing 210 of the bone-conduction microphone vibrates in response to the external force (for example, when the human body speaks, the vibration of the face drives the housing 210 to vibrate), the vibration of the housing 210 drives the substrate structure to vibrate. Due to the different properties between the layered structure and the housing structure (or the substrate structure), it is impossible to maintain a completely consistent movement between the layered structure and the housing 210, thereby producing a relative motion, which in turn causes the vibrating unit of the layered structure to deform. Further, when the vibrating unit deforms, the piezoelectric layer of the signal conversion unit produces an electrical potential difference (voltage) in response to the deformation stress of the vibrating unit, and at least two electrode layers (e.g., the first electrode layer and the second electrode layer) of the signal conversion unit respectively located on the upper surface and the lower surface of the piezoelectric layer may collect the electrical potential difference to convert the external vibration signal into an electrical signal.

The damping of the damping structure layer differs under different stress (deformation) states, for example, it exhibits a larger damping at high stress or large amplitude. Therefore, it is possible to take advantage of the characteristics of the layered structure having a small amplitude in the non-resonant region and a large amplitude in the resonant region, and by adding the damping structure layer, the sensitivity of the bone-conduction microphone in the non-resonant region may be reduced less, while reducing the quality factor Q in the resonant region, so that the frequency response of the bone-conduction microphone is relatively flat in the entire frequency band. The bone-conduction microphone may be used in a headphone (e.g., a bone-conduction headphone or an air-conduction headphone), eyeglasses, a virtual reality device, a helmet, etc. The bone-conduction microphone may be placed on the human's head (e.g., face), neck, close to the ears, and on top of the head, etc. The bone-conduction microphone may pick up vibration signals of bones when a person speaks, and convert the vibration signals into an electrical signal to realize sound collection. It should be noted that the substrate structure is not limited to a separate structure relative to the housing 210 of the bone-conduction microphone. In some embodiments, the substrate structure may also be a portion of the housing 210 of the bone-conduction microphone.

The processing circuit 230 may obtain the electrical signal from the transducer unit 220 and perform a signal processing on the electrical signal. In some embodiments, the signal processing may include a frequency modulation processing, an amplitude modulation processing, a filtering processing, a noise reduction processing, etc.

Figure 3:
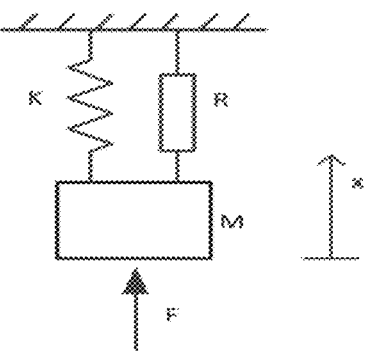
FIG. 3 is a schematic diagram illustrating an exemplary equivalent vibration model of a transducer unit according to some embodiments of the present disclosure.

FIG. 3 is a schematic diagram illustrating an exemplary equivalent vibration model of a transducer unit according to some embodiments of the present disclosure.

The transducer unit 120 may be simplified and equated to a mass-spring-damping system shown in FIG. 3. The mass-spring-damping system is forced to vibrate in response to an excitation force F. The motion of the system may be described by the following differential equation:

$$M\frac{d^2x}{dt^2} + R\frac{dx}{dt} + Kx = F\cos\omega t, \tag{1}$$

where M denotes a mass of the system, R denotes a damping of the system, K denotes an elasticity coefficient of the system, F denotes an amplitude of a drive force, x denotes a displacement of the system, and $\omega$ denotes an angular frequency of the external force. Solving the above equation for a steady-state displacement can get:

$$x = x_a\cos(\omega t - \theta), \tag{2}$$

$$\text{where } x_a = \frac{F}{\omega|Z|} = \frac{F}{\omega\sqrt{R^2 + (\omega M - K\omega^{-1})^2}}.$$

When the sensor device 100 actually operates, x corresponds to a deformation amount of a vibration-electrical signal conversion module of the transducer unit 120. The magnitude of x ultimately corresponds to the magnitude of an output of the electrical signal. A displacement amplitude ratio (normalized) is $$A = \frac{x_a}{x_{a0}} = \frac{Q_m}{\sqrt{\frac{\omega}{\omega_0}^2 + \left(\frac{\omega}{\omega_0}^2 - 1\right)^2 Q_m^2}}, \tag{3}$$

$$\omega_0 = \sqrt{\frac{K}{M}}. \tag{4}$$

$$\text{where } Q_m = \frac{\omega_0 M}{R},$$

which indicates a mechanical quality factor;

$$x_{a0} = \frac{F}{K},$$

which indicates a static displacement amplitude (or a displacement amplitude when $\omega$=0); and $\omega_0$ denotes a resonant frequency of the system.

Figure 4:
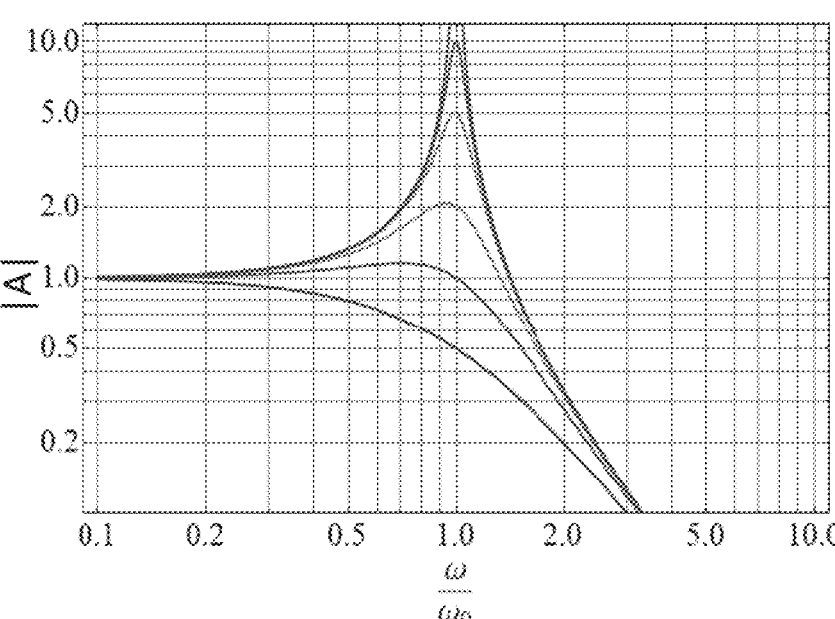
FIG. 4 is a schematic diagram illustrating a displacement resonant curve of an exemplary sensor device according to some embodiments of the present disclosure.

FIG. 4 is a schematic diagram illustrating a displacement resonant curve of an exemplary sensor device according to some embodiments of the present disclosure. Normalized displacement resonant curves of the sensor device 100 composed of a transducer unit having different parameters (elastic coefficients, masses, damping) are shown in FIG. 4. The horizontal axis corresponds to a ratio $$\frac{\omega}{\omega_0}$$

of the frequency of the external force (or vibration) to the resonant frequency of the system, and the vertical axis corresponds to the value A in equation (3). It may be seen that different sensor devices 100 having different transducer units 120, have different values of the mechanical quality factor $Q_m$, correspond to different curves in the figure, and have different displacement amplitude ratios A. When the ratio $$\frac{\omega}{\omega_0}$$

or the frequency of the external force (or vibration) to the resonant frequency of the system is 1, the system resonates, and the variation of displacement is the largest. The larger the value of $Q_m$, the larger the value A and the steeper the curve; and the smaller the value of $Q_m$, the smaller the value A, and the flatter the curve. Therefore, the value Q may be adjusted by adjusting the quality factor $Q_m$ of the transducer unit 120 (e.g., by changing the structure of the transducer unit 120).

The principle of a microphone producing a voltage signal is that the vibration-electrical signal conversion module (i.e., the transducer unit) and the housing of the microphone produce a relative displacement (e.g., an electret microphone deforms through a vibrating membrane to change a distance between the vibrating membrane and the substrate and produce a voltage signal; a cantilever beam bone-conduction microphone deforms through a cantilever vibration device to generate a piezoelectric effect, thereby forming an electrical signal), and the larger the displacement, the larger the output signal. Obviously, the vibration-electrical signal conversion module of the microphone perfectly fits the displacement resonant curves as shown in FIG. 4. When the $$\frac{K}{M}$$

is reduced, the resonant frequency of the system decreases. When the resonant frequency is changed, the sensitivity of the signal before the resonant frequency increases, but after the resonant frequency, there is a period of frequency where the sensitivity of the signal decreases. When the sensitivity is adjusted by adjusting the resonant frequency of the sensor device 100, it is necessary to consider the frequency range simultaneously. In some embodiments, the resonant frequency of the sensor device 100 is between 1500 Hz and 6000 Hz. In some embodiments, the resonant frequency of the sensor device 100 is between 1500 Hz and 3000 Hz. In some embodiments, the resonant frequency of the sensor device 100 is between 2000 Hz and 2500 Hz.

Figure 5:
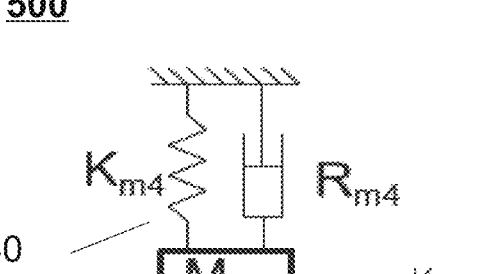
FIG. 5 is a mechanically equivalent schematic diagram illustrating an exemplary sensor device according to some embodiments of the present disclosure.

FIG. 5 is a mechanically equivalent schematic diagram illustrating an exemplary sensor device according to some embodiments of the present disclosure.

In some embodiments, a sensor device 500 may include a transducer unit 520 and an additional resonant system 530 (also referred to as a first resonant system 530). In some embodiments, the sensor device 500 may be considered as adding the first resonance system 530 on the basis of the transduction unit 520. Exemplarily, in the embodiment, the first resonant system 530 may be a spring (Km4)-mass (Mm4)-damping (Rm4) system. The first resonant system 530 may be coupled between the housing (not shown in the figure) and the transducer unit 520. Due to the function of the first resonant system 530, when the housing receives an external vibration signal, the external vibration signal may be transmitted to the transducer unit 520 respectively through a housing area coupled to the transducer unit 520 and a housing area coupled to the first resonant system 530. Therefore, a mechanical response of the sensor device 500 is changed relative to the sensor device 100. Correspondingly, an electrical, acoustic, and/or thermal response of the sensor device 500 is changed relative to the sensor device 100.

In some embodiments, the first resonant system 530 may be formed by filling the accommodating cavity of the housing with liquid. For example, the liquid fills the accommodating cavity of the housing, the transducer unit 520 is wrapped in the liquid.

Figure 6:
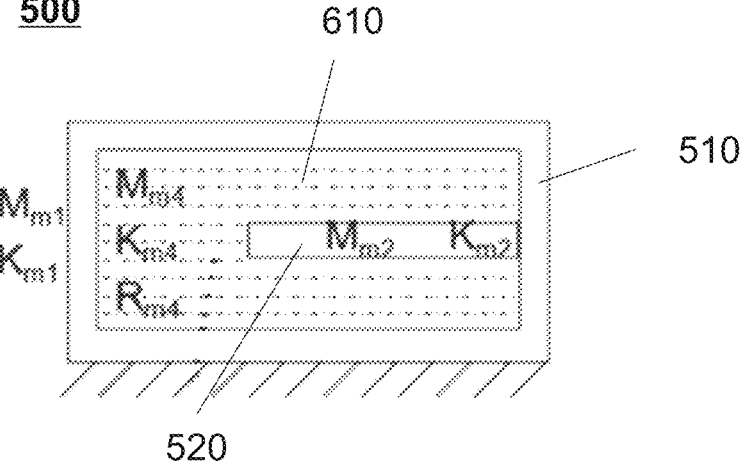
FIG. 6 is a schematic diagram illustrating a sensor device filled with liquid according to some embodiments of the present disclosure.

FIG. 6 is a schematic diagram illustrating a sensor device filled with liquid according to some embodiments of the present disclosure. As shown in FIG. 6, liquid 610 may be liquid having safety properties (e.g., not flammable or explosive) and stability properties (e.g., not volatile, not subject to high temperature deterioration, etc.). For example, the liquid 610 may include oil (such as silicone oil, glycerin, castor oil, motor oil, lubricating oil, hydraulic oil (such as aviation hydraulic oil), etc.), water (including pure water, aqueous solutions of other inorganic or organic substances, etc. (such as salt water)), oil-water emulsion, or other liquids that meet the performance requirements, or a combination of one or more thereof.

The density and kinematic viscosity of the liquid 610 are within a certain density range and a kinematic viscosity range, respectively. In some embodiments, a density range and a kinematic viscosity range may be set by a user or determined based on the performance of the sensor device 500 (e.g., the sensitivity, a bottom noise level, a resonant peak value, a frequency range where the resonant peak (which may also be referred to as the resonance peak) is located, a peak-to-valley value, and/or the quality factor $Q_m$, etc.). In some embodiments, the liquid 610 may be the silicone oil. The silicone oil has features of heat resistant, non-volatile, having a wide range of viscosities. The density of the silicone oil is about $0.94 \text{ kg/m}^3$, and an available range of kinematic viscosities is relatively wide (e.g., 0.1-1000 ristokes (cst)).

The liquid 610 may be injected into the accommodating cavity of the housing 510 through a particular manner. Specific description of injection the liquid 610 into the accommodating cavity of housing 510 may be found in other parts of the specification of the present disclosure, such as FIG. 11 and its descriptions.

In some embodiments, the frequency response curve of the sensor device 500 at least includes two resonant peaks. The at least two resonant peaks include a first resonant peak and a second resonant peak. The resonant frequency corresponding to the first resonant peak is primarily related to the properties of the transducer unit 520 (e.g., the shape, the material, the structure, etc.). The second resonant peak is a resonant peak produced in response to the first resonant system 530, and a resonant frequency corresponding to the second resonant peak is mainly related to one or more mechanical parameters of the first resonant system 530 (e.g., the equivalent spring (Km4), the mass (Mm4), the damping (Rm4), etc., of the resonant system). In order to make the sensor device 500 being capable of applying to different scenarios, different relationships may be satisfied between a resonant frequency corresponding to the first resonant peak (also refers to as a first resonant frequency) and a resonant frequency corresponding to the second resonant peak (also refers to as a second resonant frequency). For example, the second resonant frequency may be less than, equal to, or greater than the first resonant frequency.

For the purpose of description only, due to the presence of the second resonance peak corresponding to the first resonant system 530, the frequency response curve of the sensor device 500, especially the frequency response curve in the mid-to-low frequency range where speech information is relatively abundant, may be enhanced, thereby increasing the sensitivity of the sensor device 500. In addition, since the first resonant system 530 acts on the transducer unit 520, vibration characteristics of the sensor device 500 are changed relative to the sensor device without the first resonant system 530. Specifically, the first resonant system 530 acts on the transducer unit 520, which may affect the mass, the stiffness, and/or the damping of the sensor device 500, and its effect is equivalent to changing the Q value of the first resonant peak of the sensor device 500 (e.g., reducing the Q value) relative to that of the sensor device not connected to the first resonant system 530. Specific description regarding the frequency response curve, the first resonant peak, and the second resonant peak of the sensor device 500 may be found elsewhere in the specification of the present disclosure, such as FIG. 9 and FIG. 10 and their descriptions.

In some embodiments, the first resonant system 530 may reduce the external impact received by the transducer unit 520 to protect the transducer unit 520. For example, if the first resonant system 530 is the liquid 610 filled with the accommodating cavity of the sensor device 500, since the liquid 610 has a viscous effect and the stiffness of the liquid 610 is much smaller than that of the device material, the reliability of the sensor device 500 may be improved when receiving an external impact load (e.g., the bone-conduction microphone is required to withstand an impact of 10,000 g acceleration without being damaged). Specifically, due to the viscous effect of the liquid 610, some of the impact energy may be absorbed and consumed, so that the impact load on the transducer unit 520 is greatly reduced.

In addition, due to the presence of stress during a manufacturing process of the sensor device 100, especially a cantilever-type device, the device often experiences a deformation, such as bending (along the length or width), twisting, etc. However, a cantilever beam-type structure is commonly used for the sensor device, such as a bone-conduction microphone, an acceleration device, etc. Since the sensor device 500 is filled with the liquid 610 inside, the sensor device 500 may utilize gravity, surface tension, viscosity, and other properties of the liquid 610 to correct the deformation of the device, which helps to minimize the device deformation, thereby making the output more stable and be closer to an actual design effect.

Figure 7:
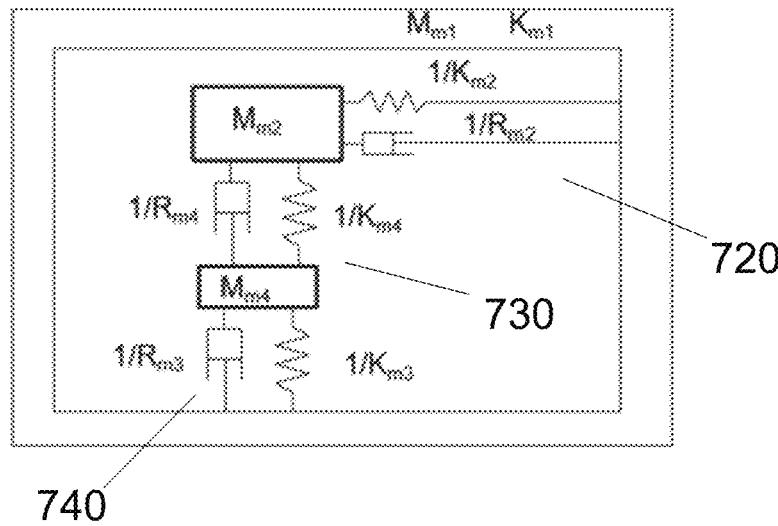
FIG. 7 is a mechanically equivalent schematic diagram illustrating an exemplary sensor device according to some embodiments of the present disclosure.

FIG. 7 is a mechanically equivalent schematic diagram illustrating an exemplary sensor device according to some embodiments of the present disclosure. As shown in FIG. 7, a sensor device 700 may include a transducer unit 720 and a second resonant system 740. In some embodiments, the sensor device 700 may be considered as adjusting the first resonant system 530 on the basis of the transducer unit 720 to form the second resonant system 740. Exemplarily, in the embodiment, the second resonant system 740 has a new spring (Km3) and a new damping (Rm3) compared with the first resonant system 530. The second resonant system 740 may be provided between the housing 710 and the transducer unit 720. For example, as shown in FIG. 7, the spring (Km3)-damping (Rm3) of the second resonant system 740 may be connected in series with the spring (Km4)-mass (Mm4)-damping (Rm4) of the first resonant system 530 and indirectly act on the transducer unit 720. As another example, the spring (Km3)-damping (Rm3) of the second resonant system 740 may be connected in series with the spring (Km4)-mass (Mm4)-damping (Rm4) of the first resonant system 530 and directly act on the transducer unit 720. Due to the function of the second resonant system 740, when the housing 710 receives an external vibration signal, the external vibration signal may be transmitted to the transducer unit 720 via the second resonant system 740 through a housing area connected to the transducer unit 720 and a housing area connected to the second resonant system 740, respectively. Therefore, the mechanical response of the sensor device 700 is changed relative to the sensor device 500. Accordingly, the electrical, acoustic, and/or thermal response of the sensor device 700 is changed relative to the sensor device 500. Meanwhile, due to the newly introduced spring (Km3) and the newly introduced spring damping (Rm3) of the second resonant system 740, the vibration characteristics (e.g., stiffness-damping, etc.) of the sensor device 700 are changed relative to the sensor device 500.

In some embodiments, the second resonant system 740 may be formed by filling the accommodating cavity of the sensor device 700 with a different medium. For example, the accommodating cavity of the sensor device 700 may be filled with partial liquid to form the second resonant system 740 where the liquid and an air cavity (in the present disclosure, the air cavity may also be referred to as a bubble) coexist. At this point, the liquid in the accommodating cavity may be equivalent to the spring (Km4)-mass (Mm4)-damping (Rm4) described above, and the bubble may be equivalent to the spring (Km3) and damping (Rm3). As another example, the accommodating cavity of the sensor device 700 may be filled with the liquid of different and immiscible densities to form the second resonant system 740. In some embodiments, the medium that is filled with the accommodating cavity of the sensor device 700 may be set by the user or determined based on the performance of the sensor device 700 (e.g., the sensitivity, the bottom noise level, the resonant peak value, the frequency range where the resonant peak is located, a peak-to-valley value, and/or the quality factor $Q_m$, etc.).

Figure 8:
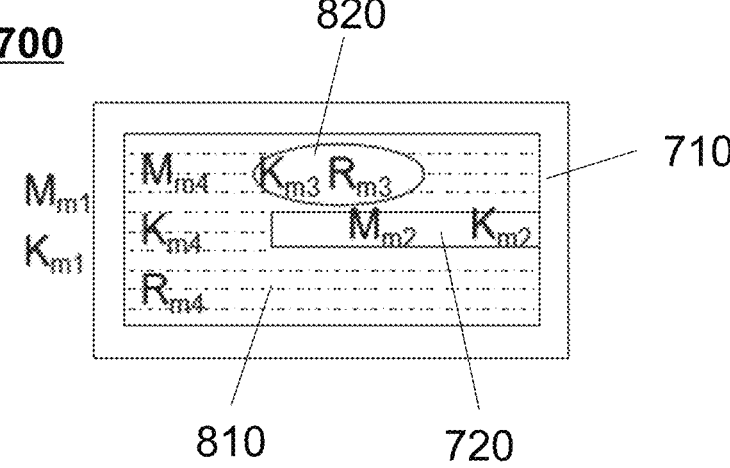
FIG. 8 is a schematic diagram illustrating a sensor device filled with liquid and a n bubble according to some embodiments of the present disclosure.

FIG. 8 is a schematic diagram illustrating a sensor device filled with liquid and a bubble according to some embodiments of the present disclosure. As shown in FIG. 8, in the sensor device 700, the accommodating cavity of the housing 710 is filled with liquid 810 and a bubble 820. The liquid 810 in the sensor device 700 may be selected from the same or different types of liquid as the sensor device 500. For example, both the sensor device 700 and the sensor device 500 are filled with the silicone oil with same kinematic viscosity. As another example, the sensor device 700 and the sensor device 500 are respectively filled with a different type of liquid 810 or the same type of liquid 810 with different kinematic viscosities (e.g., silicone oil with kinematic viscosities of 0.65 cst and 200 cst, respectively). The liquid 810 and the bubble 820 may be injected or formed in the accommodating cavity of the housing 710 through a particular manner. Specific descriptions of the manner of injecting or forming the liquid 810 and the bubble 820 in the accommodating cavity of the housing 710 may be found elsewhere in the specification of the present disclosure, such as FIG. 11 and its descriptions.

In some embodiments, the frequency response curve of the sensor device 700 at least includes two resonant peaks. The at least two resonant peaks include a third resonant peak and a fourth resonant peak. The third resonant peak is a resonant peak corresponding to the transducer unit 720, and the fourth resonant peak is a resonant peak produced in response to the second resonant system 740.

In some embodiments, different relationships may be satisfied between a third resonant frequency (a resonant frequency corresponding to the third resonant peak) and a fourth resonant frequency (a resonant frequency corresponding to the fourth resonant peak) of the sensor device 700. Exemplarily, when the second resonant system 740 is jointly formed by the liquid 810 and the bubble 820, due to a large compressibility (relative to a case of pure liquid 810) and a low stiffness of the bubble 820, the sensor device 700 may have a resonant frequency located in a low or mid-to-low frequency band. For example, the fourth resonant frequency is a low or mid-to-low frequency, and the third resonant frequency may be greater than the fourth resonant frequency, such as, the third resonant frequency is in a higher frequency band. As another example, the third resonant frequency and the fourth resonant frequency are both mid-to-low frequencies. In the present disclosure, a low frequency, a mid-to-low frequency, or a mid-to-high frequency refers to a frequency whose frequency value is within a certain range of frequency. For example, the low frequency, the mid-to-low frequency, or the mid-to-high frequency corresponds to a frequency range of 7000 Hz or less, 5000 Hz or less, 3000 Hz or less, 1000 Hz or less, 500 Hz or less, etc. For example, the higher frequency band corresponds to a frequency range of 2000 Hz or more, 5000 Hz or more, 8000 Hz or more, etc. The third resonant frequency is a higher frequency relative to the fourth resonant frequency. Optionally, a difference between the two resonant frequencies is 100-6000 Hz. When the sensor device 700 has a resonant frequency in a low frequency or a mid-to-low frequency range, the sensitivity of the sensor device 700 at the low frequency is higher than that of the sensor device without the second resonant system 740. When the sensor device 700 further has a resonant frequency at a high frequency or a mid-to-high frequency, the frequency response curve of the sensor device 700 is also flatter in a range between the two resonant peaks, which is more conducive to obtaining an effective speech signal within the frequency range.

In addition, since the second resonant system 740 acts on the transducer unit 720, the vibration characteristics of the sensor device 700 vary relative to the sensor device without the second resonant system 740. Exemplarily, the second resonant system 740 acting on the transducer unit 720 may affect the stiffness and/or the damping, etc., of the sensor device 700, and its effect is equivalent to changing the Q value of the third resonant peak of the sensor device 700 (e.g., reducing the Q value) relative to the sensor device not connected to the second resonant system 740. More specific descriptions regarding the frequency response curve, the third resonant peak, and the fourth resonant peak of the sensor device 700 may be found elsewhere in the specification of the present disclosure, such as FIG. 9 and FIG. 10 and their descriptions.

In some embodiments, the second resonant system 740 may reduce the external impact on the transducer unit 720 to protect the transducer unit 720. For example, if the liquid 810 and the bubble 820 are introduced into the accommodating cavity 710, the impact reliability of the sensor device 700 when receiving the external impact load may be improved. Due to the viscous effect of the liquid 810 and the large compressibility of the gas, some of the impact energy may be absorbed and consumed, thereby greatly reducing the impact load on the transducer unit 720.

In addition, due to the presence of stress during a manufacturing process of the sensor device 700, the device often experiences a deformation. By injecting the liquid 810 and the bubble 820 into the cavity, the available gravity, the surface tension, the viscosity, and other properties of the liquid 810 may be utilized to correct the deformation of the device, which helps to minimize the device deformation, thereby making the output more stable and be closer to an actual design effect.

It should be noted that the above description of the sensor device 700 is merely an exemplary description, and does not limit the present disclosure to the scope of the cited embodiments. It may be understood that for those skilled in the art, after understanding the principle of the system, it may be possible to make any combination of its structure, modules, or form the sub-system to connect with other modules without departing from the principle.

Figure 9:
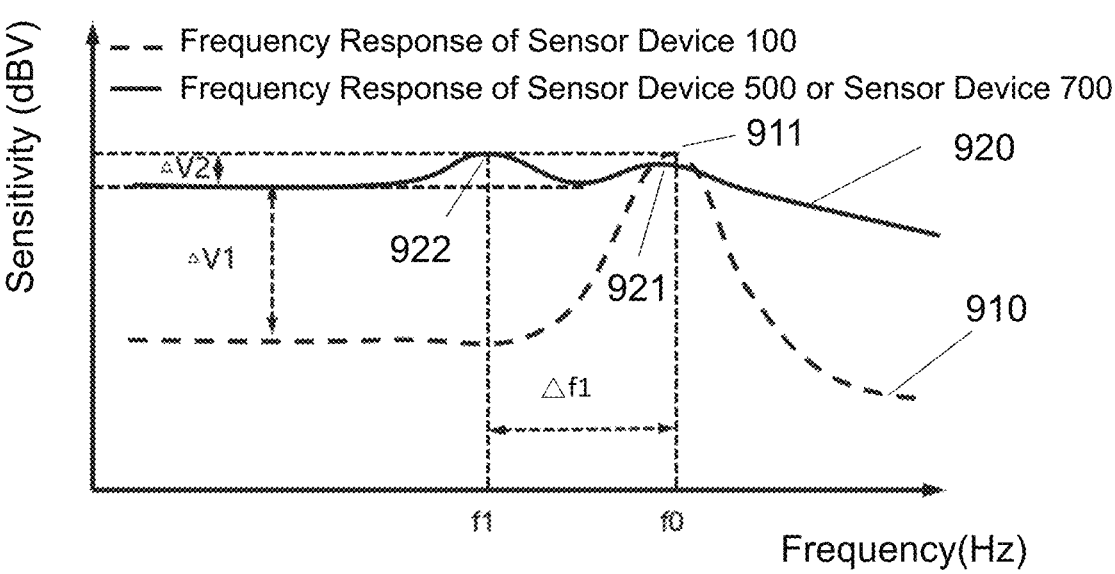
FIG. 9 is a diagram illustrating an exemplary frequency response curve of a sensor device 500 or a sensor device 700 according to some embodiments of the present disclosure.

FIG. 9 is a diagram illustrating an exemplary frequency response curve of a sensor device 500 or a sensor device 700 according to some embodiments of the present disclosure.

Exemplarily, as shown in FIG. 9, dotted line 910 represents a frequency response curve of a sensor device that is not provided with the equivalent resonant system, and solid line 920 represents a frequency response curve of the sensor device 500 or the sensor device 700. The abscissa indicates the frequency, the unit is Hertz (Hz), and the ordinate indicates the sensitivity, the unit is volt decibel (dBV). The frequency response curve 910 includes a resonant peak 911. The frequency response curve 920 includes a first (or third) resonant peak 921 and a second (or fourth) resonant peak 922. For the sensor device 500, a frequency corresponding to the first resonant peak 921 is a first resonant frequency, and the second resonant peak 922 is formed by the function of the first resonant system 530 and a corresponding frequency is a second resonant frequency. For the sensor device 700, the third resonant peak 921 corresponds to a third resonant frequency, the fourth resonant peak 922 is formed by the function of the second resonant system 740, and the fourth resonant peak 922 corresponds to a fourth resonant frequency.

It should be noted that, as shown in the figure, the second (or fourth) resonant peak 922 is on the left of the first (or third) resonant peak 921, i.e., a frequency corresponding to the second (or fourth) resonant peak 922 is less than a frequency corresponding to the first (or third) resonant peak. In some embodiments, by changing mechanical parameters of the transducer unit or the first (or second) resonant system, the frequency corresponding to the second (or fourth) resonant peak 922 may be greater than the frequency corresponding to the first (or third) resonant peak 921, i.e., the second (or fourth) resonant peak 922 is on the right of the first (or third) resonant peak 921. For example, for the sensor device 500 filled with the liquid inside, the second (or fourth) resonant peak 922 may be on the left or right of the first (or third) resonant peak 921, and its position may be related to the properties of the filled liquid (e.g., density, kinematic viscosity, volume, etc.). For example, if the density of the liquid becomes lower or the kinematic viscosity becomes greater, the resonant peak of the sensor device may be shifted to high frequency.

In some embodiments, a frequency corresponding to the resonant peak 911 is within a range of 100 Hz-12000 Hz. In some embodiments, a frequency corresponding to the resonant peak 911 is within a range of 100 Hz-10,000 Hz. In some embodiments, a frequency corresponding to the resonant peak 911 is within a range of 500 Hz-10,000 Hz. In some embodiments, a frequency corresponding to the resonant peak 911 is within a range of 1000 Hz-7000 Hz. In some embodiments, a frequency corresponding to the resonant peak 911 is within a range of 1500 Hz-5000 Hz. In some embodiments, a frequency corresponding to the resonant peak 911 is within a range of 2000 Hz-5000 Hz. In some embodiments, a frequency corresponding to the resonant peak 911 is within a range of 2000 Hz-4000 Hz. In some embodiments, a frequency corresponding to the resonant peak 911 is within a range of 3000 Hz-4000 Hz.

In some embodiments, a frequency corresponding to the first (or third) resonant peak 921 is within a range of 100 Hz-12000 Hz. In some embodiments, a frequency corresponding to the first (or third) resonant peak 921 is within a range of 500 Hz-10,000 Hz. In some embodiments, a frequency corresponding to the first (or third) resonant peak 921 is within a range of 1000 Hz-10,000 Hz. In some embodiments, a frequency corresponding to the first (or third) resonant peak 921 is within a range of 1500 Hz-7000 Hz. In some embodiments, a frequency corresponding to the first (or third) resonant peak 921 is within a range of 1500 Hz-5000 Hz. In some embodiments, a frequency corresponding to the first (or third) resonant peak 921 is within a range of 2000 Hz-5000 Hz. In some embodiments, a frequency corresponding to the first (or third) resonant peak 921 is within a range of 2000 Hz-4000 Hz. In some embodiments, a frequency corresponding to the first (or third) resonant peak 921 is within a range of 3000 Hz-4000 Hz.

In some embodiments, the resonant frequency (the first resonant frequency or the third resonant frequency) corresponding to the first (or third) resonant peak 921 is different from the resonant frequency corresponding to the resonant peak 911. For example, for the sensor device 500 whose accommodating cavity of the housing 110 is filled with liquid, the liquid acts as the first resonant system 530, and since the liquid is not easy to compress, the stiffness of the system itself becomes larger, and the first resonant frequency corresponding to the first resonant peak 921 becomes greater than the resonant frequency corresponding to the resonant peak 911, i.e., the first resonant peak 921 shifts to the right relative to the resonant peak 911.

In some embodiments, a frequency corresponding to the second (or fourth) resonant peak 922 is within a range of 50 Hz-12000 Hz. In some embodiments, a frequency corresponding to the second (or fourth) resonant peak 922 is within a range of 50 Hz-10,000 Hz. In some embodiments, a frequency corresponding to the second (or fourth) resonant peak 922 is within a range of 50 Hz-6000 Hz. In some embodiments, a frequency corresponding to the second (or fourth) resonant peak 922 is within a range of 100 Hz-5000 Hz. In some embodiments, a frequency corresponding to the second (or fourth) resonant peak 922 is within a range of 500 Hz-5000 Hz. In some embodiments, a frequency corresponding to the second (or fourth) resonant peak 922 is within a range of 1000 Hz-5000 Hz. In some embodiments, a frequency corresponding to the second (or fourth) resonant peak 922 is within a range of 1000 Hz-3000 Hz. In some embodiments, a frequency corresponding to the second (or fourth) resonant peak 922 is within a range of 1000 Hz-2000 Hz. In some embodiments, a frequency corresponding to the second (or fourth) resonant peak 922 is within a range of 1500 Hz-2000 Hz.

In some embodiments, the fourth resonant frequency is lower than the second resonant frequency. For the sensor device 500 whose accommodating cavity of the housing 510 is filled with the liquid inside, where the liquid acts as the first resonant system 530, in contrast, for the sensor device 700 whose accommodating cavity of the housing 710 contains the liquid and the bubble inside, the liquid and the bubble are respectively acted as the second resonant system 740, the overall stiffness of the combination of the liquid and the bubble is lower than the liquid, so that the fourth resonant frequency is lower than the second resonant frequency.

In some embodiments, by adjusting the structure and material of the transducer unit, and one or more mechanical parameters (e.g., the type of the filled liquid, the size of the bubble, etc.) of the first (or second) resonant system, a range between the two resonant peaks 921 and 922 on the frequency response curve 920 can be relatively flat, so as to improve the output quality of the sensor device 500 or the sensor device 700. In some embodiments, a sensitivity difference between a valley between the resonant peak 921 and the resonant peak 922 and a peak value of a higher peak among the resonant peak 921 and the resonant peak 922 is not higher than 30 dBV, and a ratio of the sensitivity difference to the peak value of the higher peak is not more than 0.2. In some embodiments, a sensitivity difference between a valley between the resonant peak 921 and the resonant peak 922 and a peak value of a higher peak among the resonant peak 921 and the resonant peak 922 is not higher than 20 dBV, and a ratio of the sensitivity difference to the peak value of the higher peak is not more than 0.15. In some embodiments, a sensitivity difference between a valley between the resonant peak 921 and the resonant peak 922 and a peak value of a higher peak among the resonant peak 921 and the resonant peak 922 is not higher than 15 dBV, and a ratio of the sensitivity difference to the peak value of the higher peak is not more than 0.12. In some embodiments, a sensitivity difference between a valley between the resonant peak 921 and the resonant peak 922 and a peak value of a higher peak among the resonant peak 921 and the resonant peak 922 is not higher than 10 dBV, and a ratio of the sensitivity difference to the peak value of the higher peak is not more than 0.1. In some embodiments, a sensitivity difference between a valley between the resonant peak 921 and the resonant peak 922 and a peak value of a higher peak among the resonant peak 921 and the resonant peak 922 is not higher than 8 dBV, and a ratio of the sensitivity difference to the peak value of the higher peak is not more than 0.08. In some embodiments, a sensitivity difference between a valley between the resonant peak 921 and the resonant peak 922 and a peak value of a higher peak among the resonant peak 921 and the resonant peak 922 is not higher than 5 dBV, and a ratio of the sensitivity difference to the peak value of the higher peak is not more than 0.05.

Accordingly, a difference between the resonant frequencies corresponding to the resonant peaks 921 and 922 (the frequency of resonant peak 921 is indicated as $f_0$ (the frequency of resonant peak 921 is close to the frequency of the resonant peak 911), the frequency of the resonant peak 922 is indicated as $f_1$, and the difference between the resonant frequencies corresponding to the resonant peak 921 and the resonant peak 922 is indicated as a frequency difference $\Delta f_1$) is within a certain range, which may make the frequency response curve between the resonant peak 921 and the resonant peak 922 flatter. In some embodiments, the frequency difference $\Delta f_1$ is within a range of 200-3000 Hz, and a ratio of the frequency difference $\Delta f_1$ to $f_0$ is within a range of 0.2-0.7. In some embodiments, the frequency difference $\Delta f_1$ is within a range of 200-2000 Hz, and a ratio of the frequency difference $\Delta f_1$ to $f_0$ is within a range of 0.2-0.65. In some embodiments, the frequency difference $\Delta f_1$ is within a range of 500-2000 Hz, and a ratio of the frequency difference $\Delta f_1$ to $f_0$ is within a range of 0.25-0.65. In some embodiments, the frequency difference $\Delta f_1$ is within a range of 500-1500 Hz, and a ratio of the frequency difference $\Delta f_1$ to $f_0$ is within a range of 0.25-0.6. In some embodiments, the frequency difference $\Delta f_1$ is within a range of 800-1500 Hz, and a ratio of the frequency difference $\Delta f_1$ to $f_0$ is within a range of 0.3-0.6. In some embodiments, the frequency difference $\Delta f_1$ is within a range of 1000-1500 Hz, and a ratio of the frequency difference $\Delta f_1$ to $f_0$ is within a range of 0.35-0.6.

As shown in FIG. 9, compared with the frequency response curve 910, the frequency response curve 920 has a higher and more stable increase in sensitivity (i.e., a difference, expressed as $\Delta V1$) in a frequency range within the resonant frequency $f_1$ corresponding to the second (or fourth) resonant peak 922. In some embodiments, $\Delta V1$ is within a range of 10 dBV-60 dBV. In some embodiments, $\Delta V1$ is within a range of 10 dB V-50 dB V. In some embodiments, $\Delta V1$ is within a range of 15 dB V-50 dB V. In some embodiments, $\Delta V1$ is within a range of 15 dB V-40 dB V. In some embodiments, $\Delta V1$ is within a range of 20 dB V-40 dB V. In some embodiments, $\Delta V1$ is within a range of 25 dB V-40 dB V. In some embodiments, $\Delta V1$ is within a range of 30 dBV-40 dBV.

The presence of the first resonant system 530 or the second resonant system 740 may have a suppressive effect on the resonant peak corresponding to the transducer unit of the sensor device 500 or the sensor device 700, causing a relatively low Q value at the first (or third) resonant peak 921 of the frequency response curve 920 and a flatter frequency response curve in the required frequency band (e.g., mid-to-low frequencies), and making a difference (also known as a peak-to-valley value, expressed as $\Delta V2$) between a peak value of the highest peak and a valley value of the lowest valley of the overall frequency response curve 920 being within a certain range. In some embodiments, the peak-to-valley value is not more than 30 dBV, and a ratio of the peak-to-valley value to the peak value of the highest peak is not more than 0.2. In some embodiments, the peak-to-valley value is not more than 20 dBV, and a ratio of the peak-to-valley value to the peak value of the highest peak is not more than 0.15. In some embodiments, the peak-to-valley value is not more than 10 dBV, and a ratio of the peak-to-valley value to the peak value of the highest peak is not more than 0.1. In some embodiments, the peak-to-valley value is not more than 8 dBV, and a ratio of the peak-to-valley value to the peak value of the highest peak is not more than 0.08. In some embodiments, the peak-to-valley value is not more than 5 dBV, and a ratio of the peak-to-valley value to the peak value of the highest peak is not more than 0.05.

For the sensor device 700, in some embodiments, the frequency (i.e., the fourth resonant frequency) corresponding to the fourth resonant peak 922 is a mid-to-low frequency, and the frequency (i.e., the third resonant frequency) corresponding to the third resonant peak 921 is a mid-tohigh frequency. In some embodiments, a difference between the minimum value of sensitivity of the frequency response curve 920 in a frequency range within the resonant frequency $f_1$ and the peak value of the fourth resonant peak is not greater than 30 dBV, and the ratio thereof is not greater than 0.2. In some embodiments, the difference between the minimum value of sensitivity of the frequency response curve 920 in a frequency range within the resonant frequency $f_1$ and the peak value of the fourth resonant peak is not greater than 20 dBV, and the ratio thereof is not less than 0.15. In some embodiments, the difference between the minimum value of sensitivity of the frequency response curve 920 in a frequency range within the resonant frequency $f_1$ and the peak value of the fourth resonant peak is not greater than 10 dBV, and the ratio thereof is not greater than 0.1.

In some embodiments, the frequency response of the sensor device 500 or the sensor device 700 may be described by one or more of related parameters of the curve 920, such as the peak value and frequency of the first (or third) resonant peak 921, the peak value and frequency of the second (or fourth) resonant peak 922, the Q value, $\Delta f_1$, $\Delta V1$, $\Delta V2$, a ratio of $\Delta f_1$ to $f_0$, a ratio of the peak-to-valley value to the peak value of the highest peak, and first-order coefficients, second-order coefficients, and third-order coefficients of an equation determined by fitting the frequency response curve, etc. In some embodiments, the frequency response of the sensor device 500 or the sensor device 700 may be related to the properties of the filled liquid and/or the parameters of the transducer unit. The properties of the liquid may include, for example, the density of the liquid, the kinematic viscosity of the liquid, the volume of the liquid, the presence or absence of the bubble, the volume of the bubble, the location of the bubble, the count of the bubble, etc. The parameters of the transducer unit may include, for example, the mass, the size, the stiffness, etc., of the transducer unit (e.g., a cantilever beam). In some embodiments, the frequency response of the sensor device 500 or the sensor device 700 may also be related to an internal structure of the housing (e.g., the shape of the accommodating cavity), the size, the stiffness, and other parameters.

In some embodiments, in order to obtain a desirable output frequency response (e.g., the frequency response curve 920) of the sensor device 500 or the sensor device 700, the ranges of various parameters (also referred to as frequency response influencing factors, including, for example, properties of the filled liquid and/or the parameters of the transducer unit) described above that affects the frequency response may be determined through computer simulation, phantom experiments, etc. In some embodiments, the effects of each factor on the frequency response of the sensor device 500 or the sensor device 700 may be determined one by one controlling variables based on simulation. For example, under the premise that the same liquid is fully filled, the performance of the sensor device with different structural characteristics of the accommodating cavity is tested. As another example, under the premise that the same liquid is fully filled, the performance of the sensor device with different stiffness characteristics of the housing is tested. As another example, under the premise that the size of the housing is the same, the performance of the sensor device is tested under different conditions of filling with liquid and filling with liquid and a bubble. As further another example, under the premise that the bubble does not cover the transducer unit (e.g., a piezoelectric transducer), the performance of the sensor device with different size characteristics of the bubble is tested. As still another example, under the premise that the bubble covers the transducer unit (e.g., a piezoelectric transducer), the performance of the sensor device with different size characteristics of the bubble is tested.

In some embodiments, some of the factors are related to the effect of other factors on the frequency response of the sensor device 500 or the sensor device 700, so the effect of a parameter pair or a parameter group on the frequency response of the sensor device 500 or the sensor device 700 may be determined in the form of a corresponding parameter pair or a corresponding parameter group. For example, as the height of the housing becomes larger, the volume of the accommodating cavity becomes larger, the mass of the housing becomes larger, and the volume of the liquid filled therein becomes larger accordingly, so the height of the housing, the mass of the housing, and the volume of the liquid (or a ratio of any two of the parameters, or a product of at least two of the parameters, etc.) may be used as a parameter group to test the effect of the parameter group on the performance of the sensor device. As another example, the viscosity of the liquid and the density of the liquid may be used as a parameter pair to test the effect of the parameter pair (or its ratio, product, etc.) on the frequency response of the sensor device 500 or the sensor device 700.

In some embodiments, the effect of each factor, or a parameter pair or parameter group corresponding to multiple factors on the frequency response of the sensor device 500 or the sensor device 700 may be determined through phantom testing.

Exemplarily, for the sensor device 500 filled with liquid of different viscosities, the greater the viscosity of the liquid, the greater the system damping and the smaller the Q value of the frequency response of the sensor device 500. For the sensor device 700 filled with liquid and a bubble, within a certain range of kinematic viscosity, the greater the kinematic viscosity of the filled liquid, the greater the increase in sensitivity of the sensor device 700.

In some embodiments, the kinematic viscosity of the liquid may be within a range of 0.1-5000 cst. In some embodiments, the kinematic viscosity of the liquid may be within a range of 0.1-1000 cst. In some embodiments, the kinematic viscosity of the liquid may be within a range of 0.3-1000 cst. In some embodiments, the kinematic viscosity of the liquid may be within a range of 0.5-500 cst. In some embodiments, the kinematic viscosity of the liquid may be within a range of 0.5-200 cst. In some embodiments, the kinematic viscosity of the liquid may be within a range of 0.5-200 cst. In some embodiments, the kinematic viscosity of the liquid may be within a range of 50-200 cst.

Exemplarily, for the sensor device 500 filled with liquid, taking the bone-conduction microphone or a single-axis accelerometer as an example, within a range, the cantilever beam length becomes shorter, an overall effective frequency band expands.

In some embodiments, the thickness of the cantilever beam, the width of the cantilever beam, and the length of the cantilever beam may be 0.5 um-3 mm, 50 um-500 mm, 200 um-1 cm, respectively. In some embodiments, the thickness of the cantilever beam, the width of the cantilever beam, and the length of the cantilever beam may be 0.5 um-1 mm, 50 um-100 mm, 200 um-200 mm, respectively. In some embodiments, the thickness of the cantilever beam, the width of the cantilever beam, and the length of the cantilever beam may be 1 um-100 um, 100 um-10 mm, 400 um-20 mm, respectively. In some embodiments, the thickness of the cantilever beam, the width of the cantilever beam, and the length of the cantilever beam may be 2 um-20 um, 200 um-2 mm, 800 um-4 mm, respectively. In some embodiments, the thickness of the cantilever beam, the width of the cantilever beam, and the length of the cantilever beam may be 2 um-5 um, 200 um-500 um, 800 um-1000 um, respectively.

Exemplarily, for the sensor device 500 filled with liquid, by increasing the size of the accommodating cavity, the sensitivity of the sensor device in the middle frequency may be improved, a frequency suppression effect of the liquid on the frequency response of the sensor device in the middle frequency is decreased, making the frequency response curve flatter.

Exemplarily, for the sensor device 500 filled with liquid and having different heights of the accommodating cavity, in a certain range, the higher the height of the accommodating cavity, the higher the sensitivity of the output of the sensor device 500 in the mid-to-low frequency.

In some embodiments, the length, the width, and the height of the accommodating cavity of the sensor device are 1-30 mm, 1-30 mm, and 0.5-30 mm, respectively. In some embodiments, the length, the width, and the height of the accommodating cavity of the sensor device are 2-30 mm, 2-30 mm, and 1-30 mm, respectively. In some embodiments, the length, the width, and the height of the accommodating cavity of the sensor device are 5-10 mm, 5-10 mm, and 1-10 mm, respectively. In some embodiments, the length, the width, and the height of the accommodating cavity of the sensor device are 8-10 mm, 5-10 mm, and 1-5 mm, respectively. Optionally, the accommodating cavity of the sensor device has larger dimensions. In some embodiments, the length, the width, and the height of the accommodating cavity of the sensor device are 10-200 mm, 10-100 mm, and 10-100 mm, respectively. In some embodiments, the length, the width, and the height of the accommodating cavity of the sensor device are 10-100 mm, 10-50 mm, and 10-50 mm, respectively. In some embodiments, the length, the width, and the height of the accommodating cavity of the sensor device are 10-50 mm, 10-30 mm, and 10-30 mm, respectively.

Exemplarily, since the gas is easily compressed and the rigidity is small, while the liquid is not easy to compress, so there may be over-stiffened and over-damping, compared with the sensor device 500 filled with liquid, the sensor device 700 filled with liquid and a bubble has a higher overall output gain. For example, in some embodiments, the second resonant peak of the sensor device 500 may "disappear" due to over-damping, thus affecting the sensitivity of the sensor device 500 at mid-to-low frequencies.

Exemplarily, for the sensor device 700 filled with liquid and a bubble, when the bubble does not cover the transducer unit (e.g., a piezoelectric transducer), the sensitivity of the sensor device 700 increases as the volume of the bubble increases.

In some embodiments, a ratio of the volume of the bubble to the volume of the liquid may be 5%-90%. In some embodiments, a ratio of the volume of the bubble to the volume of the liquid may be 10%-80%. In some embodiments, a ratio of the volume of the bubble to the volume of the liquid may be 20%-60%. In some embodiments, a ratio of the volume of the bubble to the volume of the liquid may be 30%-50%.

In some embodiments, the bubble may be located at different locations in the sensor device 700. For example, the bubble may be located inside the liquid. As another example, the bubble may be located between the liquid and the housing. In some embodiments, the transducer unit 720 within the accommodating cavity may separate the accommodating cavity to form a front cavity and a rear cavity located on opposite sides of the vibration pickup structure. In the present disclosure, the rear cavity refers to an enclosed or semi-enclosed space formed by a substrate of the transducer unit and the vibration pickup structure (e.g., a cantilever beam). For example, taking a bone-conduction microphone as an example, the accommodating cavity may be divided into a front cavity and a rear cavity by taking a plane where the cantilever beam is located as a division plane. For the sensor device 700 filled with the liquid and the bubble, when the bubble is located in the front cavity of the sensor device and is not in contact with the transducer unit (e.g., the vibration pickup structure), the sensitivity increases gradually as a count of bubbles increases.

In some embodiments, for the sensor device 700 filled with liquid and a bubble, when bubbles of a certain size are provided in both the front cavity and the rear cavity, a large gain can be achieved in a low-frequency part, and the Q value of the resonant peak of the sensor device 700 can be effectively suppressed in a middle frequency without suppressing the sensitivity of other regions other than a region corresponding to the resonant peak of the sensor device 700, thereby making the frequency response of the sensor device 700 relatively flat in the low to the middle frequency range.

In some embodiments, a ratio of the volume of the bubble in the front cavity to the volume of liquid in the front cavity and a ratio of the volume of the bubble in the rear cavity to the volume of liquid in the rear cavity may be 5%-95%. In some embodiments, a ratio of the volume of the bubble in the front cavity to the volume of liquid in the front cavity and a ratio of the volume of the bubble in the rear cavity to the volume of liquid in the rear cavity may be 10%-80%. In some embodiments, a ratio of the volume of the bubble in the front cavity to the volume of liquid in the front cavity and a ratio of the volume of the bubble in the rear cavity to the volume of liquid in the rear cavity may be 20%-60%. In some embodiments, a ratio of the volume of the bubble in the front cavity to the volume of liquid in the front cavity and a ratio of the volume of the bubble in the rear cavity to the volume of liquid in the rear cavity may be 30%-50%.

It should be noted that the above description of the frequency response curve of the sensor device 500 or the sensor device 700 is only an exemplary description and does not limit the present disclosure to the scope of the cited embodiments. It may be understood that those skilled in the art, after understanding the principle of the system, may make arbitrary amendments to its structure and combination without departing from this principle. Such variations are within the scope of protection of the present disclosure.

Figure 10:
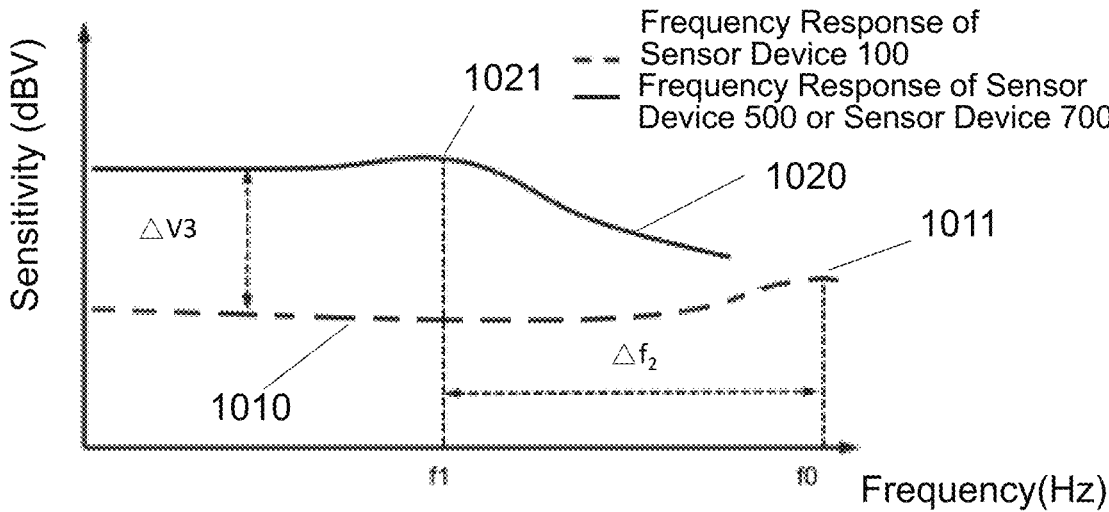
FIG. 10 is a diagram illustrating an exemplary frequency response curve of a sensor device 500 or a sensor device 700 according to some embodiments of the present disclosure.

FIG. 10 is a diagram illustrating an exemplary frequency response curve of a sensor device 500 or a sensor device 700 according to some embodiments of the present disclosure.

As shown in FIG. 10, a dotted line 1010 indicates a frequency response curve of a sensor device without an equivalent resonant system, and a solid line 1020 indicates a frequency response curve of the sensor device 500 or the sensor device 700. The frequency response curve 1010 includes a resonant peak 1011. In some embodiments, the sensor device without the equivalent resonant system corresponds to a higher resonant frequency that is not in the required frequency band (e.g., 100-5000 Hz, 500-7000 Hz, etc.). In some embodiments, a resonant frequency corresponding to the sensor device without the equivalent resonant system may be in a higher frequency band. For example, in some embodiments, the resonant frequency of the sensor device without the equivalent resonant system is higher than 7000 Hz. In some embodiments, the resonant frequency of the sensor device without the equivalent reso-
nant system is higher than 10000 Hz. In some embodiments,
the resonant frequency of the sensor device without the
equivalent resonant system is higher than 12000 Hz. Cor-
respondingly, the sensor device without the equivalent reso-
nant system may have a higher stiffness at this time, which
also brings higher anti-impact strength and reliability to the
sensor device.

The frequency response curve 1020 includes a first (or
third) resonant peak 1021 (not shown in the figure) and a
second (or fourth) resonant peak 1021. In some embodi-
ments, the frequency corresponding to the first (or third)
resonant peak is close to or the same as the corresponding
resonant frequency in the frequency response curve 1010. In
some embodiments, the frequency response curve 1020 is
substantially the same as the frequency response curve 920
in FIG. 9, except that the first (or third) resonant peak is
shifted to the right. The frequency corresponding to the
second (or fourth) resonant peak 1021 is in the same or
similar frequency range as the frequency corresponding to
the second (or fourth) resonant peak 922 in FIG. 9.

In some embodiments, in the required frequency range
(e.g., within 2000 Hz, within 3000 Hz, within 5000 Hz, etc.),
a difference between the maximum value and the minimum
value of sensitivity in the frequency response curve 1020
should be maintained within a certain range to ensure the
stability of the frequency response of the sensor device 500
or the sensor device 700. In some embodiments, in a
required frequency range, a difference between the maxi-
mum value and the minimum value of the sensitivity is not
higher than 40 dBV, and a ratio of the difference of sensi-
tivity to the maximum value of sensitivity is not more than
0.3. In some embodiments, in a required frequency range, a
difference between the maximum value and the minimum
value of the sensitivity is not higher than 30 dBV, and a ratio
of the difference of sensitivity to the maximum value of
sensitivity is not more than 0.25. In some embodiments, in
a required frequency range, a difference between the maxi-
mum value and the minimum value of the sensitivity is not
higher than 20 dBV, and a ratio of the difference of sensi-
tivity to the maximum value of sensitivity is not more than
0.15. In some embodiments, in a required frequency range,
a difference between the maximum value and the minimum
value of the sensitivity is not higher than 10 dBV, and a ratio
of the difference of sensitivity to the maximum value of
sensitivity is not more than 0.1.

In some embodiments, a difference between the resonant
frequencies corresponding to the first (or third) resonant
peak and the second (or fourth) resonant peak 1021 (a
frequency of the first (or third) resonant peak is indicated as
$f_0$ (close to resonant peak 1011), a frequency of the second
(or fourth) resonant peak 1021 is indicated as $f_1$, and a
difference between the resonant frequencies corresponding
to two resonant peaks is indicated as a frequency difference
$\Delta f_2$) is within a certain range. In some embodiments, the
frequency difference $\Delta f_2$ is within a range of 1000-8000 Hz,
and a ratio of the frequency difference $\Delta f_2$ to $f_0$ is within a
range of 0.2-0.8. In some embodiments, the frequency
difference $\Delta f_2$ is within a range of 1000-6000 Hz, and a ratio
of the frequency difference $\Delta f_2$ to $f_0$ is within a range of
0.2-0.65. In some embodiments, the frequency difference
$\Delta f_2$ is within a range of 2000-6000 Hz, and a ratio of the
frequency difference $\Delta f_2$ to $f_0$ is within a range of 0.3-0.65.
In some embodiments, the frequency difference $\Delta f_2$ is within
a range of 3000-5000 Hz, and a ratio of the frequency
difference $\Delta f_2$ to $f_0$ is within a range of 0.3-0.5. In some
embodiments, the frequency difference $\Delta f_2$ is within a range of 3000-4000 Hz, and a ratio of the frequency difference $\Delta f_2$
to $f_0$ is within a range of 0.3-0.4.

Compared with the frequency response curve 1010, the
frequency response curve 1020 has a higher and more stable
increase in sensitivity (i.e., a difference, expressed as $\Delta V3$)
in a frequency range within the resonant frequency $f_1$
corresponding to the second (or fourth) resonant peak 1021.
In some embodiments, the increase $\Delta V3$ is within a range of
10 dBV-60 dBV. In some embodiments, the increase $\Delta V3$ is
within a range of 10 dB V-50 dB V. In some embodiments,
the increase $\Delta V3$ is within a range of 15 dBV-50 dBV. In
some embodiments, the increase $\Delta V3$ is within a range of 15
dB V-40 dBV. In some embodiments, the increase $\Delta V3$ is
within a range of 20 dBV-40 dBV. In some embodiments, the
increase $\Delta V3$ is within a range of 25 dB V-40 dB V. In some
embodiments, the increase $\Delta V3$ is within a range of 30 dB
V-40 dB V.

For the sensor device 700, in some embodiments, the
frequency (i.e., the fourth resonant frequency) correspond-
ing to the fourth resonant peak 1021 is a mid-to-low fre-
quency and the frequency (i.e., the third resonant frequency)
corresponding to the third resonant peak is a mid-to-high
frequency. In some embodiments, a difference between the
minimum value of sensitivity of the frequency response
curve 1020 in the frequency range within the resonant
frequency $f_1$ and the peak value of the fourth resonant peak
is not greater than 30 dBV, and a ratio thereof is not greater
than 0.2. In some embodiments, a difference between the
minimum value of sensitivity of the frequency response
curve 1020 in the frequency range within the resonant
frequency $f_1$ and the peak value of the fourth resonant peak
is not greater than 20 dBV, and a ratio thereof is not less than
0.15. In some embodiments, a difference between the mini-
mum value of sensitivity of the frequency response curve
1020 in the frequency range within the resonant frequency
$f_1$ and the peak value of the fourth resonant peak is not
greater than 10 dBV, and a ratio thereof is not greater than
0.1.

In some embodiments, the frequency response of the
sensor device 500 or the sensor device 700 may be described
by one or more of related parameters of the curve 1020, such
as the peak value and frequency of the primary resonant
peak, the peak value and frequency of a secondary resonant
peak 1021, the Q value, $\Delta f_2$, $\Delta V3$, a ratio of $\Delta f_2$ to $f_0$, a ratio
of the maximum sensitivity to the minimum sensitivity in
the required frequency range, and first-order coefficients,
second-order coefficients, and third-order coefficients of an
equation determined by fitting the frequency response curve,
etc. In some embodiments, the frequency response of the
sensor device 500 or the sensor device 700 may be related
to the properties of the filled liquid and/or the parameters of
the transducer unit. In some embodiments, in order to obtain
a desirable output frequency response (e.g., the frequency
response curve 1020) of the sensor device 500 or the sensor
device 700, the ranges of various parameters (also referred
to as frequency response influencing factors, including prop-
erties of the filled liquid and/or the parameters of the
transducer unit) described above that affects the frequency
response may be determined through computer simulation,
phantom experiments, etc., which is in the same or similar
manner as in FIG. 9 and may not be repeated here.

Figures 11, 12:
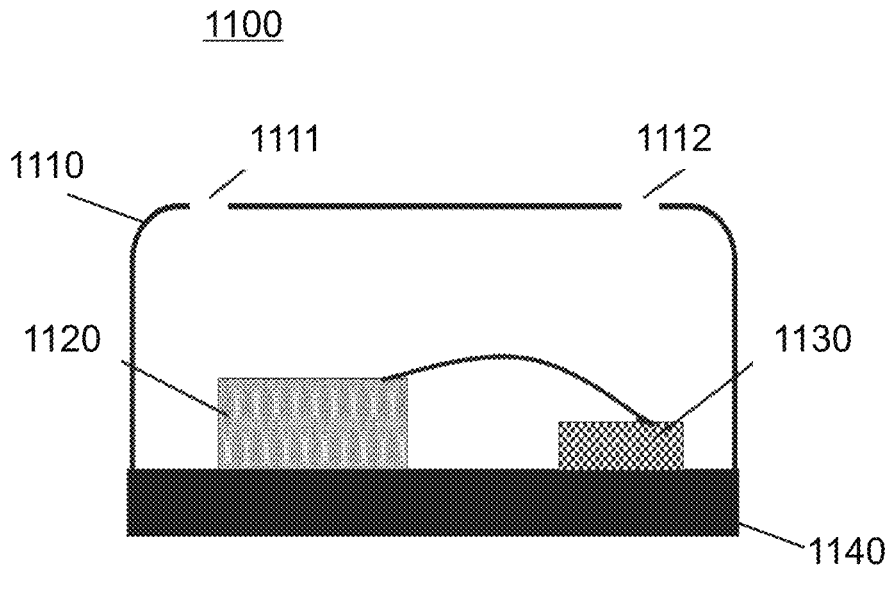
FIG. 11 is a schematic diagram illustrating a sensor device to be filled with liquid according to some embodiments of the present disclosure.
FIG. 12 is a schematic diagram illustrating an exemplary sensor device filled with liquid according to some embodiments of the present disclosure.

FIG. 11 is a schematic diagram illustrating a sensor device
to be filled with liquid according to some embodiments of
the present disclosure.

As shown in FIG. 11, a sensor device 1100 includes a
housing 1110, a transducer unit 1120, a processing circuit
1130, and a PCB 1140. At least one hole may be provided on an upper surface of the housing 1110 of the sensor device 1100. The hole may communicate the outside world with the accommodating cavity of the sensor device 1100. The liquid may be injected into the accommodating cavity of the sensor device 1100 through the at least one hole. In some embodiments, the at least one hole may include a liquid injection hole 1111 and a vent hole 1112. The liquid may be injected into the accommodating cavity of the sensor device 1100 through the liquid injection hole 1111. At the same time, the air in the accommodating cavity may be exhausted through the vent hole 1112, ensuring that the liquid can completely fill the accommodating cavity and ensuring that the transducer unit 1120 and the processing circuit 1130 are immersed in the liquid without bubbles. In some embodiments, the at least one hole may include only the liquid injection hole 1111. In a vacuum environment, the liquid is injected into the accommodating cavity of the sensor device 1100 through the liquid injection hole 1111, which also allows the liquid to completely fill the accommodating cavity, and allows the transducer unit 1120 and the processing circuit 1130 to be immersed in the liquid without bubbles.

In some embodiments, when the sensor device 1100 is filled with liquid without bubbles, at this time the sensor device 1100 is similar to the sensor device 500, since the liquid has a viscous effect which can increase the damping of the transducer unit 1120, the Q value of a resonant peak (also called a first resonant peak, i.e., a peak corresponding to an intrinsic resonant frequency of the transducer unit 1120) of the sensor device 1100 is reduced. In addition, since the liquid is not easy to compress and may be over-stiffened and over-damping, at this time the additional resonant peak (i.e., a second resonant peak) formed by adding the liquid corresponds to a relatively high frequency, which may be closer to the first resonant peak of the sensor device 1100, so there may be at least partial overlap of the first resonant peak and the second resonant peak. Therefore, the flatness of the frequency response curve is low.

In some embodiments, in a certain range, the Q value of the resonant peak corresponding to the transducer unit 1120 in the sensor device 1100 may be adjusted by adjusting (e.g., adjusting the density or viscosity by choosing the liquid with a different density and viscosity or adding a specific agent) the viscosity or density of the liquid filled in the sensor device 1100. For example, within a certain range, the higher the kinematic viscosity of the liquid, the lower the Q value. In some embodiments, the density of the liquid may be 0.6-2 kg/m$^3$. In some embodiments, the density of the liquid may be 0.6-1.4 kg/m$^3$. In some embodiments, the density of the liquid may be 0.7-1.1 kg/m$^3$. In some embodiments, the density of the liquid may be 0.8-1.0 kg/m$^3$. In some embodiments, the density of the liquid may be 0.85-0.95 kg/m$^3$. In some embodiments, the density of the liquid may be 0.9-0.95 kg/m$^3$. In some embodiments, the density of the liquid may be 0.93-0.95 kg/m$^3$.

In some embodiments, the kinematic viscosity of the liquid may be 0.1-5000 cst. In some embodiments, the kinematic viscosity of the liquid may be 0.1-1000 cst. In some embodiments, the kinematic viscosity of the liquid may be 0.5-500 cst. In some embodiments, the kinematic viscosity of the liquid may be 0.3-200 cst. In some embodiments, the kinematic viscosity of the liquid may be 50-200 cst.

In some embodiments, the liquid filled in the accommodating cavity may include one or more bubbles. The bubble(s) have a certain volume. For example, a ratio of the bubble(s) to the volume of the accommodating cavity of the sensor device 1100 may be, for example, any value in the range of 5% to 95%. The count of bubble(s) may be 1, 2, 3, 4, or more, which is not specifically limited in the present disclosure.

The bubble(s) may be in different locations in the sensor device 1100. Taking the bone-conduction microphone as an example, the cavity may be divided into a front cavity and a rear cavity using a plane where the cantilever beam is located as a division plane. In some embodiments, the bubble(s) may be in the front cavity. Exemplarily, the bubble(s) may be in the front cavity away from the cantilever beam, close to the cantilever beam, or attached to the cantilever beam. In some embodiments, the bubble(s) may be in the rear cavity. In other embodiments, the bubble(s) may be present in both the front cavity and the rear cavity. In some embodiments, to increase the stability of the sensor device, the bubble(s) may be located between the housing 1110 and the liquid. More descriptions of the bubble(s) being located between the housing and the liquid may be found in FIG. 25A-FIG. 25D, etc., and their descriptions thereof.

The bubbles may be formed by air that has not been discharged from the accommodating cavity. For example, when a volume of the filled liquid is less than the volume of the accommodating cavity, a bubble may be left in the accommodating cavity. In some embodiments, the bubble may be formed by encapsulating the gas in an airbag. For example, the airbag may be a closed bag formed by a film-like material (e.g., a polyester film, a nylon film, a plastic film, a composite film, etc.) itself or with components inside the housing or sensor device 1100, and the closed bag is filled with gas. The size and shape of the airbag may be set according to a required volume of the bubble, the volume and shape of the accommodating cavity, and/or a location where the airbag is located. In some embodiments, the bubble may also be formed by providing a hydrophobic material on the inner surface of the containment cavity or on the surface of the components inside it. The bubble is attached to the surface of the hydrophobic material. For example, a portion of the inner surface of the accommodating cavity or a portion of the surface of the internal component may be provided with a superhydrophobic coating. The superhydrophobic coating may be made of fluorinated polymers (such as polytetrafluoroethylene (PTFE), fluorinated ethylene propylene (FEP) copolymers, ethylene and tetrafluoroethylene (ETFE) copolymers, tetrafluoroethylene and perfluoroalkyl vinyl ether (PFAVE) copolymers), high polymer melt (such as polyolefins, polycarbonates, polyamides, polyacrylonitrile, polyesters, non-fluorinated acrylic esters, and molten paraffin), etc., using a specific manufacturing process. The gas in the bubble may be air, oxygen, nitrogen, inert gas, etc., or any combination thereof. In some embodiments, since the air cavity has a certain elastic characteristic after being filled with gas, and the elastic characteristic is related to the air pressure in the air cavity, the equivalent stiffness of the air cavity may be changed by changing the air pressure in the bubble, thereby changing the performance of the second resonant system.

After the sensor device 1100 is filled with liquid and the bubble, the sensor device 1100 may be similar to the sensor device 700 at this time. Since the bubble is easy to compress and has a small stiffness, a combined stiffness of the liquid and the bubble is relatively small, the resonant frequency (also called the fourth resonant frequency) corresponding to the resonant peak (also called the fourth resonant peak) of the second resonant system formed by the liquid and the bubble in the sensor device 1100 is relatively low, a difference between the fourth resonant frequency and the intrinsic resonant frequency (also known as the third resonant frequency) of the transducer unit 1120 of the sensor device 1100 is relatively large, and a final output performance of the sensor device 1100 can effectively be controlled. Therefore, the overall sensitivity of the sensor device 1100 is greatly increased, the frequency response curve of the sensor device 1100 is relatively flat, and an effective bandwidth (satisfying a condition of flat frequency response) of the frequency response curve may cover a relatively large range. In some embodiments, by adjusting the proportion of the volume of the bubble to the volume of the liquid in the sensor device 1100, the location of the fourth resonant peak may be adjusted, so that the third resonant peak and the fourth resonant peak are in a certain frequency band range, and thus the frequency response curve of the sensor device 1100 may be optimized to be flatter.

After the liquid or the liquid and the bubble are filled in the accommodating cavity (e.g., the front cavity), the hole on the upper surface of the housing 1110 may be sealed. In some embodiments, the hole may be sealed using a sealing member. The sealing member may include, for example, a plug, a screw, a tape, etc. In some embodiments, the hole is a circular threaded hole. The sealing member may seal the at least one hole through threaded connection.

FIG. 12 is a schematic diagram illustrating an exemplary sensor device filled with liquid according to some embodiments of the present disclosure.

As shown in FIG. 12, a sensor device 1200 may be a bone-conduction microphone filled with liquid. The sensor device 1200 includes a housing 1210, a transducer unit 1220, a processing circuit 1230, and a PCB substrate 1240. The accommodating cavity of the housing 1210 is filled with liquid 1250. The transducer unit 1220 includes a piezoelectric layer 1221. The transducer unit 1220 and the processing circuit 1230 are connected to each other by leads 1260. In some embodiments, the structure of the sensor device 1200 and the internal components therein are the same as or similar to the sensor device 500, which may not be repeated here. A metal housing of the sensor device 1200 is provided with at least one hole (not shown in the figure). The liquid 1250 (e.g., the silicone oil) may be filled into the cavity inside the sensor device 1200 through the at least one hole.

In some embodiments, the housing 1210 may be made of metal, plastic, glass, etc. In some embodiments, the housing 1210 may be made of a transparent material. Through the transparent housing, the internal accommodating cavity of the sensor device 1200 may be observed to see if it is filled with liquid, if there are bubbles, etc.

It should be noted that the above description of the sensor device 1200 is merely the exemplary description, and does not limit the present disclosure to the scope of the cited embodiments. It may be understood that for those skilled in the art, after understanding the principle of the system, it may be possible to make any combination of its structure, modules, or form the sub-system to connect with other modules without departing from the principle. For example, the first resonant system 530 or the second resonant system 740 in the form of the liquid or the liquid and the bubble may also be incorporated into an audio output device, such as a speaker, to improve the frequency response of the speaker.

Figure 13:
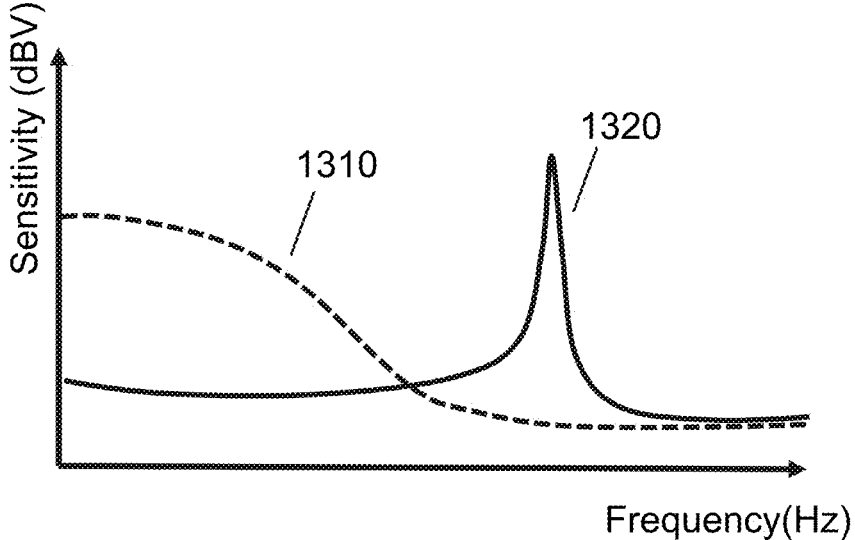
FIG. 13 is diagram illustrating frequency response curves of a sensor device before and after partially filled with liquid according to some embodiments of the present disclosure.

FIG. 13 is diagram illustrating frequency response curves of a sensor device before and after partially filled with liquid according to some embodiments of the present disclosure.

As shown in FIG. 13, a frequency response curve 1310 represents a frequency response curve of a sensor device (e.g., the sensor device 1200) filled with liquid (e.g., silicone oil with a kinematic viscosity of 0.65 cst). A frequency response curve 1320 represents a frequency response curve of a sensor device when only a portion of the liquid remains (e.g., an oil membrane exists) after the liquid in the sensor device is pumped out. In some embodiments, the front cavity of the sensor device is completely filled with liquid and the rear cavity is partially filled with liquid. A volume of the liquid filled in the rear cavity may be 1% to 90% of a volume of the liquid filled in the front cavity.

It may be seen that when the sensor device is completely filled with liquid (e.g., the front cavity is completely filled with liquid and the rear cavity is partially filled with liquid), compared with only a portion of the liquid remaining (e.g., an oil membrane existing), the sensitivity of the sensor device has a significant and stable increase in a frequency band (e.g., in a frequency band less than 7000 Hz, 5000 Hz, 3000 Hz, 1000 Hz, or 500 Hz) before a low frequency, a mid-to-low frequency, or a mid-to-high frequency. In some embodiments, the increase in sensitivity may reach 10-50 dBV. In some embodiments, the increase in sensitivity may reach 10-30 dBV. In some embodiments, the increase in sensitivity may reach 20-30 dBV.

Although the sensitivity of the sensor device is greatly increased after being filled with liquid, it is in an over-damping or over-stiffened state, so the vicinity of a middle frequency is excessively suppressed, the frequency response curve drops rapidly, and the peak at the intrinsic resonant frequency of the transducer unit in the sensor device is suppressed. To avoid an excessive suppression at a middle frequency caused by over-damping, a certain volume of bubbles may be retained in the housing. The second resonant system 740 formed by the liquid and the bubble may have less stiffness or less damping relative to the first resonant system 530 filled with liquid (e.g., silicone oil), which may alleviate the suppression of the middle frequency.

Figure 14:
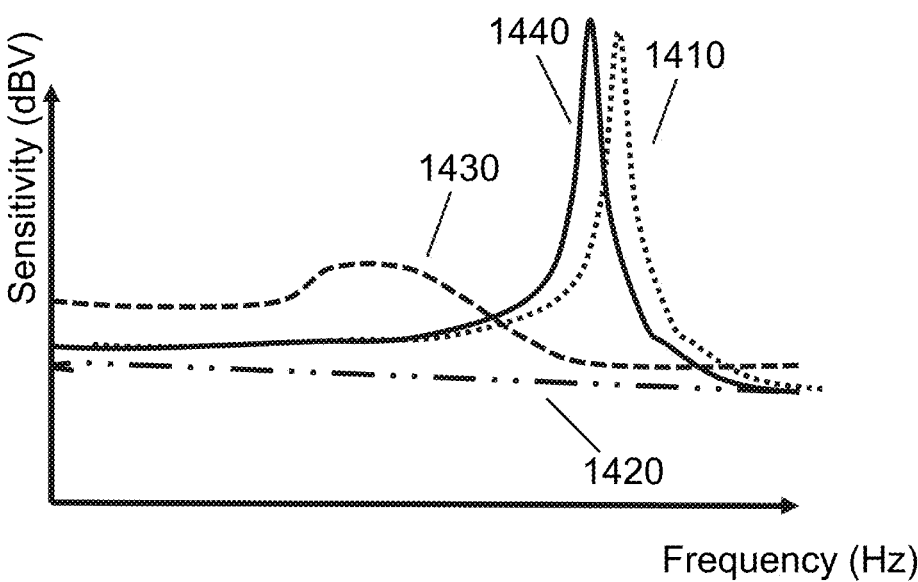
FIG. 14 is a diagram illustrating frequency response curves of a sensor device with a small-sized accommodating cavity before and after being filled with liquid according to some embodiments of the present disclosure.

FIG. 14 is a diagram illustrating frequency response curves of a sensor device with a small-sized accommodating cavity before and after being filled with liquid according to some embodiments of the present disclosure.

The sensor device (e.g., the sensor device 1200) is formed by filling the accommodating cavity of the sensor device (e.g., the sensor device 1100) with liquid. In the embodiment, the accommodating cavity of the sensor device is a small-sized accommodating cavity. In some embodiments, a length, a width, and a height of the accommodating cavity of the sensor device are 0.5-10 mm, 0.5-10 mm, and 0.3-10 mm, respectively. In some embodiments, the length, the width, and the height of the accommodating cavity of the sensor device are 2-10 mm, 2-10 mm, and 0.5-10 mm, respectively. In some embodiments, the length, the width, and the height of the accommodating cavity of the sensor device are 2-10 mm, 2-10 mm, and 0.5-5 mm. In some embodiments, the length, the width, and the height of the accommodating cavity of the sensor device are 3-10 mm, 2-8 mm, and 0.8-5 mm, respectively.

Exemplarily, in the embodiment, the accommodating cavity of the sensor device has a smaller size: 3.76 mm×2.95 mm×0.8-0.85 mm. As shown in FIG. 14, the frequency response curve 1410 is a frequency response curve of the sensor device with the accommodating cavity unfilled with liquid. The frequency response curve 1420 is a frequency response curve of the sensor device with the accommodating cavity filled with liquid (e.g., the silicone oil with a kinematic viscosity of 0.65 cst). The frequency response curve 1430 is a frequency response curve of the sensor device when only the rear cavity is partially filled with liquid. The frequency response curve 1440 is the frequency response curve of the sensor device with only the oil membrane remaining on the surface of the transducer unit (e.g., a cantilever beam).

According to the frequency response curves 1410-1440, it may be seen that for the small-sized accommodating cavity, complete filling of liquid (corresponding to curve 1420) does not result in an increase in the sensitivity of the sensor device. When the small-sized accommodating cavity is filled with the liquid, the additional resonant frequency of the liquid is relatively high, so the liquid cannot resonant before the intrinsic resonant frequency (the first resonant frequency or the third resonant frequency) of the transducer unit. In addition, the introduction of the liquid also leads to an increase of additional stiffness and damping, which suppresses the vibration of the transducer unit and reduces the output of the sensor device. When only a portion of the liquid remains in the rear cavity (corresponding to curve 1430), it may be considered that a relatively large bubble is introduced into the accommodating cavity of the sensor device. Since the bubble is easy to compress and has a small stiffness, a combined stiffness of the liquid and the bubble is relatively small, the resonant frequency (also called the fourth resonant frequency) corresponding to the resonant peak (also called the fourth resonant peak) of the second resonant system formed by the liquid and the bubble in the sensor device is relatively low, and a difference between the fourth resonant frequency and the intrinsic resonant frequency (also known as the third resonant frequency) of the transducer unit of the sensor device is relatively large, so that the sensitivity of the sensor device is greatly improved in a relatively wide range of frequency band.

Figure 15:
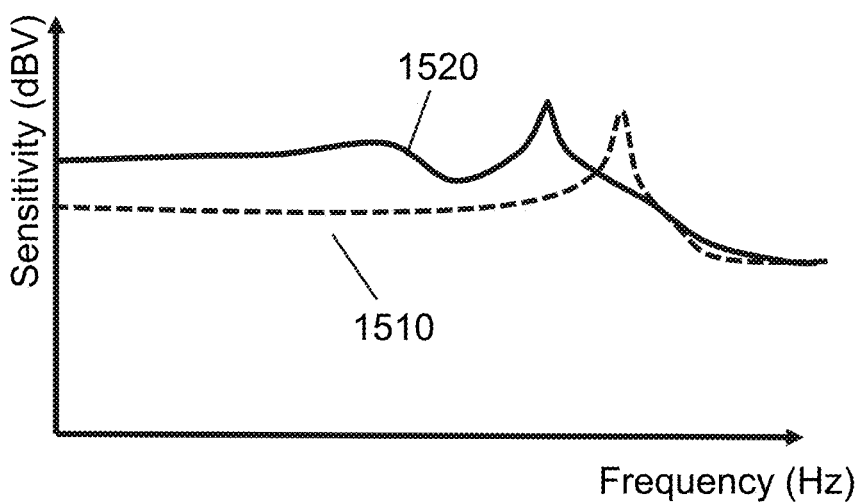
FIG. 15 is a diagram illustrating frequency response curves of a sensor device with a large-sized accommodating cavity that is not filled with liquid and partially filled with liquid or that there is an oil membrane in the accommodating cavity according to some embodiments of the present disclosure.

FIG. 15 is a diagram illustrating frequency response curves of a sensor device with a large-sized accommodating cavity that is not filled with liquid and partially filled with liquid or that there is an oil membrane in the accommodating cavity according to some embodiments of the present disclosure.

The sensor device (e.g., the sensor device 1200) is formed by filling the accommodating cavity of the sensor device (e.g., the sensor device 1100) with the liquid. In the embodiment, the accommodating cavity of the sensor device is a large-sized accommodating cavity. In some embodiments, a length, a width, and a height of the accommodating cavity of the sensor device are 1-30 mm, 1-30 mm, and 0.5-30 mm, respectively. In some embodiments, the length, the width, and the height of the accommodating cavity of the sensor device are 2-30 mm, 2-30 mm, and 1-30 mm, respectively. In some embodiments, the length, the width, and the height of the accommodating cavity of the sensor device are 5-10 mm, 5-10 mm, and 1-10 mm, respectively. In some embodiments, the length, the width, and the height of the accommodating cavity of the sensor device are 8-10 mm, 5-10 mm, and 1-5 mm, respectively. Optionally, the accommodating cavity of the sensor device has a larger dimension. In some embodiments, the length, the width, and the height of the accommodating cavity of the sensor device are 10-200 mm, 10-100 mm, and 10-100 mm, respectively. In some embodiments, the length, the width, and the height of the accommodating cavity of the sensor device are 10-100 mm, 10-50 mm, and 10-50 mm, respectively. In some embodiments, the length, the width, and the height of the accommodating cavity of the sensor device are 10-50 mm, 10-50 mm, and 10-50 mm, respectively. Exemplarily, in the embodiment, the accommodating cavity of the sensor device has a relatively large size: 10 mm×7 mm×1-4 mm.

As described above, a sensor device having a small-sized accommodating cavity filled with the silicone oil may be in the over-damping or over-stiffened state, its middle frequency is excessively suppressed, the frequency response curve drops rapidly, and the resonant peak at the resonant frequency corresponding to the sensor device that is not filled with the liquid is completely suppressed. By increasing the size of the accommodating cavity, the output of the sensor device at the middle frequency may be enhanced, and the frequency response suppression effect of the liquid on the sensor device at the mid-frequency may be reduced, thereby making the frequency response curve of the sensor device flatter.

As shown in FIG. 15, a frequency response curve 1510 and a frequency response curve 1520 respectively represent frequency response curves when a large-size accommodating cavity that is not filled with the liquid and partially filled with the liquid (e.g., the silicone oil with a kinematic viscosity of 0.65 cst) or that there is an oil membrane in the accommodating cavity.

It may be seen that when the accommodating cavity is partially filled with the liquid or has the oil membrane inside (corresponding to the curve 1520), there is some increase in the sensitivity of the frequency response of the sensor device relative to the accommodating cavity that is not filled with the liquid (corresponding to the curve 1510). In some embodiments, the increase is 10-40 dBV. In some embodiments, the increase is 10-30 dBV. In some embodiments, the increase is 10-20 dBV. In some embodiments, the increase is about 15 dBV.

Figure 16:
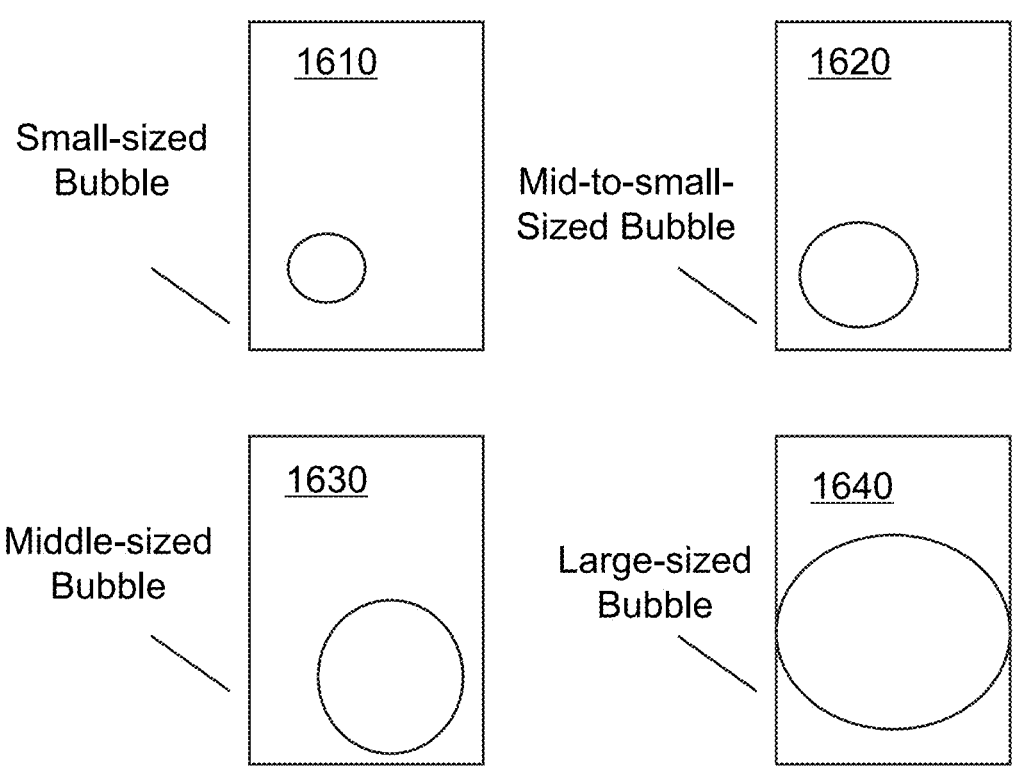
FIG. 16 is a schematic diagram illustrating a sensor device filled with liquid and a bubble according to some embodiments of the present disclosure.

FIG. 16 is a schematic diagram illustrating a sensor device filled with liquid and a bubble according to some embodiments of the present disclosure.

Since the bubble has gas (e.g., air) inside, and the stiffness, mass, and damping of the gas differ significantly from the stiffness, mass, and damping of the liquid, the second resonant system 740 (i.e., an additional spring-mass-damping system) of the sensor device (e.g., the sensor device 1200) may be adjusted by controlling the size and location of the introduced bubble, thereby effectively controlling the final output performance of the sensor device, so that the frequency response can be relatively flat (e.g., a fluctuation of the valley is less than 5 dBV, 10 dBV, 15 dBV, etc.), an effective bandwidth (satisfying the flatness condition) covers a certain range (e.g., 20 Hz-8K Hz), and the overall sensitivity is improved to a certain extent (e.g., 10-50 dBV).

In the embodiment, the accommodating cavity of the sensor device is a large-sized accommodating cavity. In some embodiments, a size of the accommodating cavity may be 10 mm×7 mm×1-4 mm. Exemplarily, a size of the accommodating cavity of the sensor device is 10 mm×7 mm×1 mm.

In some embodiments, the bubble may have different sizes, and the bubble may be at different the locations within the accommodating cavity of the sensor device. As shown in FIG. 16, the bubble may be a small-sized bubble (e.g., a ratio of the volume of the bubble to the volume of the accommodating cavity is 10% or less), a middle-sized bubble, or a large-sized bubble (e.g., a ratio of the volume of the bubble to the volume of the accommodating cavity is 10% to 90%), etc. The location of the bubble may be in the front cavity (away from the cantilever beam, close to or attached to the cantilever beam, etc.), the rear cavity, or both the front cavity and rear cavity of the accommodating cavity of the sensor device. More details regarding different locations of the bubble may be found elsewhere in the specification of the present disclosure, such as FIG. 18A-FIG. 18D and their descriptions.

Merely by way of example, as shown in FIG. 16, in a sensor device 1610, the accommodating cavity is filled with the liquid, a small-sized bubble is in the corner, the volume of the bubble is about 2%-10% of the volume of the liquid, and there is no bubble close to the transducer unit (e.g., a cantilever beam). In a sensor device 1620, the accommodating cavity is filled with the liquid, the volume of the bubble is about 10%-20% of the volume of the liquid, the bubble does not cover any area of the transducer unit, at this time the transducer unit is completely infiltrated by the silicone oil. In a sensor device 1630, the accommodating cavity is filled with liquid, the volume of the bubble is about 20%-50% of the volume of the liquid, and the bubble does not cover any area of the transducer unit, at this time the transducer unit is completely infiltrated by the silicone oil. In a sensor device 1640, the accommodating cavity is filled with the liquid, and the volume of the bubble is about 50%-90% of the volume of the liquid, the bubble does not cover any area of the transducer unit, at this time the transducer unit is not completely infiltrated by the silicone oil.

Figure 17:
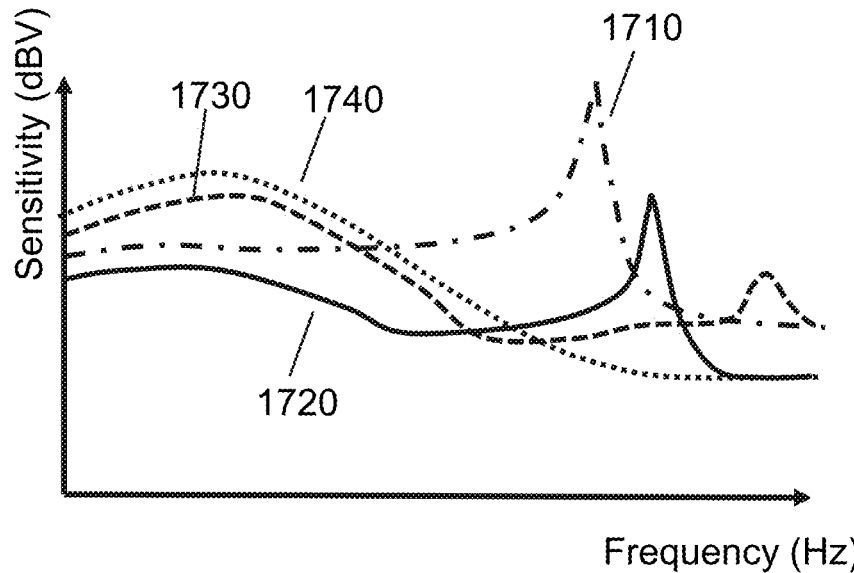
FIG. 17 is a frequency response curve diagram of a sensor device with an accommodating cavity filled with liquid containing a bubble of different sizes according to some embodiments of the present disclosure.

FIG. 17 is a frequency response curve diagram of a sensor device with an accommodating cavity filled with liquid containing a bubble of different sizes according to some embodiments of the present disclosure.

In the embodiment, the accommodating cavity of the sensor device (e.g., the sensor device 1200) is a large-sized accommodating cavity. In some embodiments, a dimension of the accommodating cavity may be 10 mm×7 mm×1-4 mm. Exemplarily, a dimension of the accommodating cavity of the sensor device is 10 mm×7 mm×1 mm.

As shown in FIG. 17, a curve 1710 represents a frequency response curve of a sensor device (e.g., the sensor device 1100) that is not filled with the silicone oil. A curve 1720 represents a frequency response curve of a sensor device filled with the liquid containing a small-sized bubble as shown in FIG. 16. A curve 1730 represents a frequency response curve of a sensor device filled with the liquid containing a mid-to-small-sized bubble as shown in FIG. 16. A curve 1740 represents a frequency response curve of a sensor device filled with the liquid containing a middle-sized bubble as shown in FIG. 16.

In conjunction with the frequency response curves 1710-1740, it may be seen that when the bubble does not cover the transducer unit (e.g., a piezoelectric transducer), as the volume of the bubble increases, the sensitivity of the sensor device increases. For example, compared with the sensor device containing a small-sized bubble (corresponding to curve 1720), an increase in sensitivity of the sensor device containing a mid-to-small-sized bubble (corresponding to the curve 1730) in a frequency band (e.g., in a frequency band less than 7000 Hz, 5000 Hz, 3000 Hz, 1000 Hz, or 500 Hz) before a low frequency, a mid-to-low frequency, or a mid-to-high frequency is about 5-30 dBV. In some embodiments, there is a low-frequency roll-off phenomenon in a lower frequency range (such as a frequency band below 5000 Hz, below 3000 Hz, below 500 Hz, or below 200 Hz). Compared with the sensor device containing a mid-to-small-sized bubble (corresponding to the curve 1730), an increase in sensitivity of the sensor device containing a middle-sized bubble (corresponding to the curve 1740) in a frequency band (e.g., in a frequency band less than 7000 Hz, 5000 Hz, 3000 Hz, 1000 Hz, or 500 Hz) before a low frequency, a mid-to-low frequency, or a mid-to-high frequency is about 5-30 dBV.

FIG. 18A-FIG. 18D are schematic diagrams illustrating sensor devices with bubbles at different locations in filled liquid according to some embodiments of the present disclosure.

Figure 18A:
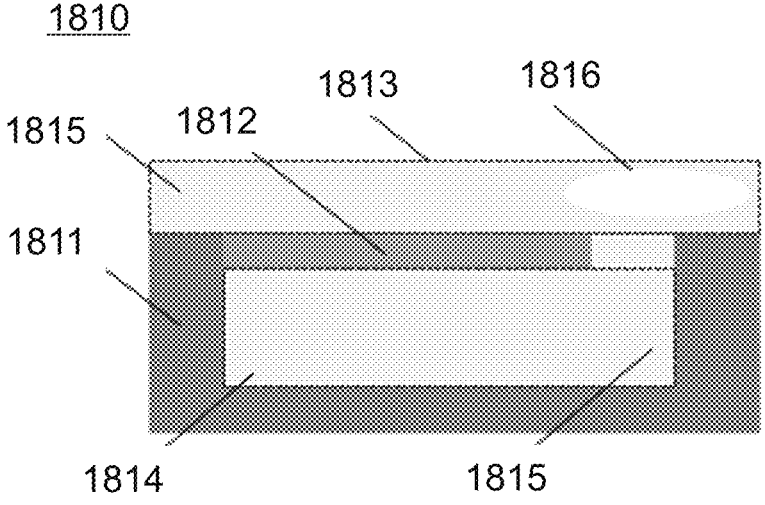
FIG. 18A-FIG. 18D are schematic diagrams illustrating sensor devices with bubbles at different locations in filled liquid according to some embodiments of the present disclosure.

As shown in FIG. 18A, taking the sensor device is a bone-conduction microphone 1810 as an example, a transducer unit 1812 may include a cantilever beam. An accommodation cavity of the bone-conduction microphone 1810 may be divided into a front cavity 1813 and a rear cavity 1814 by using a plane where the transducer unit 1812 is located as a division plane. In some embodiments, a space formed by a substrate 1811 and the plane where the transducer unit 1812 is located may form the rear cavity 1814. In some embodiments, a space formed by the substrate 1811, the plane where the transducer unit 1812 is located, and a portion of the housing of the sensor device 1810 may form the rear cavity. The front cavity 1813 may be a space of the accommodating cavity of the bone-conduction microphone 1810 other than the rear cavity 1814.

The front cavity 1813 and the rear cavity 1814 in FIG. 18A are filled with liquid 1815. A bubble 1816 is located in the front cavity 1813 and away from the transducer unit 1812. The bubble 1816 may be located in the middle or in the corner of the front cavity 1813. The bubble 1816 may be a small-sized bubble (e.g., a ratio of a volume of the bubble to a volume of the front cavity is 10% or less), a middle-sized bubble, or a large-sized bubble (e.g., a ratio of the volume of the bubble to the volume of the front cavity volume is 10% to 90%), etc.

Figure 18B:
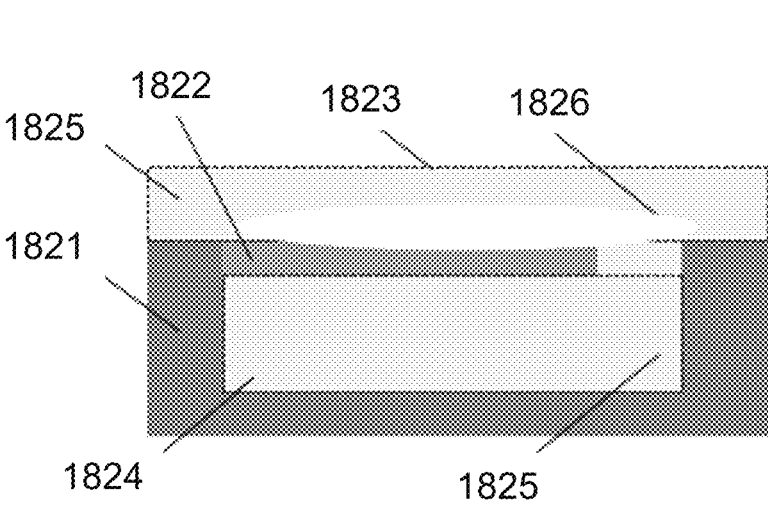

The structure of a bone-conduction microphone 1820 in FIG. 18B is similar to the structure of the bone-conduction microphone in FIG. 18A. A substrate 1821 and a transducer unit 1822 form a rear cavity 1824. The space in the accommodating cavity of the bone-conduction microphone 1820 other than the rear cavity 1824 is a front cavity 1823. Both the front cavity 1823 and the rear cavity 1824 are filled with liquid 1825. The bubble 1826 is located in the front cavity 1823 and is attached to or adjacent to the transducer unit 1822. The bubble 1826 may be a small-sized bubble (e.g., a ratio of a volume of the bubble to a volume of the front cavity is 10% or less), a middle-sized bubble, or a large-sized bubble (e.g., a ratio of the volume of the bubble to the volume of the front cavity volume is 10% to 90%), etc.

Figure 18C:
Figure 18C:
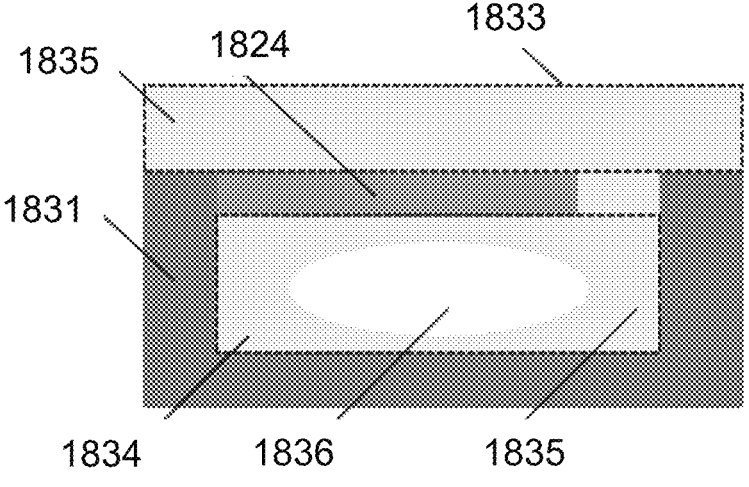

The structure of a bone-conduction microphone 1830 in FIG. 18C is similar to the structure of the bone-conduction microphone in FIG. 18A or FIG. 18B. A substrate 1831 and a transducer unit 1832 form a rear cavity 1834. The space in the accommodating cavity of the bone-conduction microphone 1830 other than the rear cavity 1834 is a front cavity 1833. Both the front cavity 1833 and the rear cavity 1834 are filled with liquid 1835. The bubble 1836 is located in the rear cavity 1834. The bubble 1836 may be located in the middle or the corner of the rear cavity 1834. The bubble 1836 may be a small-sized bubble (e.g., a ratio of a volume of the bubble to a volume of the rear cavity is 10% or less), a middle-sized bubble, or a large-sized bubble (e.g., a ratio of the volume of the bubble to the volume of the rear cavity volume is 10% to 90%), etc.

Figure 18D:
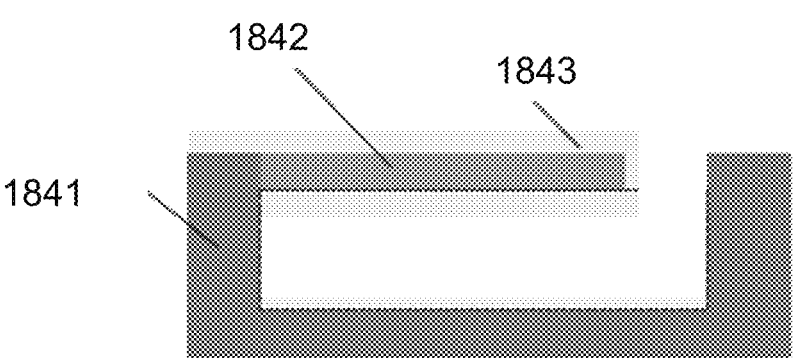

The structure of a bone-conduction microphone 1840 in FIG. 18D is similar to the structure of the bone-conduction microphone in FIG. 18A, FIG. 18B, or FIG. 18C. A substrate 1841 and a transducer unit 1842 form a rear cavity. At this point, in the accommodating cavity of the bone-conduction microphone 1840, only the transducer unit 1842 has liquid 1843 (e.g., an oil membrane) attached to it. At this point, it may be seen that the bubble in the accommodating cavity of the bone-conduction microphone 1840 is relatively large (e.g., a ratio of the volume of the bubble to the volume of the cavity is more than 90%) and the filled liquid is little.

It should be noted that the above description of the sensor device is only exemplary description and does not limit the present disclosure to the scope of the embodiment cited. It may be understood that for those skilled in the art, after understanding the principle of the system, arbitrary amendments to its structure and combination may be made without departing from this principle. Such variations are within the scope of protection of the present disclosure. For example, the transducer units in FIG. 18A to FIG. 18D may also include a vibrating membrane. The plane where the vibrating membrane is located may separate the accommodating cavity into the front cavity and the rear cavity. For example, the transducer units in FIG. 18A to FIG. 18D may also include simultaneously a piezoelectric beam and a vibrating membrane (e.g., a transducer unit 2520 shown in FIG. 28B).

Figure 19:
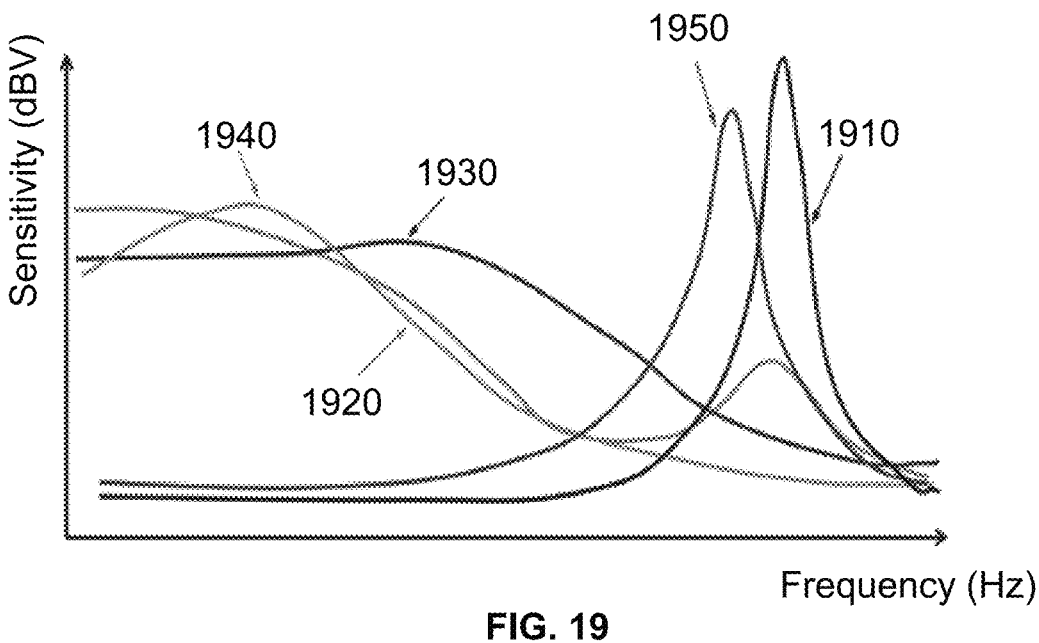
FIG. 19 is a frequency response curve diagram of a sensor device when a bubble in filled liquid is at different locations in an accommodating cavity of the sensor device according to some embodiments of the present disclosure.

FIG. 19 is a frequency response curve diagram of a sensor device when a bubble in filled liquid is at different locations in an accommodating cavity of the sensor device according to some embodiments of the present disclosure.

When the liquid filled in the accommodating cavity of the sensor device contains bubbles of different sizes, which corresponds to different spring (Km3, Km4)-mass (Mm4)-damping (Rm3, Rm4) systems, the output performance of the accommodating cavity of the sensor device has some differences.

As shown in FIG. 19, a curve 1910 represents a frequency response curve of a sensor device where the accommodating cavity is not filled with liquid (e.g., the sensor device 1100). A curve 1920 represents a frequency response curve of a sensor device where the front cavity is filled with liquid (e.g., silicone oil) and a relatively large-sized bubble, wherein the bubble is away from the transducer unit, and the rear cavity is filled with liquid. A curve 1930 represents a frequency response curve of a sensor device where the front cavity is the air and the rear cavity is the liquid. A curve 1940 represents a frequency response curve of a sensor device where both the front cavity and the rear cavity are filled with the liquid and the rear cavity has a bubble. A curve 1950 represents a frequency response curve of a sensor device where only the transducer unit is attached to a liquid membrane.

In conjunction with the frequency response curves 1910-1950, it may be seen that when the bubble is introduced, regardless of whether the bubble is located in the front cavity, the rear cavity, or is in contact with the transducer unit, the sensitivity of the sensor device may be increased to some extent (e.g. 10-60 dBV, 10-40 dBV, 15-40 dBV, etc.) in a frequency band (e.g., in a frequency band less than 7000 Hz, 5000 Hz, 3000 Hz, 1000 Hz, or 500 Hz) before a low frequency, a mid-to-low frequency, or a mid-to-high frequency. The magnitude of the increase in sensitivity is also related to the size and/or location of the bubble. For example, in conjunction with the frequency response curve 1920 and the frequency response curve 1930, it can be seen that when the bubble is in the front cavity and is not in contact with the transducer unit, as the size of the bubble increases, the sensitivity increases gradually.

Moreover, in addition to the gain of the sensitivity of the sensor device at the low frequency, the middle frequency, and the mid-to-high frequency, different combinations of the bubble and liquid have different effects on a higher frequency band. For example, when the rear cavity has the bubble, a less suppression effect in a relatively high frequency band may be obtained.

Figure 20:
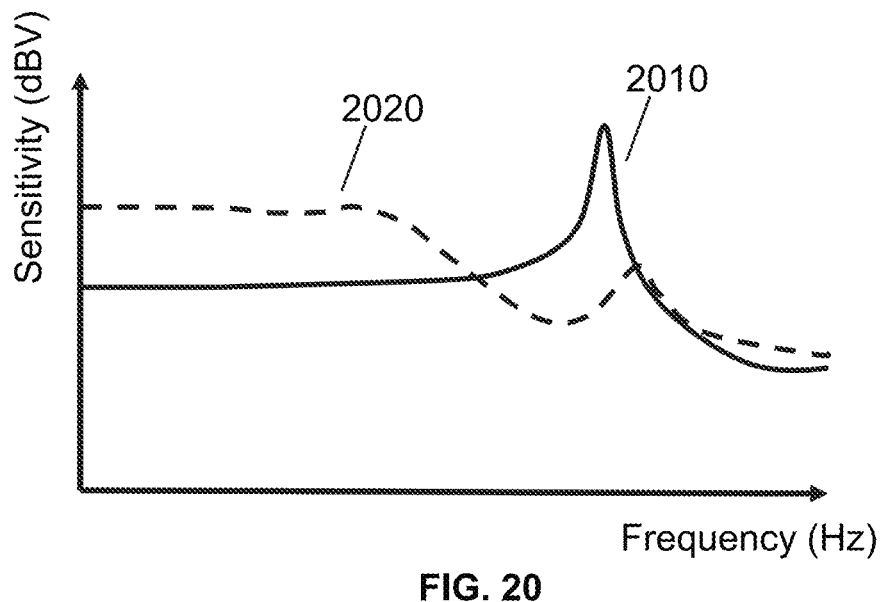
FIG. 20 is a frequency response curve diagram of a sensor device before and after being filled with liquid according to some embodiments of the present disclosure.

FIG. 20 is a frequency response curve diagram of a sensor device before and after being filled with liquid according to some embodiments of the present disclosure.

As shown in FIG. 20, a frequency response curve 2010 and a frequency response curve 2020 are respectively frequency response curves of a sensor device that is not filled with liquid (e.g., the sensor device 1100) and a sensor device filled with liquid and a bubble in the rear cavity.

In conjunction with the frequency response curve 2010 and the frequency response curve 2020, it can be seen that the sensor device filled with liquid has a resonant peak in a frequency band of 2000-20,000 Hz. Comparatively, the gain of the sensor device filled with the liquid and a bubble (e.g., a small-sized bubble (e.g., a ratio of the volume of the bubble to the volume of the rear cavity is 10% or less), a middle-sized bubble, or a large-sized bubble (e.g., a ratio of the volume of the bubble to the volume of the rear cavity is 10% to 90%), etc.) is introduced in the rear cavity is about 10-40 dBV in a frequency band (e.g., in a frequency band less than 7000 Hz, 5000 Hz, 3000 Hz, 1000 Hz, or 500 Hz) before a low frequency, a mid-to-low frequency, or a mid-to-high frequency. In some embodiments, the gain in the low frequency band is 20-25 dBV. The spring (Km3, 4)-mass (Mm4)-damping (Rm3, 4) system formed by the combination of the bubble and the liquid resonant in the low frequency band, causing a large gain increase of the sensor device in that frequency band. In addition, since the additional damping and stiffness of the spring (Km3, 4)-mass (Mm4)-damping (Rm3, 4) system has a suppression effect on the vibration of the sensor device, the Q value of the resonant peak (e.g., the first or third resonant peak) at the resonant frequency (here, is a middle frequency) of the corresponding sensor device is significantly reduced. Moreover, the characteristics of the additional spring (Km3, 4)-mass (Mm4)-damping (Rm3, 4) of the sensor device may be adjusted by adjusting the combination of the bubble and liquid, so that the resonant frequency (e.g., the first or third resonant frequency) of the sensor device is shifted forward or backward.

In some embodiments, by arranging bubbles of a certain size in both the front cavity and the rear cavity, a relatively large gain in the low-frequency may be achieved, and in the middle frequency, the Q value of the resonant peak (the first or third resonant peak) of the transducer unit in the sensor device may be suppressed without suppressing the sensitivity of other regions outside the resonant peak region.

Figure 21:
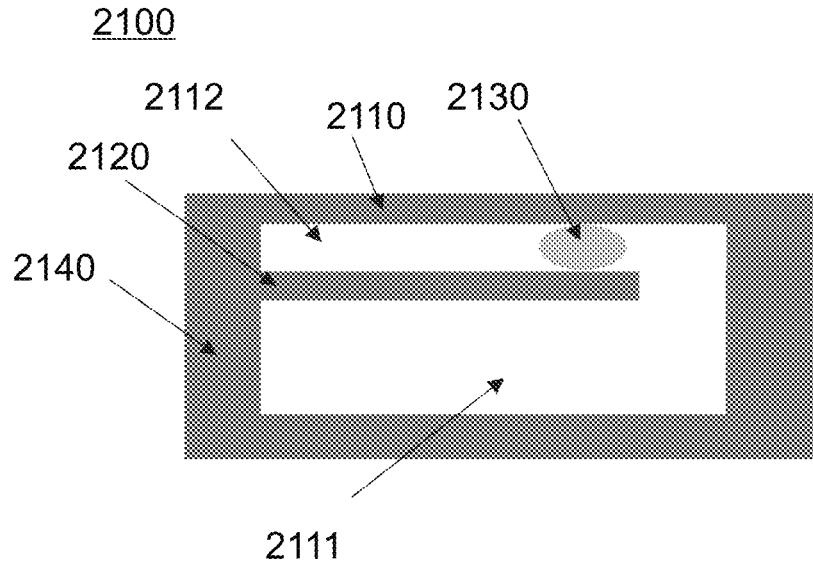
FIG. 21 is a schematic diagram illustrating an exemplary sensor device containing a droplet according to some embodiments of the present disclosure.

FIG. 21 is a schematic diagram illustrating an exemplary sensor device containing a droplet according to some embodiments of the present disclosure.

As shown in FIG. 21, taking a bone-conduction microphone as an example, the structure of a sensor device 2100 is similar to the structures of the bone-conduction microphones 1810-1830 in FIG. 18A—FIG. 18C. The sensor device 2100 includes a housing 2110, a transducer unit 2120, a droplet 2130, and a substrate 2140. In particular, the accommodating cavity of the housing 2110 is provided with the droplet 2130. The substrate 2140 and the transducer unit 2120 form a rear cavity 2111. The space in the accommodating cavity in the housing 2110 of the sensor device 2100 other than the rear cavity 2111 is a front cavity 2112. The droplet 2130 may be located anywhere on the surface of the transducer unit 2120, such that at least a portion of the transducer unit 2120 is connected to the housing 2110 through the droplet 2130. The droplet 2130 may be an equivalent spring-mass-damping system (e.g., the first resonant system 530 or the second resonant system 740). The droplet 2130 may adjust the vibration characteristics of the transducer unit 2120, which makes its original resonant frequency (e.g., the first or third resonant frequency) changes while the Q value is in an appropriate range. Moreover, due to the presence of the additional resonant peak (e.g., the second resonant peak or the fourth resonant peak), the sensor device 2100 has a relatively high sensitivity.

Exemplarily, the front cavity 2112 has the droplet 2130. The droplet 2130 is located between the transducer unit 2120 and the housing 2110, where an upper portion and a lower portion are respectively connected to the transducer unit 2120 and the housing 2110. In some embodiments, a volume of the droplet 2130 may be 1% to 80% of the volume of the front cavity. In some embodiments, a volume of the droplet 2130 may be 5% to 50% of the volume of the front cavity. In some embodiments, a volume of the droplet 2130 may be 10% to 40% of the volume of the front cavity. In some embodiments, a volume of the droplet 2130 may be 20% to 30% of the volume of the front cavity. Optionally, the droplet 2130 may also be within the rear cavity 2111. In some embodiments, a volume of the droplet 2130 may be 5% to 80% of the volume of the rear cavity. In some embodiments, a volume of the droplet 2130 may be 5% to 50% of the volume of the rear cavity. In some embodiments, a volume of the droplet 2130 may be 10% to 40% of the volume of the rear cavity. In some embodiments, a volume of the droplet 2130 may be 20% to 30% of the volume of the rear cavity.

The droplet 2130 may be formed by directly adding the droplet to the accommodating cavity (e.g., the front or rear cavity), or may be formed by other processes, such as, film wrapping, etc.

Figure 22:
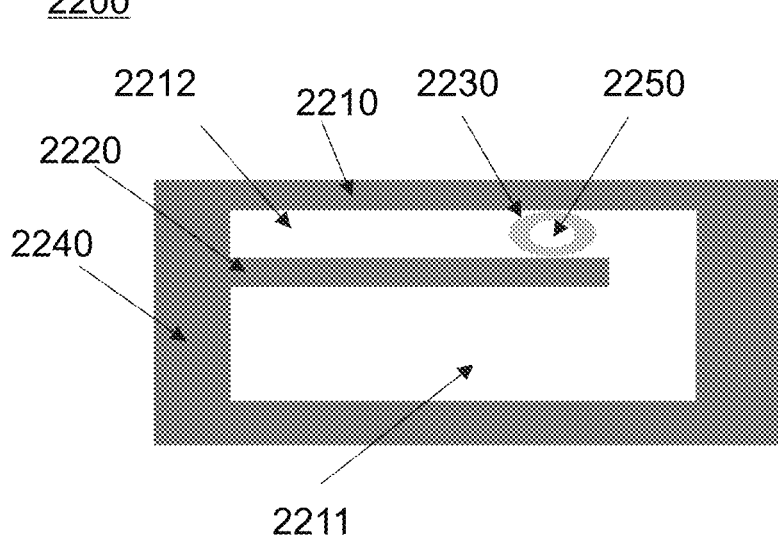
FIG. 22 is a schematic diagram illustrating an exemplary sensor device containing a droplet according to some embodiments of the present disclosure.

FIG. 22 is a schematic diagram illustrating an exemplary sensor device containing a droplet according to some embodiments of the present disclosure.

The structure of a sensor device 2200 in FIG. 22 is similar to the structure of the sensor device in FIG. 21. As shown in FIG. 22, the sensor device 2200 includes a housing 2210, a transducer unit 2220, a droplet 2230, and a substrate 2240. In particular, the accommodating cavity of the housing 2210 is provided with the droplet 2230. The substrate 2240 and the transducer unit 2220 form a rear cavity 2211. The space in the accommodating cavity in the housing 2210 of the sensor device 2200 other than the rear cavity 2211 is a front cavity 2212. The droplet 2230 may be located anywhere on the surface of the transducer unit 2220, such that at least a portion of the transducer unit 2220 is connected to the housing 2210. In the embodiment, the droplet 2230 includes a bubble 2250. The bubble in the droplet 2230 may be formed by adding gas to the droplet or by other means (e.g., film wrapping, etc.). In some embodiments, the droplet 2230 forms a hollow droplet due to the presence of the bubble 2250. In some embodiments, the size and location of the hollow droplet is the same as or similar to the droplet 2130 and may not be described herein. The droplet 2230 and the bubble 2250 may be equivalent to a spring-mass-damping system (e.g., the first resonant system 530 or the second resonant system 740). The stiffness and/or damping of the introduced spring-mass-damping system may be adjusted over a relatively large range by adding the bubble 2250, which allows the additional resonant frequency (e.g., the second or fourth resonant frequency) and the Q value of the sensor device to be adjusted over a relatively large range.

In some embodiments, a gap (e.g., a slit, a slot, a hole, etc.) exists between the transducer unit (e.g., a cantilever beam, a cantilever membrane, etc.) and the housing of the sensor device. In some embodiments, the additional resonant system (e.g., the first resonant system 530 or the second resonant system 740) of the sensor device may be provided at the gap. The additional resonant system may adjust original vibration characteristics of the transducer unit 2220, so that the original resonant frequency (e.g., the first or third resonant frequency) changes while the Q value is in an appropriate range, or a new resonant system may be introduced, and the presence of an additional resonant peak (e.g., the second or fourth resonant peak) allows the sensor device to have a higher sensitivity.

Figure 23A:
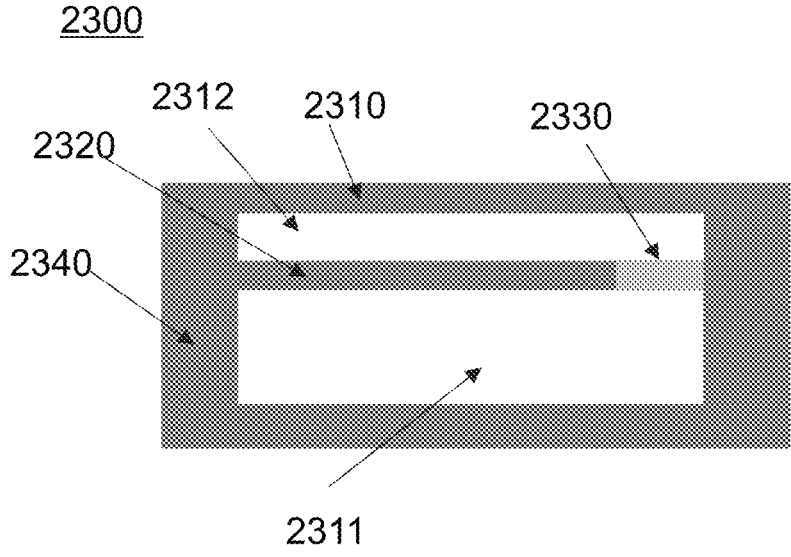
FIGS. 23A-23B are schematic diagrams illustrating exemplary sensor devices containing liquid membranes according to some embodiments of the present disclosure.

FIG. 23A is a schematic diagram illustrating an exemplary sensor device containing a liquid membrane according to some embodiments of the present disclosure.

The structure of a sensor device 2300 in FIG. 23A is similar to the structure of the sensor device in FIG. 21 or FIG. 22. As shown in FIG. 23A, the sensor device 2300 includes a housing 2310, a transducer unit 2320, a liquid membrane 2330, and a substrate 2340. In particular, the substrate 2340 and the transducer unit 2320 form a rear cavity 2311. The space in the housing 2310 of the sensor device 2300 other than the rear cavity 2311 is a front cavity 2312. There is the gap between the transducer unit 2320 and the housing 2310. The liquid membrane 2330 may be located within the gap between the transducer unit 2320 and the housing 2310, such that at least a portion of the transducer unit 2320 is connected to the housing 2310. In some embodiments, the thickness of the liquid membrane 2330 may be less than, equal to, or greater than the thickness of the transducer unit 2320.

Figure 23B:
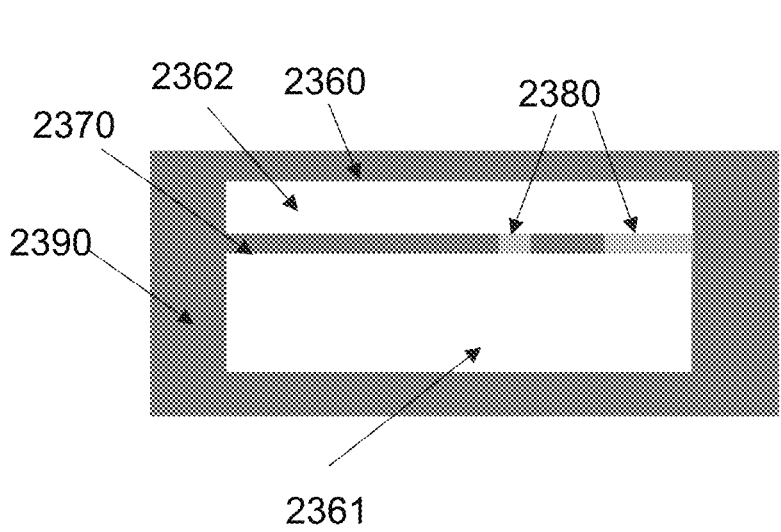

FIG. 23B is a schematic diagram illustrating an exemplary sensor device containing a liquid membrane according to some embodiments of the present disclosure.

The structure of a sensor device 2350 in FIG. 23B is similar to the structures of the sensor devices in FIG. 21-FIG. 22 and FIG. 23A. As shown in FIG. 23B, the sensor device 2350 includes a housing 2360, a transducer unit 2370, a liquid membrane 2380, and a substrate 2390. In particular, a substrate 2390 and the transducer unit 2370 form a rear cavity 2361. The space in the housing 2360 of the sensor device 2350 other than the rear cavity 2361 is a front cavity 2362. There are multiple gaps between the transducer unit 2370 and the housing 2360. The liquid membrane 2380 may be located within the gap in the transducer unit 2370 and the gap between the transducer unit 2370 and the housing 2360, such that portions of the transducer unit 2370 are connected to each other and at least a portion of the transducer unit 2370 is connected to the housing 2360. In some embodiments, the thickness of the liquid membrane 2380 may be less than, equal to, or greater than the thickness of the transducer unit 2370.

Figure 24A:
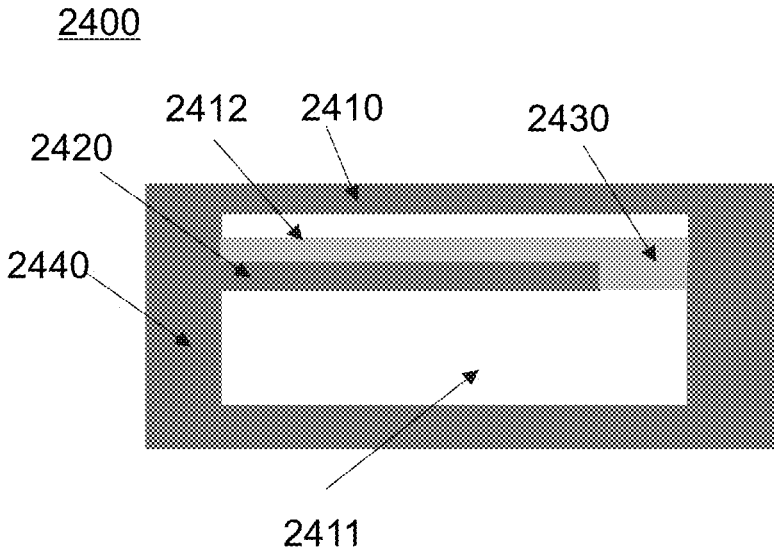
FIGS. 24A-24B are schematic diagrams illustrating exemplary sensor devices containing liquid membranes according to some embodiments of the present disclosure.

FIG. 24A is a schematic diagram illustrating an exemplary sensor device containing a liquid membrane according to some embodiments of the present disclosure.

The structure of a sensor device 2400 in FIG. 24A is similar to the structures of the sensor devices in FIG. 21-FIG. 22 and FIG. 23A-FIG. 23B. As shown in FIG. 24A, the sensor device 2400 includes a housing 2410, a transducer unit 2420, a liquid membrane 2430, and a substrate 2440. In particular, the substrate 2440 and the transducer unit 2420 form a rear cavity 2411. The space in the housing 2410 of the sensor device 2400 other than the rear cavity 2411 is a front cavity 2412. There is a gap between the transducer unit 2420 and the housing 2410. The liquid membrane 2430 may be located within the gap between the transducer unit 2420 and the housing 2410, such that at least a portion of the transducer unit 2420 is connected to the housing 2410. Further, the liquid membrane 2430 further covers the at least a portion of the surface of the transducer unit 2420. In the embodiment, the liquid membrane 2430 further covers the upper surface of the transducer unit 2420, thereby further improving the performance of the sensor device 2400.

Figure 24B:
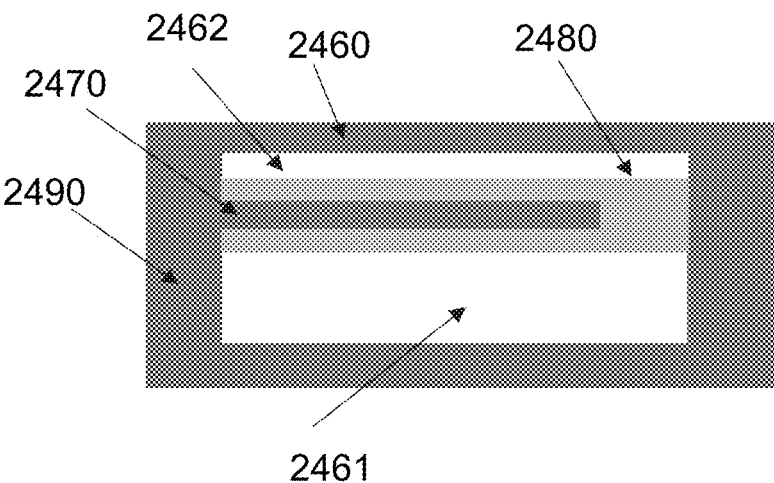

FIG. 24B is a schematic diagram illustrating an exemplary sensor device containing a liquid membrane according to some embodiments of the present disclosure.

The structure of a sensor device 2450 in FIG. 24B is similar to the structures of the sensor devices in FIG. 21-FIG. 22, FIG. 23A-FIG. 23B, and FIG. 24A. As shown in FIG. 24B, the sensor device 2450 includes a housing 2460, a transducer unit 2470, a liquid membrane 2480, and a substrate 2490. In particular, the substrate 2490 and the transducer unit 2470 form a rear cavity 2461. The space in the housing 2410 of the sensor device 2400 other than the rear cavity 2461 is a front cavity 2462. There is a gap between the transducer unit 2470 and the housing 2460. The liquid membrane 2480 may be located within the gap between the transducer unit 2470 and the housing 2460, such that at least a portion of the transducer unit 2470 is connected to the housing 2460. Further, the liquid membrane 2480 also covers the at least a portion of the surface of the transducer unit 2470. In the embodiment, the liquid membrane 2480 also covers the upper surface and the lower surface of the transducer unit 2470, thereby further improving the performance of the sensor device 2450.

Figure 25A:
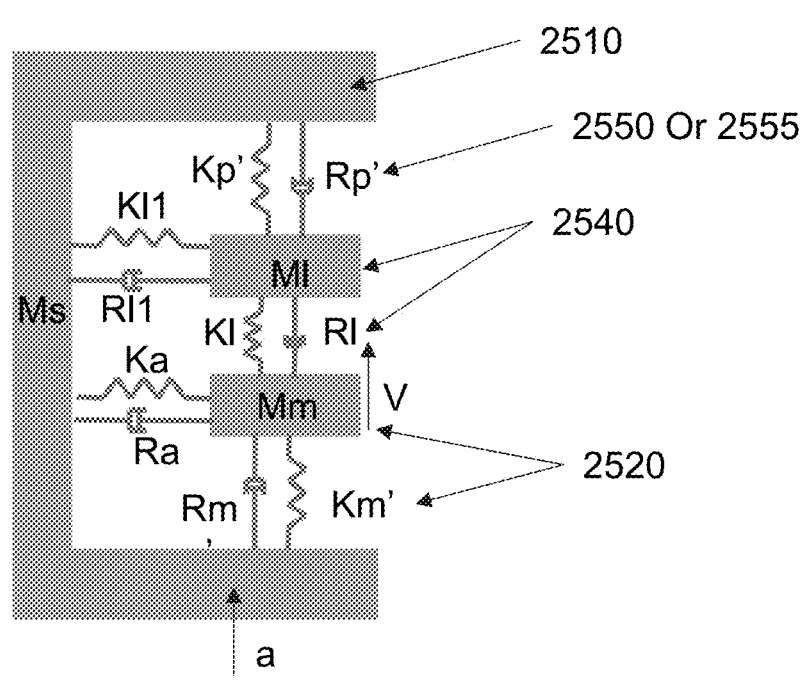
FIG. 25A is a schematic diagram illustrating an exemplary mechanical structure of a sensor device according to some embodiments of the present disclosure.

FIG. 25A is a schematic diagram illustrating an exemplary mechanical structure of a sensor device according to some embodiments of the present disclosure. In some embodiments, a sensor device 2500 may be considered as adding an additional resonant system to a transducer unit 2520. Exemplarily, in the embodiment, a housing 2510 may be equivalent to a mass (Ms). The transducer unit 2520 may be equivalent to a spring (Km')-mass (Mm)-damping (Rm') system. The mass (Mm) may be provided by the mass of the transducer unit 2520 and an equivalent additional mass of liquid 2540 on the transducer unit 2520. The spring (Km')-damping (Rm') may be determined jointly by an equivalent spring damping of a rear cavity 2502 (i.e., the equivalent spring (Ka)-damping (Ra)), a spring damping of the transducer unit 2520, and an additional spring damping of the liquid 2540.

A new spring (Kp')-mass (Ml)-damping (Rp') system (i.e., the additional resonant system) may be formed by designing the liquid 2540 with an air cavity 2503. The mass (Ml) is mainly provided by the liquid 2540. The spring (Kp')-damping (Rp') may be determined jointly by the stiffness and damping of the gas in a front cavity 2501, the stiffness and damping of the interface (e.g., a gas-liquid interface 2550, or a first flexible membrane 2555) between the liquid 2540 and the air cavity 2503, and the stiffness and damping of the liquid 2540.

The liquid 2540 is in contact with the transducer unit 2520, which may be equivalent to that the liquid 2540 and the transducer unit 2520 are connected through an equivalent spring (Kl) and damping (Rl) formed by the liquid 2540. The liquid 2540 may receive the vibration of the housing 2510. The liquid 2540 is connected to the housing 2510 by an equivalent spring (Kl$_1$)-damping (Rh) formed by the liquid 2540.

When the housing 2510 receives an external signal (i.e., external excitation), the signal may be transmitted to the liquid 2540, the transducer unit 2520, and the gas in the rear cavity 2502 of the sensor device 2500 through the spring (Km')-damping (Rm'), the spring (Kp)-damping (Rp), the spring (Ka)-damping (Ra), and the spring (Kl$_1$)-damping (Rh). For example, as shown in FIG. 25A, the sensor device

2500 may be forced to vibrate in response to an excitation acceleration a, and the force is transmitted to the transducer unit 2520 through the spring (Km')-damping (Rm'), the spring (Kp)-damping (Rp), the spring (Ka)-damping (Ra), and the spring (Kl$_1$)-damping (Rh), so that the transducer unit 2520 produces a velocity V.

In the embodiments of the present disclosure, when the sensor device 2500 receives the external excitation, in addition to the response of the transducer unit 2520 under inertia, the additional resonant system provided by the liquid 2540 and the air cavity 2503 may also produce a corresponding response due to inertia and act on the transducer unit 2520, resulting in an additional resonant peak on the frequency response curve of the sensor device 2500. Compared to other sensor devices without the liquid 2540 and the air cavity 2503, the output of the sensor device 2500 may be substantially increased. More description regarding the effect of introducing the additional resonant system may be found elsewhere in the present disclosure, such as FIG. 9 and FIG. 10 and their descriptions.

Figure 25B:
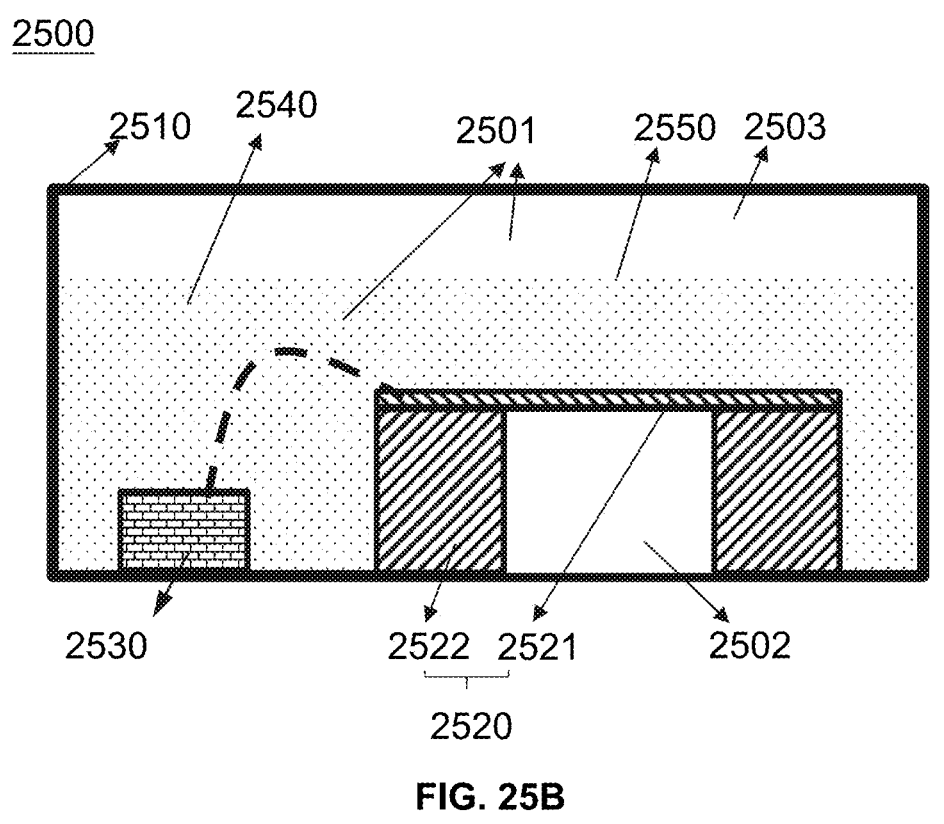
Figure 25C:
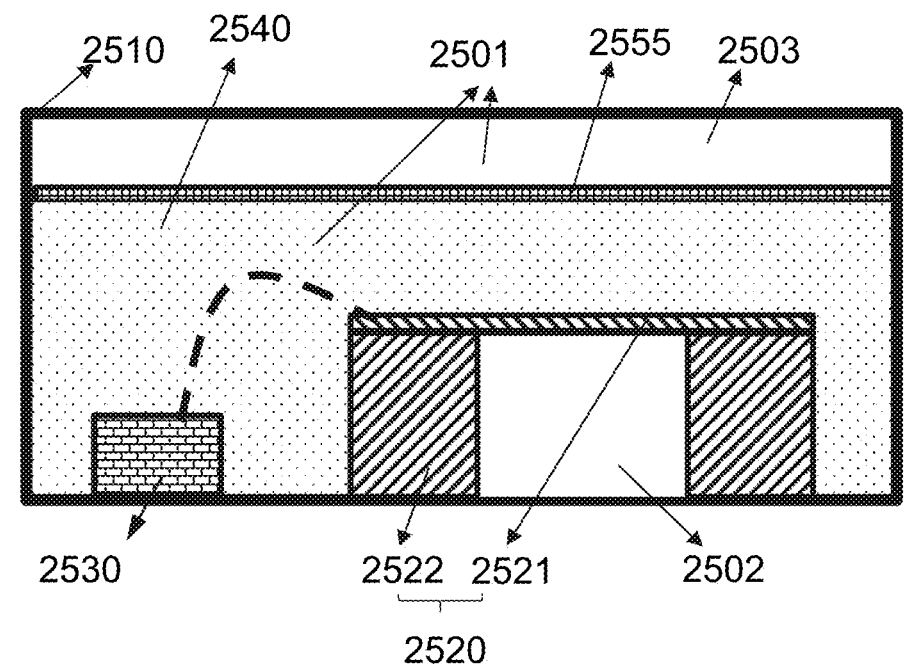
Figure 25D:
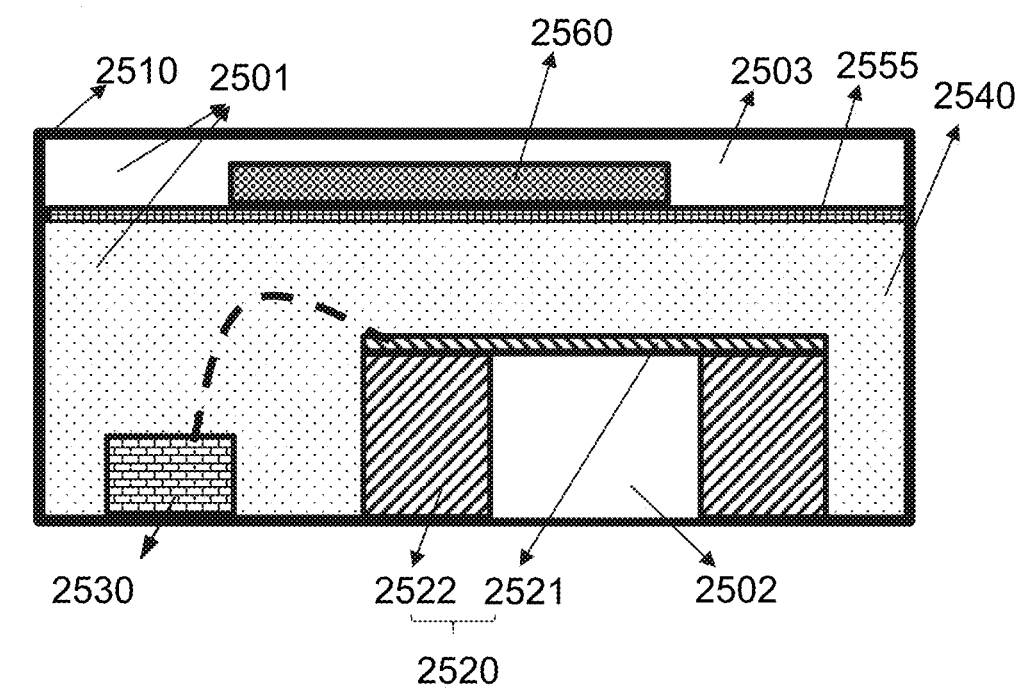

FIGS. 25B-25D are schematic diagrams illustrating exemplary structures of sensor devices according to some embodiments of the present disclosure. As shown in FIG. 25B, the sensor device 2500 includes the housing 2510, the transducer unit 2520, and the processing circuit 2530.

The housing 2510 has an accommodating cavity inside. The accommodating cavity may be used to accommodate the transducer unit 2520 and/or the processing circuit 2530. The housing 2510 may be used to transmit an external signal (e.g., a mechanical signal, an acoustic signal, etc.) to allow the transducer unit 2520 to sense the external signal and thereby producing a target signal. Exemplarily, if the sensor device 2500 is a bone-conduction microphone, the housing 2510 may transmit the vibration corresponding to a sound to the transducer unit 2520 in response to an external sound. More specific descriptions regarding the housing may be found elsewhere in the present disclosure, such as FIG. 1 and FIG. 2 and their descriptions.

The transducer unit 2520 may be used to convert the external signal to the target signal, such as converting a vibration signal to an electrical signal. In some embodiments, the transducer unit 2520 may include a vibration pickup structure 2521 and a substrate structure 2522. The substrate structure 2522 is fixedly connected to an inner wall of the housing 2510, and the vibration pickup structure 2521 is carried on the substrate structure 2522. The vibration pickup structure 2521 may be used to pick up vibration to produce the target signal (e.g., an electrical signal). For example, the vibration pickup structure 2521 may pick up the vibration of the housing 2510 transmitted by the substrate structure 2522 in contact with the vibration pickup structure 2521. As another example, when the accommodating cavity is filled with liquid, the vibration pickup structure 2521 may pick up the vibration transmitted by the liquid (e.g., liquid 2540) in contact with the vibration pickup structure 2521. The substrate structure 2522 may be a barrel structure with both ends penetrated. One end of the barrel structure is connected to the housing 2510 and another end is connected to the vibration pickup structure 2521. In some embodiments, the vibration pickup structure 2521 may cover an opening on one side of the barrel structure. In such an arrangement, the transducer unit 2520 can separate the accommodating cavity to form the front cavity 2501 and the rear cavity 2502 located on opposite sides of the vibration pickup structure 2521. For example, as shown in FIG. 25B, the vibration pickup structure 2521, the substrate structure 2522, and a portion of the housing form the rear cavity 2502.

The space in the accommodating cavity of the housing 2510 of the sensor device 2500 other than the rear cavity 2502 is the front cavity 2501. In some embodiments, the transducer unit 2520 may include only the vibration pickup structure 2521. The vibration pickup structure 2521 directly separates the accommodating cavity to form the front cavity and the rear cavity on opposite sides of the vibration pickup structure 2521. For example, the vibration pickup structure 2521 may be a piezoelectric membrane, and an edge of the piezoelectric membrane may be directly connected to the housing 2510 to form the front cavity and the rear cavity in conjunction with the housing 2510. As another example, the vibration pickup structure 2521 may include a piezoelectric beam and a vibrating membrane, one end of the piezoelectric beam may be directly connected to the housing 2510, and the vibrating membrane may cover the surface of the piezoelectric beam, thereby separating the accommodating cavity to form the front cavity and the rear cavity.

In some embodiments, at least one of the front cavity 2501 and the rear cavity 2502 is filled with the liquid 2540. The liquid 2540 is in contact with the vibration pickup structure 2521. By setting the liquid 2540 in contact with the vibration pickup structure 2521, when the sensor device 2500 is excited, the vibration pickup structure 2521 picks up not only the vibration of the housing 2510 but also the vibration transmitted by the liquid 2540, resulting in the frequency response curve of the sensor device 2500 not only generating a resonant peak (i.e., the first resonant peak) corresponding to the intrinsic resonant frequency of the vibration pickup structure 2521, but also generating an additional resonant peak (i.e., a second resonant peak), thereby greatly increasing the output sensitivity of the sensor device 2500. For example, the front cavity 2501 and the rear cavity 2502 may be filled with the liquid, thereby providing the additional resonant system (e.g., the first resonant system 530) for the transducer unit 2520, and the additional resonant system may provide an additional resonant peak for the transducer unit 2520, thereby increasing the sensitivity of the sensor device 2500.

In some embodiments, the liquid 2540 may be provided in the front cavity 2501 (the sensor device 2500 as shown in FIG. 25B), or in the rear cavity 2502, or in both the front cavity 2501 and the rear cavity 2502 (the sensor device 1810 as shown in FIG. 18A). For ease of description, the sensor device having the front cavity filled with liquid is illustrated in the following as way of example, which does not limit the scope of the present disclosure. For example, the liquid 2540 may be provided in the rear cavity 2502. Further, the rear cavity may be provided with a flexible membrane, and the liquid 2540 may be provided in the space formed by the flexible membrane and the transducer unit 2520.

In some embodiments, the front cavity 2501 may be provided with the air cavity 2503 (also referred to as a bubble). The air cavity 2503 is filled with gas (e.g., the air). The liquid 2540 and the air cavity 2503 may form the second resonant system 740, thereby improving the sensing sensitivity of the sensor device 2500 (as shown in FIGS. 7-10).

In some embodiments, in order to improve the stability of the sensor device 2500, the air cavity 2503 may be provided between the liquid 2540 and the housing 2510 corresponding to a vibration direction of the vibration pickup structure 2521. At this time, due to the viscous effect of the liquid 2540 (or the density of the gas is less than the density of the liquid), the location of the air cavity 2503 is not easily changed, thereby improving the stability of the sensor device 2500 while facilitating the preparation of the sensor device.

In some embodiments, as shown in FIG. 25B, a gas-liquid interface 2550 may be formed between the liquid 2540 and the air cavity 2503. In other words, there is no constraining structure on the upper surface of the liquid 2540. The gas-liquid interface 2550 with extremely low stiffness may be formed at the interface between the liquid 2540 and the gas. The gas-liquid interface 2550 with extremely low stiffness adds less additional stiffness to the transducer unit 2520 (or vibration pickup structure 2521), thus achieving a relatively large output. In this case, the sensor device 2500 may be used in an application scenario with low vibration and no need for frequent movement.

In some embodiments, as shown in FIG. 25C, a first flexible membrane 2555 may be provided between the liquid 2540 and the air cavity 2503. The first flexible membrane 2555 is a deformable membrane-like structure. The first flexible membrane 2555 may constrain a boundary of the liquid 2540 to ensure that the liquid 2540 is in a controllable state during vibration, thus further ensuring the stability of the performance of the sensor device 2500 and the reliability of the sensor device 2500. In this situation, the sensor device 2500 may be applied to a usage scenario where the stimulus is relatively large, the usage environment is relatively complex, and frequent movement is required.

In some embodiments, the structure and material of the first flexible membrane 2555 may be designed to realize the adjustment of the resonant peak location of the additional resonant system formed by the liquid and the air cavity introduced into the sensor device 2500 and the resonant peak location of the transducer unit 2520, thereby achieving a sensor device of high sensitivity under a restrained liquid boundary. In some embodiments, the first flexible membrane 2555 may adopt a film structure with flexibility (e.g., high yield limit, no high temperature deterioration, etc.) and softness (e.g., low stiffness, easy deformation, etc.). Exemplarily, the first flexible membrane 2555 may adopt one or more of a polyimide film (PI film), a polydimethylsiloxane film (PDMS film), a polyurethane (PU) film, a poly(ether-ether-ketone) (PEEK) film, a semiconductor flexible film, a silicone bonding adhesive, a silicone film, a silicone gel, a damping adhesive (e.g., an acrylic damping adhesive), or the like. In some embodiments, the thickness of the first flexible membrane 2555 may be within a range of 0.05 mm-0.15 mm.

In some embodiments, as shown in FIG. 25D, in order to further achieve an effective adjustment of the resonant peak produced by the liquid 2540, a mass block 2560 may be added on the first flexible membrane 2555. Exemplarily, for the additional resonant system (i.e., the spring (Kp)-mass (Ml)-damping (Rp) system), if the mass of the mass block 2560 is increased, the mass (Ml) may be increased, thereby reducing the frequency corresponding to the additional resonant peak (i.e., the additional resonant frequency) of the sensor device 2500 (e.g., as shown in FIG. 29C). If the mass of the mass block 2560 is reduced, the mass (Ml) may be reduced, thereby increasing the additional resonant frequency corresponding to the additional resonant peak of the sensor device 2500.

In some embodiments, the mass block 2560 may be made of one or more of a metallic material (e.g., iron, copper, aluminum, etc.), a semiconductor material (e.g., silicon, graphite, etc.), an organic material (e.g., rubber, plastic, etc.), and other materials. In some embodiments, the first flexible membrane 2555 and the mass block 2560 may be prepared from the same material. In such case, the first flexible membrane 2555 and the mass block 2560 may be integrally prepared, or prepared by a partial etching process of semiconductors. In some embodiments, the first flexible membrane 2555 and the mass block 2560 may be prepared with different materials. The first flexible membrane 2555 and mass block 2560 may be prepared using a macroscopic process such as adhesion, bonding, deposition, etc., or a semiconductor process.

In some embodiments, the transducer unit 2520 may include a piezoelectric transducer. The vibration pickup structure 2521 may include a piezoelectric membrane or a piezoelectric beam. For example, the piezoelectric membrane is a membrane assembly having the piezoelectric effect, and the edge of the piezoelectric membrane may be fixed to the substrate structure 2522 to form the transducer unit 2520. As another example, one end of the piezoelectric beam may be fixed to the substrate structure 2522 to form the transducer unit 2520. In some embodiments, the piezoelectric membrane or the piezoelectric beam may include at least two electrode layers (e.g., a first electrode layer and a second electrode layer) and at least one piezoelectric layer, and the piezoelectric layer may be located between the first electrode layer and the second electrode layer. More description regarding the piezoelectric layer and the electrode layer(s) may be found in FIG. 2 and the related descriptions. In some embodiments, the piezoelectric membrane or the piezoelectric beam may be a piezoelectric bimorph structure. For example, the piezoelectric beam may include the first electrode layer, the first piezoelectric layer, the second electrode layer, a second piezoelectric layer, and a third electrode layer provided sequentially from top to bottom.

In some embodiments, the piezoelectric membrane or the piezoelectric beam may further include a substrate layer. The substrate layer may be provided between an electrode layer and the substrate structure 2522 and configured to support the piezoelectric layer and the electrode layer(s). In some embodiments, the electrode layer(s) and the piezoelectric layer may be prepared on the substrate layer by a process such as coating, pouring, etc. In some embodiments, the substrate layer may be made of one or more materials such as silicon, silicon dioxide, silicon nitride, silicon carbide, etc. In some embodiments, the substrate layer may be a single-layer composite structure or a multi-layer composite structure.

In some embodiments, the piezoelectric membrane may have a regular shape such as a circle, ellipse, triangle, quadrilateral, hexagon, octagon, etc., or any irregular shape. The substrate structure 2522 may be a barrel structure having a corresponding shape.

In some embodiments, when the dimension of the transducer unit 2520 remains unchanged and the driving force is the same, in order to further improve the output performance of the sensor device 2500 (e.g., to make the vibration pickup structure 5221 produce a larger output displacement), the piezoelectric membrane may be split into a plurality of cantilever beam-type structures. In other words, the vibration pickup structure 2521 may include a plurality of piezoelectric beams 2523. The plurality of piezoelectric beams 2523 (e.g., 2, 3, 4 piezoelectric beams 2523) may be arranged on a same plane such that the vibration pickup structure 2521 can be in various shapes (e.g., square, circular, etc.). In this setting, compared with the whole piezoelectric membrane, the plurality of piezoelectric beams 2523 may sense the external signal independently, which can serve as a whole to output the target signal. Therefore, the whole composed of the plurality of piezoelectric beams 2523 may produce a larger displacement under a same external excitation, allowing the vibration pickup structure

2521 to output a larger electrical signal and improving the sensitivity of the sensor device 2500.

Figure 26:
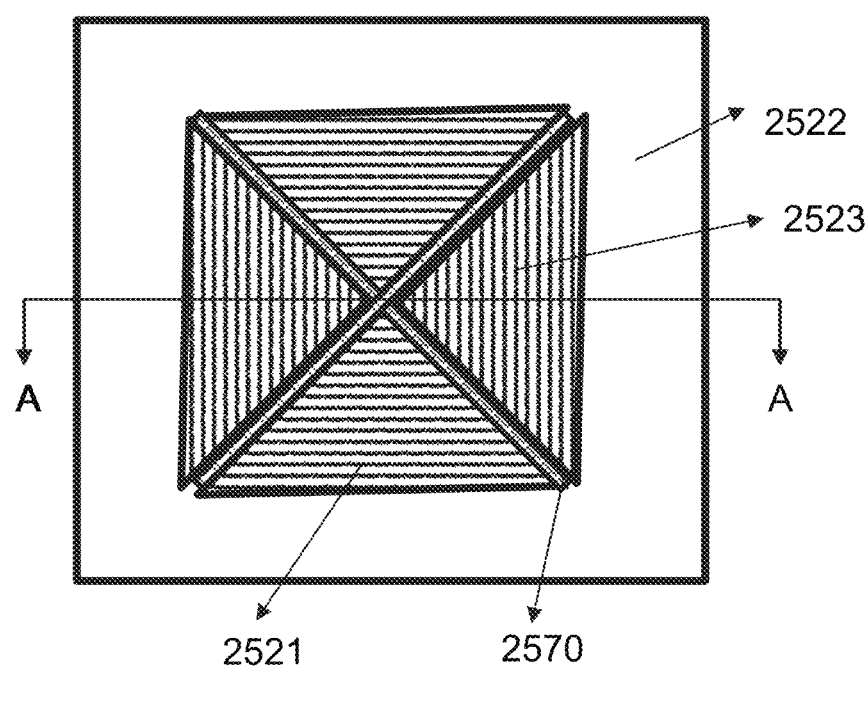
FIG. 26 is a structural schematic diagram illustrating a top view of an exemplary transducer unit according to some embodiments of the present disclosure.

FIG. 26 is a structural schematic diagram illustrating a top view of an exemplary transducer unit according to some embodiments of the present disclosure. FIGS. 27A-27D are schematic diagrams illustrating AA cross-section of a transducer unit in FIG. 26. Exemplarily, as shown in FIG. 26, the plurality of piezoelectric beams 2523 may be provided in the same plane, such that the vibration pickup structure 2521 is square. A gap is formed between two adjacent piezoelectric beams in the plurality of piezoelectric beams 2523, and in some embodiments, the gap between the two adjacent piezoelectric beams in the plurality of piezoelectric beams 2523 is not greater than 20 µm.

Figure 27A:
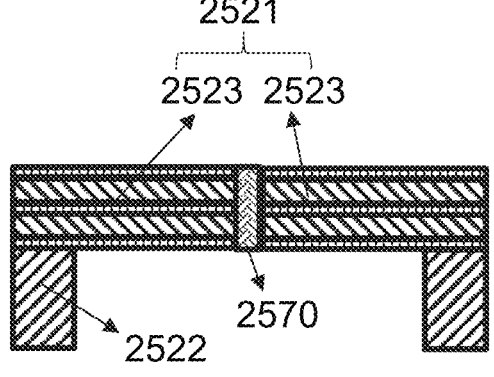
FIGS. 27A-27D are schematic diagrams illustrating AA cross-section of a transducer unit in FIG. 26.
Figure 27B:
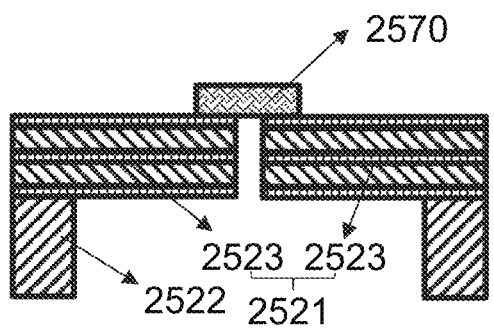
Figure 27C:
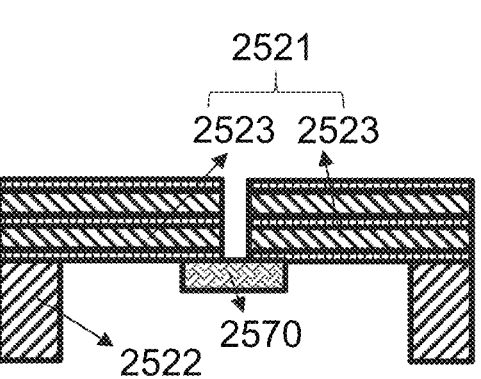
Figure 27D:
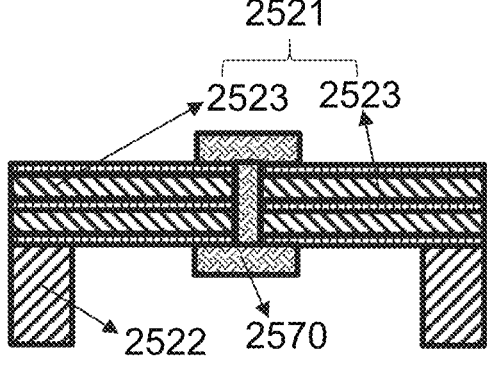

In some embodiments, in order to ensure that the liquid 2540 does not flow into another cavity (e.g., from the front cavity 2501 into the rear cavity 2502) through the gap between the piezoelectric beams 2523 and improve the stability of the sensor device 2500, a filling component 2570 may be provided at the location of the gap between the piezoelectric beams 2523. In some embodiments, the filling component 2570 may be arranged on at least one location of the gap of the piezoelectric beams 2523 (as shown in FIG. 27A), the upper surface of the piezoelectric beams 2523 (as shown in FIG. 27B), or the lower surface of the piezoelectric beams 2523 (as shown in FIG. 27C), etc. For example, as shown in FIG. 27D, the filling component 2570 may be provided at simultaneously the gap of the piezoelectric beams 2523, the upper surface of the piezoelectric beams 2523, and the lower surface of the piezoelectric beams 2523.

In some embodiments, the plurality of piezoelectric beams 2523 may vibrate to produce resonant peaks of the same frequency. The plurality of piezoelectric beams 2523 may output the electrical signal as a whole. To not affect the vibrations of the various piezoelectric beams 2523, the stiffness of the filling component 2570 may be less than the stiffness of the plurality of piezoelectric beams 2523. In some embodiments, the filling component 2570 may be made of one or more of a semiconductor metallic material, a non-metallic material, etc. Exemplarily, the filling component 2570 may be made of a flexible material such as rubber, the plastic, the silicone, etc.

Figure 28A:
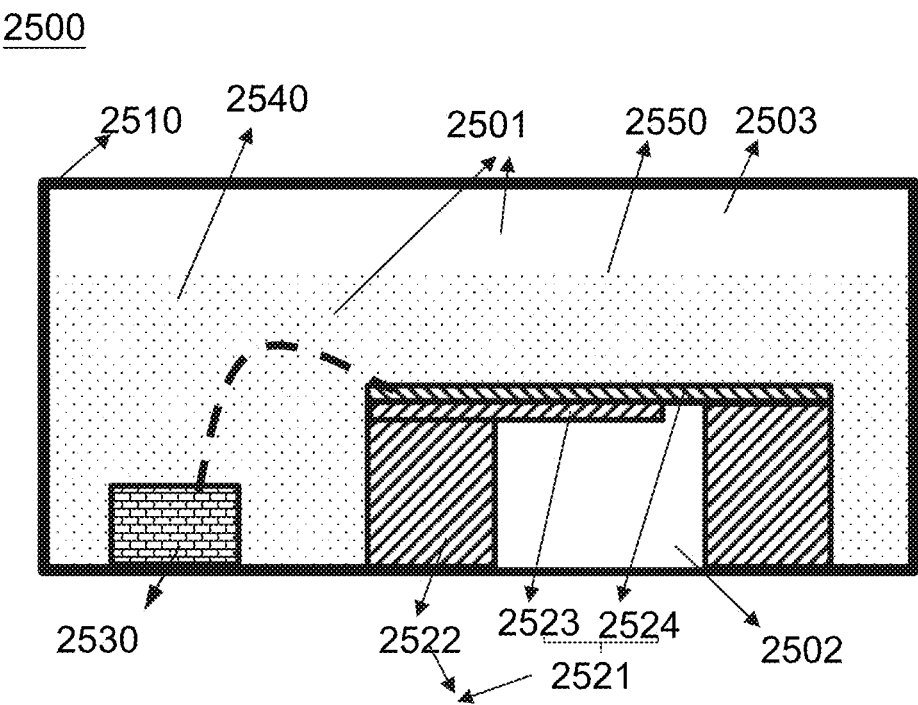
FIG. 28A is a schematic diagram illustrating an exemplary structure of a sensor device according to some embodiments of the present disclosure.
Figure 28B:
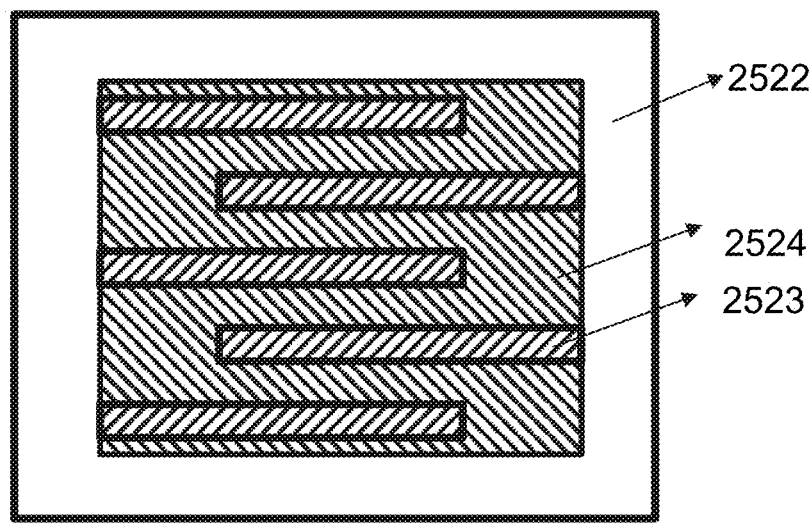
FIG. 28B is a schematic diagram illustrating a top view of the transducer unit in FIG. 28A.

FIG. 28A is a schematic diagram illustrating an exemplary structure of a sensor device according to some embodiments of the present disclosure. FIG. 28B is a schematic diagram illustrating a top view of the transducer unit in FIG. 28A.

In some embodiments, as shown in FIG. 28A, the vibration pickup structure 2521 may include the plurality of piezoelectric beams 2523 and a vibrating membrane 2524. The vibrating membrane 2524 may cover surfaces (e.g., an upper surface or a lower surface) of the plurality of piezoelectric beams 2523 to prevent the liquid 2540 from passing through the transducer unit 2520 into another cavity. The vibrating membrane 2524 may receive vibrations of the liquid 2540 and/or the housing 2510 and transmit the vibrations to the piezoelectric beam(s) 2523. In some embodiments, the vibrating membrane 2524 may be made of the same or different material as the first flexible membrane 2555. For example, the vibrating membrane 2524 may be made of one or more of a semiconductor metal material, a non-metallic material, and other materials. As another example, the vibrating membrane 2524 may be made of an organic material, such as rubber, plastic, silicone, etc.

In some embodiments, as shown in FIG. 28B, in order to improve the stability of the structure of the sensor device 2500, the plurality of piezoelectric beams 2523 may be provided in a flat distribution manner on the same plane, and two adjacent piezoelectric beams 2523 may be provided on opposite sides of the substrate structure 2522, such that the plurality of piezoelectric beams 2523 are in a staggered distribution manner.

In some embodiments, the plurality of piezoelectric beams 2523 may vibrate to produce resonant peaks of different frequencies. Each piezoelectric beam 2523 may be determined as an individual signal collection unit and output a sub-electrical signal. In some embodiments, the sub-electrical signals may be directly output to the processing circuit 2530 in the form of electrical series connection, parallel connection, or a combination of series and parallel connection. In some embodiments, each sub-electrical signal may be transmitted individually to the processing circuit 2530, and the processing circuit 2530 may separately perform signal processing on each sub-electrical signal (including but not limited to adjusting the amplitude, phase, etc.), and then perform the corresponding signal fusion. More descriptions regarding the processing of the sub-electrical signals of various individual piezoelectric beams may be found, for example, in a PCT application entitled "MICROPHONE AND ELECTRONIC DEVICE HAVING THE SAME," application number PCT/CN2020/103201, the entire contents which are incorporated herein by reference.

In some embodiments, the vibration pickup structure 2521 may not include the vibrating membrane 2524. At this point, in order to prevent the liquid 2540 from flowing from one cavity to another cavity, the width of the gap between two adjacent piezoelectric beams in the plurality of piezoelectric beams 2523 and the width of the gap between the piezoelectric beams 2523 and the substrate structure 2522 are not greater than 20 μm.

Figure 29A:
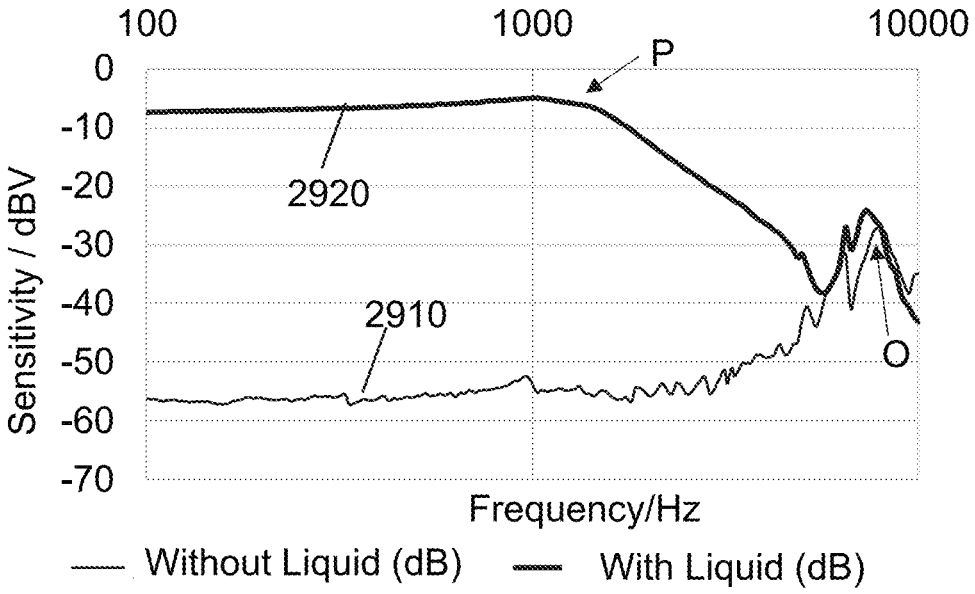
FIG. 29A—FIG. 29C are frequency response curve diagrams of exemplary sensor devices according to some embodiments of the present disclosure.

FIG. 29A is a frequency response curve diagram of an exemplary sensor device according to some embodiments of the present disclosure. As shown in FIG. 29A, a curve 2910 represents a frequency response curve of a sensor device when the front cavity is not filled with liquid 2540. A curve 2920 represents a frequency response curve of a sensor device (e.g., the sensor device shown in FIG. 25B) when the front cavity is filled with liquid 2540 and there is a gas-liquid interface between liquid 2540 and the gas in the air cavity 2503. As can be seen from FIG. 29A, the frequency response curve 2910 of the sensor device not filled with the liquid 2540 has an intrinsic resonant peak 0 at a relatively high frequency associated with the structure of its transducer unit. The sensor device produces an additional resonant peak P (which is not obvious due to the function of damping) at a relatively low frequency band (e.g., 200 Hz-1500 Hz) by filling the liquid 2540 (corresponding to curve 2920), which greatly improves the output of the sensor device at a mid-to-low frequency band. For example, under an excitation of 1 g, the sensitivity is increased by approximately 50 dBV relative to the sensor device not filled with the liquid 2540 (corresponding to curve 2910).

Figure 29B:
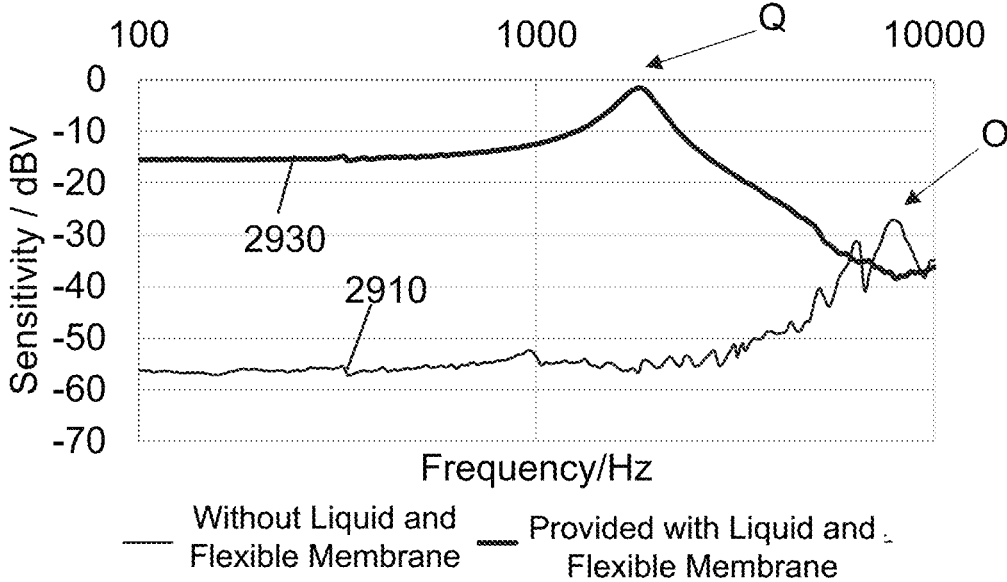
Figure 29C:
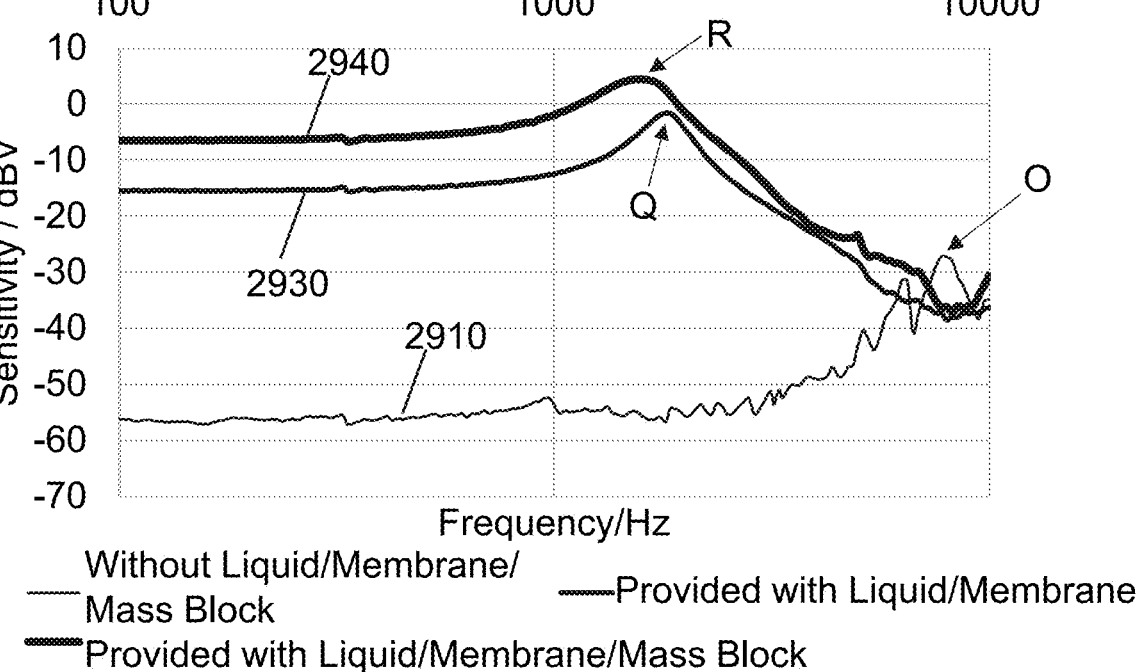

FIG. 29B is a frequency response curve diagram of an exemplary sensor device according to some embodiments of the present disclosure. As shown in FIG. 29B, a curve 2930 represents a frequency response curve of a sensor device (e.g., the sensor device shown in FIG. 25C) filled with the liquid 2540 when there is the first flexible membrane 2555 between the liquid 2540 and the air cavity 2503. As can be seen from FIG. 29B, by filling the liquid 2540 and using the first flexible membrane 2555 (corresponding to curve 2930), the sensor device produces an additional resonant peak Q in a low frequency band (e.g., 200 Hz-2000 Hz), which greatly improves the output of the sensor device in a mid-to-low frequency band, e.g., under the excitation of 1 g, the sensitivity is increased by approximately 41 dBV relative to the sensor device that is not filled with the liquid 2540 and uses the first flexible membrane 2555 (corresponding to curve 2910).

Further, by designing the first flexible membrane 2555, an effective adjustment of the resonant peak produced by the liquid may be achieved. For example, relative to a sensor device filled with liquid 2540 but without arranging the first flexible membrane 2555 (corresponding to curve 2920), both the intrinsic resonant peak (not shown) and the additional resonant peak Q are shifted toward high frequency. In some embodiments, the difference between the additional resonant peak Q and the additional resonant peak P may be within a range of 10 Hz-1000 Hz.

FIG. 29C is a frequency response curve diagram of an exemplary sensor device according to some embodiments of the present disclosure. As shown in FIG. 29C, a curve 2940 represents a frequency response curve of a sensor device (e.g., the sensor device as shown in FIG. 25D) provided with the liquid 2540, the first flexible membrane 2555, and the mass block 2560. As can be seen from FIG. 29C, relative to providing only the liquid 2540 and the first flexible membrane 2555 (corresponding to curve 2930), the output of the sensor device may be made to be further increased by further adding the mass block 2560 (corresponding to curve 2940), e.g., under the excitation of 1 g, the increase is approximately 10 dBV. Furthermore, due to the addition of mass block 2560, the mass of the additional resonant system increases, which leads to a shift of the additional resonant peak of the additional resonant system towards low frequency.

Figure 30A:
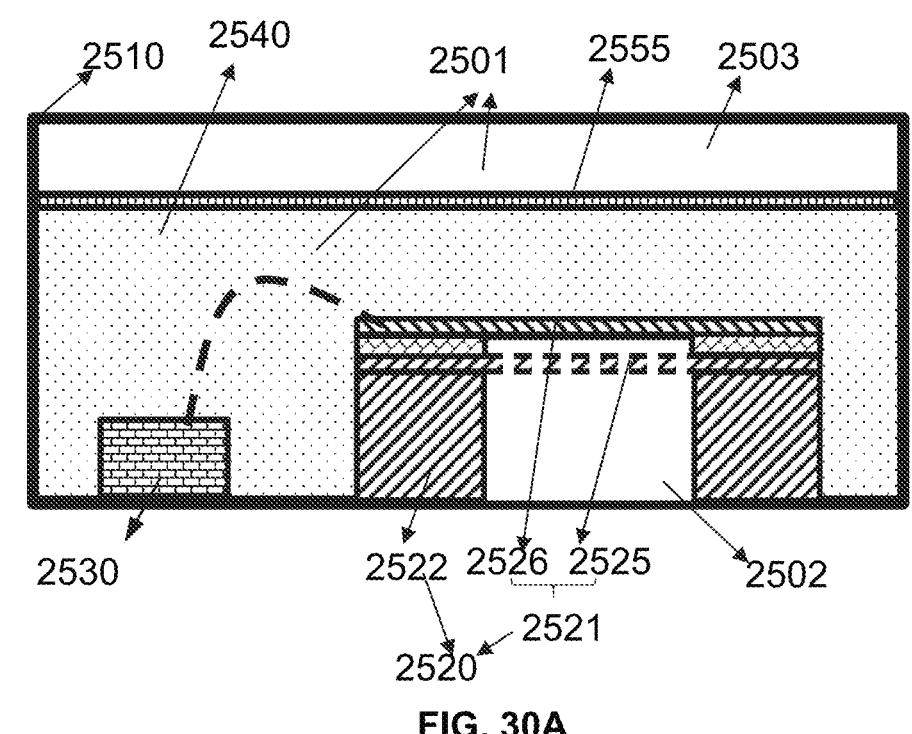
FIGS. 30A-30B are schematic diagrams illustrating exemplary structures of sensor devices according to some embodiments of the present disclosure.
Figure 30B:
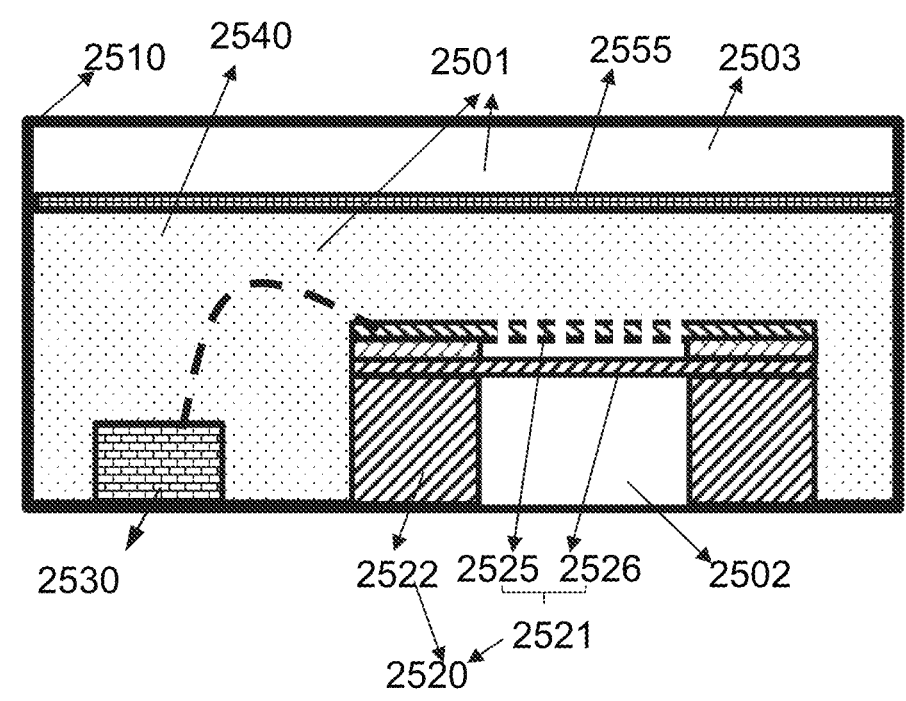

FIG. 30A-FIG. 30B are schematic diagrams illustrating exemplary structures of sensor devices according to some embodiments of the present disclosure. In some embodiments, as shown in FIG. 30A, the pickup vibration structure 2521 may include an electrostatic transducer (e.g., a capacitive transducer). The capacitive transducer at least includes a perforated backplate 2525 and a vibrating electrode membrane 2526. The vibrating electrode membrane 2526 and the perforated backplate 2525 are disposed parallel and close to each other, and respectively forming the two poles of a capacitor. Power provides voltage to both poles of the capacitor. When there is an external vibration signal, the vibrating electrode membrane 2526 may vibrate based on the external vibration signal, while the perforated backplate 2525 is fixed, thereby changing a distance between the two poles of the capacitor, and such that a capacitance of the capacitor is changed. With the voltage maintained constant, charge in the capacitor changes, thereby producing the electrical signal.

In some embodiments, as shown in FIG. 30A, the liquid 2540 may be provided on one side close to the vibrating electrode membrane 2526. The vibrating electrode membrane 2526 may receive the vibrations transmitted by the liquid 2540 and the housing 2510. The distance between the vibrating electrode membrane 2526 and the perforated backplate 2525 may be changed by the vibrating electrode membrane 2526, thereby changing a signal of the capacitor composed of the vibrating electrode membrane 2526 and the perforated backplate 2525, which in turn is output to the processing circuit 2530 for processing.

In some embodiments, as shown in FIG. 30B, in order to make the frequency response of the sensor device 2500 flatter and have a smaller Q value, the liquid 2540 may be provided on one side close to the perforated backplate 2525. In this case, the liquid 2540 may permeate into a space between the perforated backplate 2525 and the vibrating electrode membrane 2526 through the hole(s) in the perforated backplate 2525, and an overall damping may be increased through the hole, a slit structure between the vibrating electrode membrane 2526 and the perforated backplate 2525, thereby achieving a damping adjustment of the sensor device 2500.

In some embodiments, there is an air domain in the liquid between the perforated backplate 2525 and the vibrating electrode membrane 2526. The air domain may be in a form of bubble in a slit between the perforated backplate 2525 and the vibrating electrode membrane 2526. Due to the presence of the perforated backplate 2525, the air domain may be confined in the slit structure between the vibrating electrode membrane 2526 and the perforated backplate 2525. The air domain and the liquid 2540 may form an additional resonant system that provides an additional resonant peak for the transducer unit 2520. The adjustment of the frequency response of the capacitive transducer may be achieved by adjusting the sizes of the air domain and/or the liquid domain in the slit. Further, the liquid 2540 is located between the vibrating electrode membrane 2526 and the perforated backplate 2525 to form a medium layer. By setting the material of the liquid 2540, parameters such as the dielectric constant of the capacitive transducer may be adjusted, thereby adjusting the sensitivity of the capacitive transducer. For example, the sensitivity of the capacitive transducer may be increased by filling with the liquid 2540 which has a relatively large dielectric constant.

Figure 31:
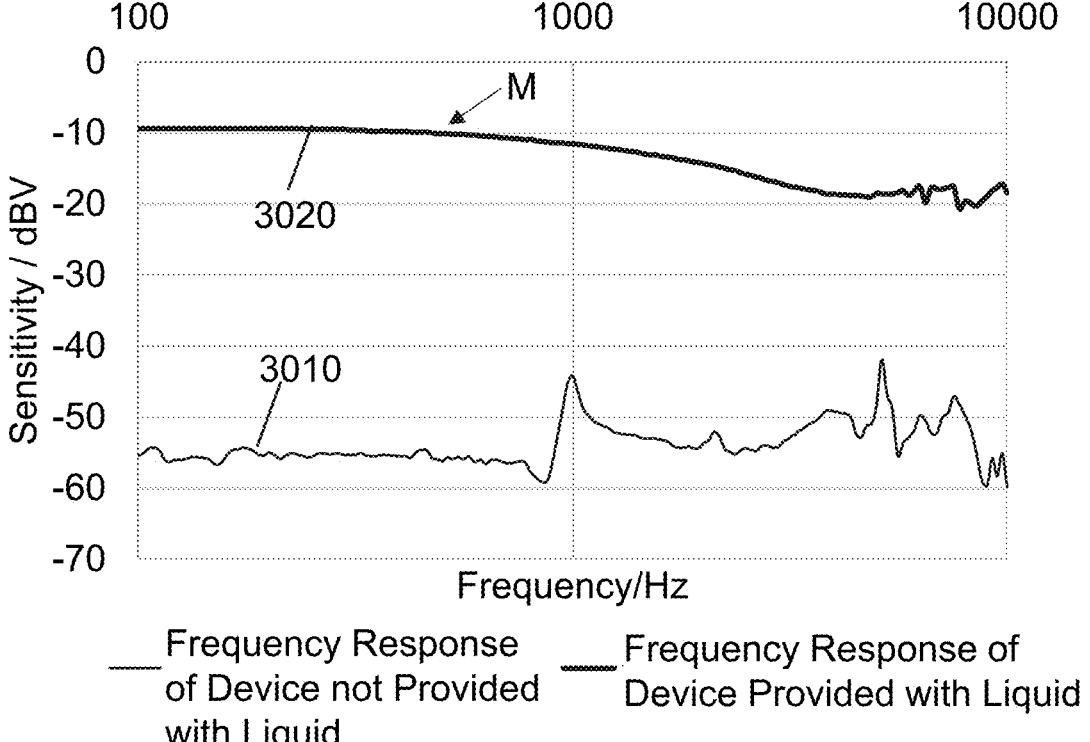
FIG. 31 is a frequency response curve diagram of an exemplary sensor device containing a capacitive transducer according to some embodiments of the present disclosure.

FIG. 31 is a frequency response curve diagram of an exemplary sensor device containing a capacitive transducer according to some embodiments of the present disclosure. As shown in FIG. 31, a curve 3010 represents a frequency response curve of a sensor device containing a capacitive transducer without providing the liquid 2540. A curve 3020 represents a frequency response curve of a sensor device (e.g., the sensor device shown in FIG. 30B) designed with liquid 2540 in a cavity close to one side of the perforated backplate 2525.

As can be seen from FIG. 31, by filling the liquid 2540 (corresponding to curve 3020), the sensor device 2500 can produce an additional resonant peak M in a lower frequency band, which greatly increases the output of the sensor device 2500, for example, under the excitation of 1 g, the increase is about 46 dBV. Further, by designing the liquid 2540 in the cavity close to the side of the perforated backplate 2525, a damping effect is achieved, causing the frequency response curve of the sensor device 2500 flatter.

Figure 32:
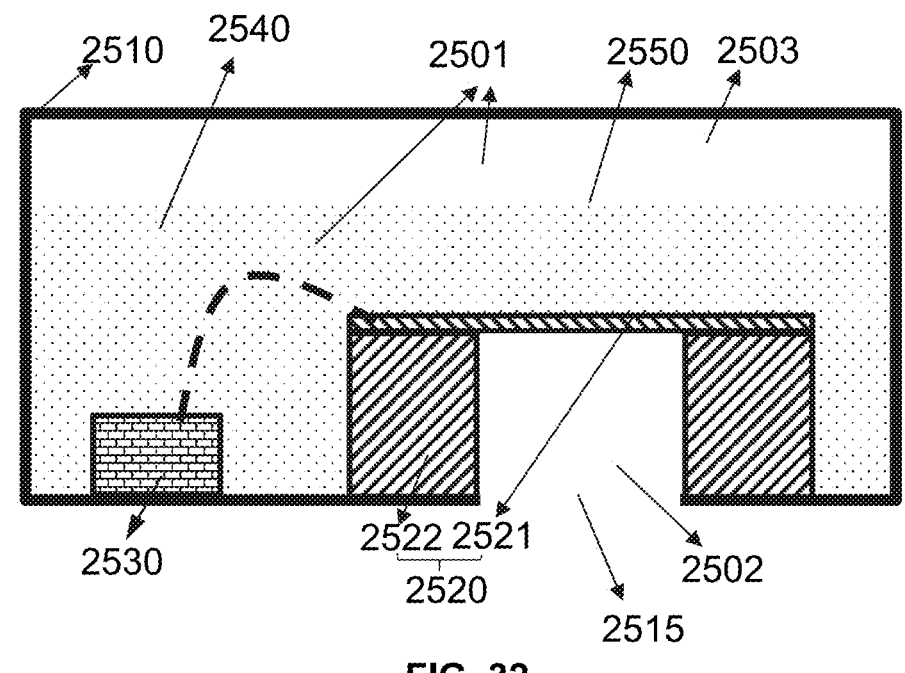
FIG. 32 is a schematic diagram illustrating an exemplary structure of a sensor device according to some embodiments of the present disclosure.

FIG. 32 is a schematic diagram illustrating an exemplary structure of a sensor device according to some embodiments of the present disclosure. In some embodiments, due to an interaction (as spring (Ka)-damping (Ra) shown in FIG. 25A) between the gas in an empty cavity (e.g., the rear cavity 2502) in contact with the transducer unit 2520 and the transducer unit 2520 (or the vibration pickup structure 2521), the equivalent stiffness of the gas in the empty cavity may affect the vibration performance of the vibration pickup structure 2521 and/or the additional resonant system, such that the output performance of the sensor device 2500 may be adjusted by changing the equivalent stiffness of the gas in the empty cavity to change the resonant frequency of the vibration pickup structure 2521 and/or the additional resonant system.

In some embodiments, the equivalent stiffness of the gas in the empty cavity may be changed by changing the volume of the empty cavity. In some embodiments, as shown in FIG. 32, when the front cavity 2501 is filled with liquid 2540, an air hole 2515 may be provided on the housing 2510 corresponding to the rear cavity 2502, so that the rear cavity 2502 is communicated with the external environment (it is equivalent to increasing the rear cavity 2502 to infinity), thereby reducing the equivalent stiffness of the gas in the rear cavity 2502, so that the additional resonant peak of the additional resonant system may be designed in a relatively low frequency band (e.g., 200 Hz-1500 Hz) to obtain a relatively high response output. In some embodiments, the sensor device 2500 shown in FIG. 32 may be used in an application scenario where there is no requirement for the sensor device to shield air noise.

Figure 33:
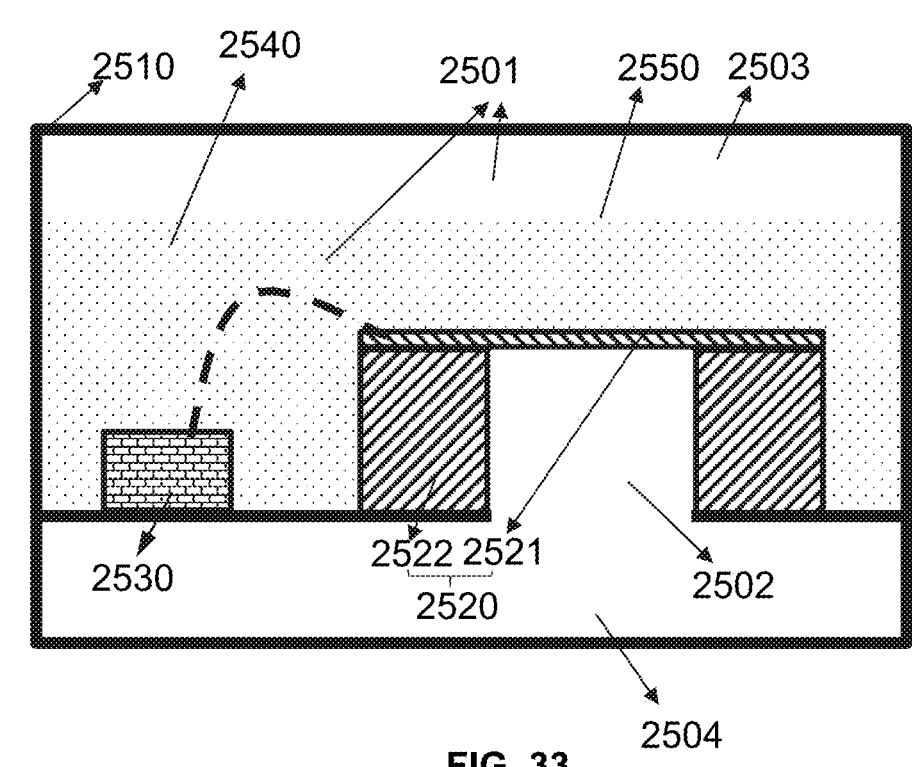
FIG. 33 is a schematic diagram illustrating an exemplary structure of a sensor device according to some embodiments of the present disclosure.
Figure 35A:
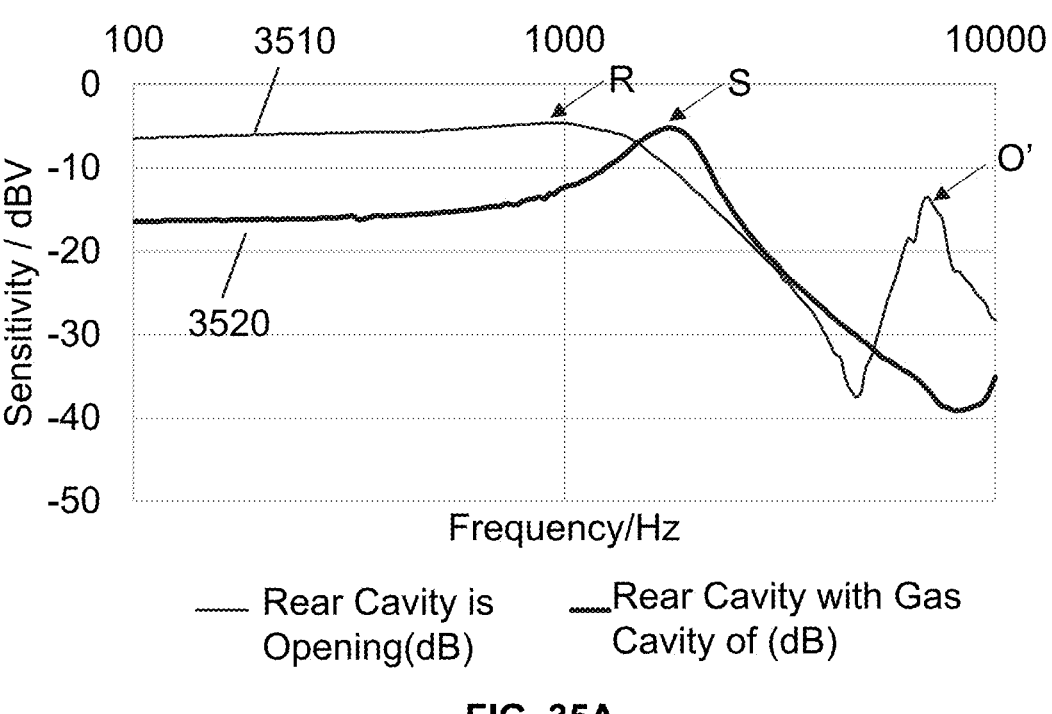
FIG. 35A is a frequency response curve diagram of an exemplary sensor device containing a gas cavity according to some embodiments of the present disclosure.

FIG. 33 is a schematic diagram illustrating an exemplary structure of a sensor device according to some embodiments of the present disclosure. In some embodiments, as shown in FIG. 33, the volume of the empty cavity may be increased by providing an additional gas cavity 2504 communicated with the rear cavity 2502 that is not filled with the liquid 2540, so that the equivalent stiffness of the gas in the empty cavity (the rear cavity 2502 and the gas cavity 2504) is reduced, such that the additional resonant peak of the additional resonant system may be designed in a lower frequency band, and a higher response output is obtained with a higher sensitivity. Specifically, the housing 2510 may further have a gas cavity 2504. One cavity of the front cavity 2501 and the rear cavity 2502 is filled with the liquid 2540, and the gas cavity 2504 is communicated with another cavity that is not filled with the liquid 2540 among the front cavity 2501 and the rear cavity 2502. For example, as shown in FIG. 33, the gas cavity 2504 may be communicated with the rear cavity 2502 when the front cavity 2501 is filled with the liquid 2540. In some embodiments, the gas cavity 2504 and the rear cavity 2502 may be collectively referred to as the rear cavity. The size of the rear cavity of the sensor device shown in FIG. 33 reduces relative to the sensor device shown in FIG. 32, thereby increasing the equivalent stiffness of the gas, causing both the intrinsic resonant peak of the vibration pickup structure 2521 and the additional resonant peak of the additional resonant system to shift toward high frequency (as shown in FIG. 35A). In some embodiments, the sensor device 2500 shown in FIG. 33 may be used in an application scenario where there is a requirement for the sensor device to shield the sensor device from the air noise, the size of the sensor device is not sensitive, and a relatively high level of sensitivity is required.

Figure 35B:
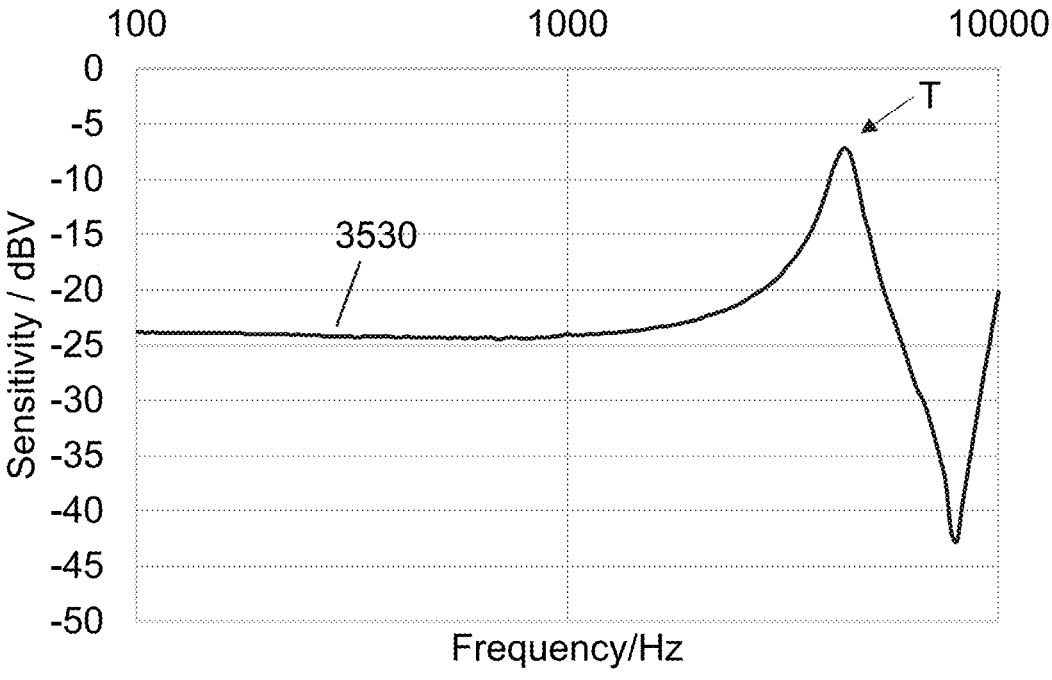
FIG. 35B is a frequency response curve diagram of an exemplary sensor device according to some embodiments of the present disclosure.

In some embodiments, the edge of the gas cavity 2504 may be flush with the housing 2510. In other words, the gas cavity 2504 may be removed to include only the rear cavity 2502 (as shown in FIG. 25B-FIG. 25D). At this point, compared with the sensor device shown in FIG. 33, since the size of the rear cavity reduces, the equivalent stiffness of the gas in the rear cavity increases, which allows the resonant peak of the vibration pickup structure 2521 and/or the additional resonant system to continue to move toward high frequency (as shown in FIG. 35B). In some embodiments, the sensor device 2500 shown in FIG. 25B-FIG. 25D may be applied in an application scenario where there is a requirement for the sensor device to shield the sensor device from the air noise, the size of the sensor device is sensitive, and a frequency of a signal to be obtained is relatively high.

In some embodiments, since the air pressures in the gas cavity 2504 and the rear cavity 2502 may affect the equivalent stiffness of the gas within the gas cavity 2504 and the rear cavity 2502, the output performance of the sensor device 2500 may be adjusted by adjusting the air pressures of the gas cavity 2504 and the rear cavity 2502. For example, the equivalent stiffness of the gas may be reduced by decreasing the air pressure in the gas cavity 2504 or the rear cavity 2502, thereby shifting the resonant peak of the vibration pickup structure 2521 and/or the additional resonant system to low frequency. In some embodiments, an effect of virtual cavity enlargement may be obtained by providing a porous dielectric material, a metamaterial, etc., in the gas cavity 2504 and/or the rear cavity 2502 to achieve a reduction in the equivalent stiffness of the gas, thereby shifting the resonant peak of the vibration pickup structure 2521 and/or the additional resonant system to low frequency. Exemplary porous dielectric material may include a metallic aluminum foam porous material, a ceramic porous material, a carbon foam porous material, etc. Exemplary metamaterial may include a "left-handed material," photonic crystal, a "super magnetic material," "metallic water," etc.

Figure 34:
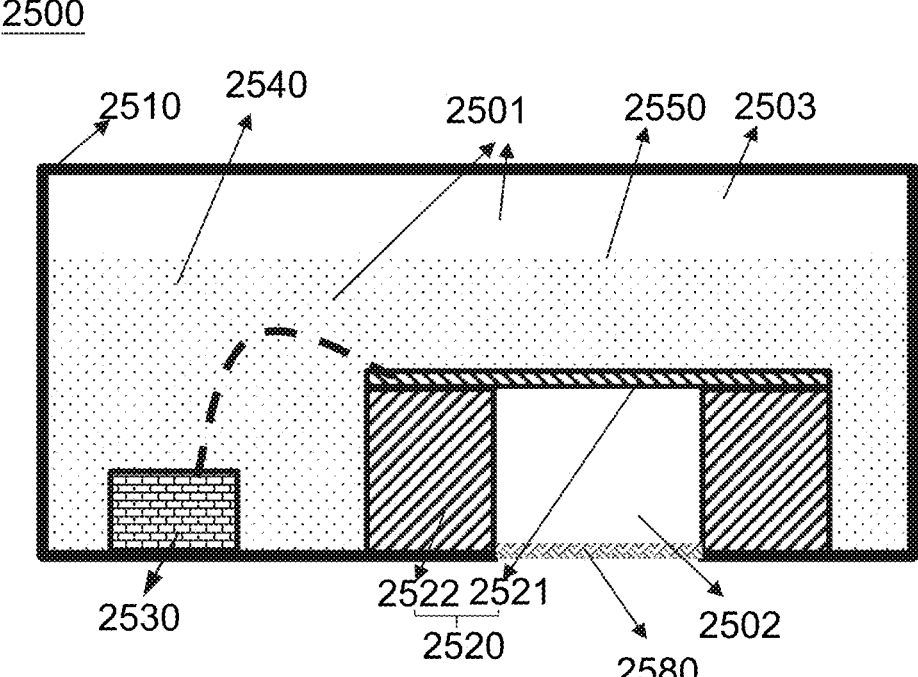
FIG. 34 is a schematic diagram illustrating an exemplary structure of a sensor device according to some embodiments of the present disclosure.

FIG. 34 is a schematic diagram illustrating an exemplary structure of a sensor device according to some embodiments of the present disclosure. In some embodiments, as shown in FIG. 34, the equivalent stiffness of the gas in the rear cavity 2502 may be changed by covering a second flexible membrane 2580 over the air hole 2515, thereby adjusting the output performance of the sensor device. For example, compared with a sensor device without being provided with the air hole 2515 (such as the sensor device 2500 shown in FIG. 25B), an action between the gas and the transducer unit 2520 may be reduced by covering the second flexible membrane 2580 over the air hole 2515, thereby reducing the equivalent stiffness of the gas and shifting the resonant peak of the vibration pickup structure 2521 and/or the additional resonant system to low frequency. As another example, relative to a sensor device only provided with the air hole (such as the sensor device shown in FIG. 32B), the equivalent stiffness of the gas may be increased by covering the second flexible membrane 2580 over the air hole 2515, which shift the resonant peak of the vibration pickup structure 2521 and/or the additional resonant system toward high frequency. In some embodiments, the second flexible membrane 2580 may be the same as or different from the first flexible membrane 2555.

FIG. 35A is a frequency response curve diagram of an exemplary sensor device containing a gas cavity according to some embodiments of the present disclosure. As shown in FIG. 35A, a curve 3510 represents a frequency response curve of a sensor device provided with the air hole 2515 (e.g., the sensor device as shown in FIG. 32). A curve 3520 represents a frequency response curve of a sensor device provided with the gas cavity 2504 (e.g., the sensor device as shown in FIG. 33). As can be seen from FIG. 35A, for the sensor device provided with the air hole 2515, the rear cavity 2502 is communicated with the external environment, and the frequency response curve 3510 has an intrinsic resonant peak 0' at a relatively high frequency associated with the structure of the transducer unit (e.g., a piezoelectric membrane, etc.) and an additional resonant peak R at a relatively low frequency band associated with the liquid 2540. By providing the gas cavity 2504 (corresponding to curve 3520), which corresponds to reduce the volume of the rear cavity, such that the equivalent stiffness of the gas in the rear cavity increases, which in turn shifts the intrinsic resonant peak of the sensor device (not shown) and an additional resonant peak S of the additional resonant system to high frequency.

FIG. 35B is a frequency response curve diagram of an exemplary sensor device according to some embodiments of the present disclosure. As shown in FIG. 35B, a curve 3530 represents a frequency response curve of a sensor device (e.g., the sensor device as shown in FIG. 25B) when the edge of the gas cavity 2504 is flush with the housing 2510.

Comparing FIG. 35A and FIG. 35B, when the edge of the gas cavity 2504 is flush with the housing 2510, relative to the curve 3520, it is equivalent to continue to reduce the volume of the rear cavity, thereby continuing to increase the equivalent stiffness of the gas, so that the intrinsic resonant peak of the vibration pickup structure 2521 and the additional resonant peak of the additional resonant system continue to shift toward high frequency, e.g., a frequency corresponding to an additional resonant peak T is greater than a frequency corresponding to an additional resonant peak S.

Figure 36:
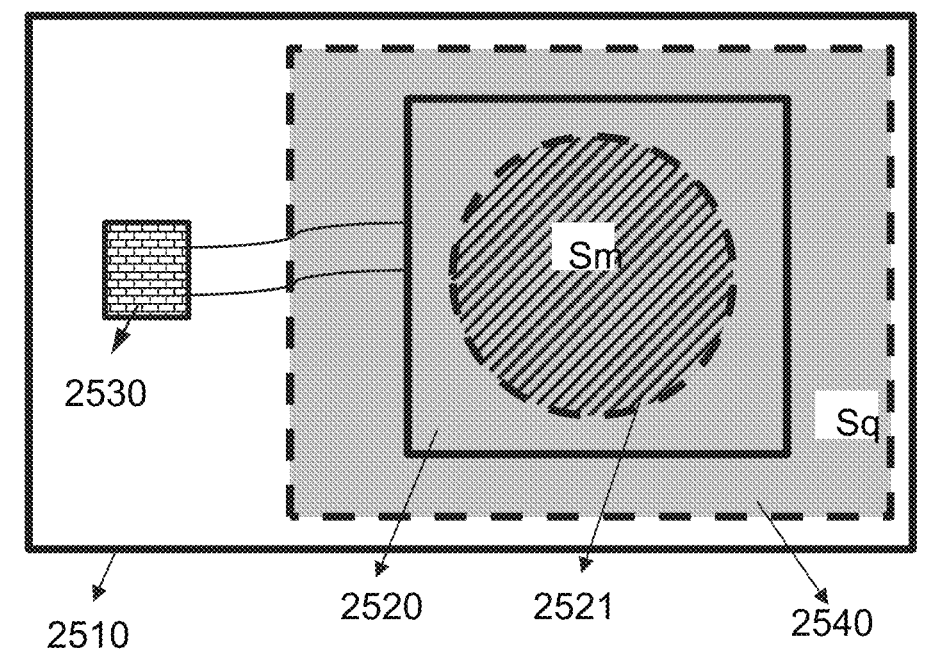
FIG. 36 is a schematic diagram illustrating a top view structure of an exemplary sensor device according to some embodiments of the present disclosure.
Figure 37:
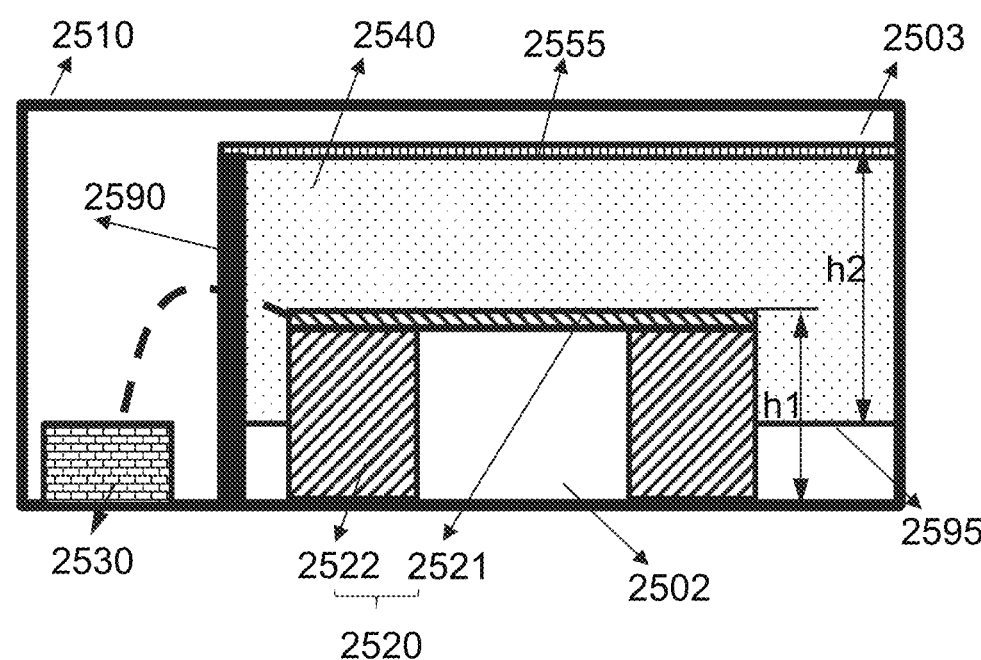
FIG. 37 is a schematic diagram illustrating an exemplary structure of a sensor device according to some embodiments of the present disclosure.
Figure 38:
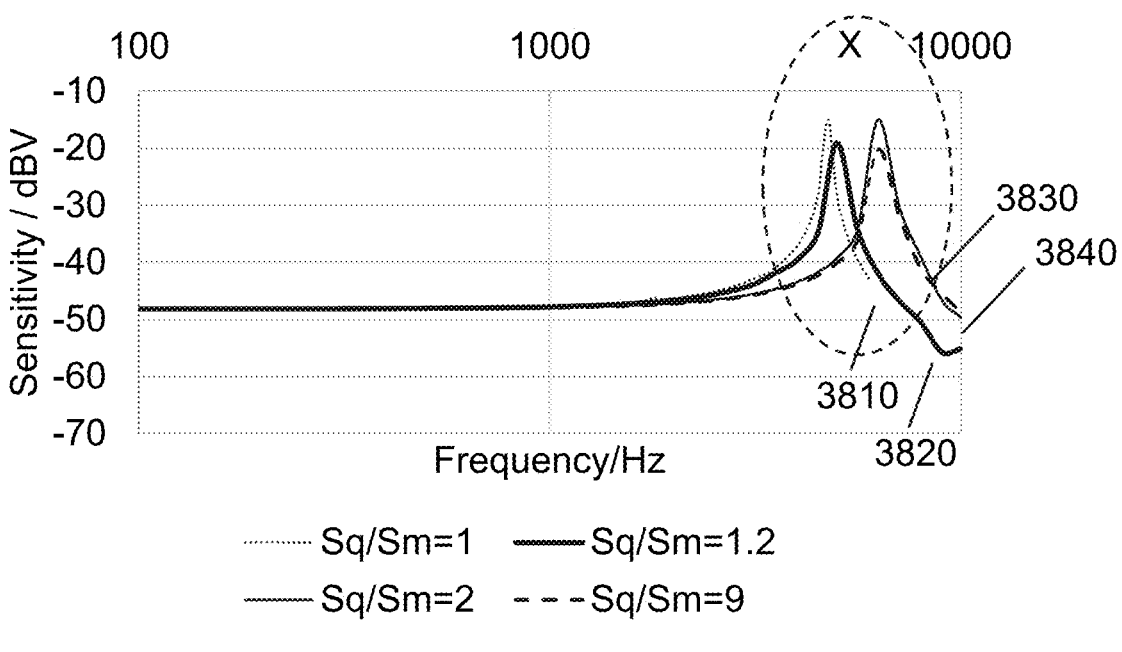
FIG. 38 is a frequency response curve diagram of an exemplary sensor device provided with liquid according to some embodiments of the present disclosure.
Figure 39:
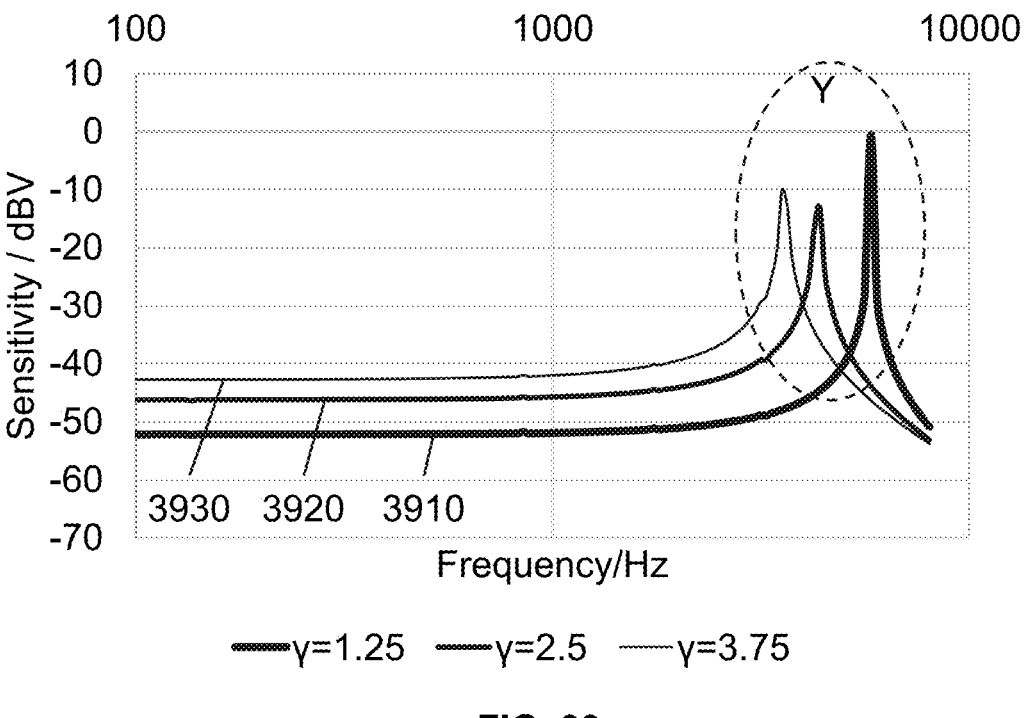
FIG. 39 is a frequency response curve diagram of an exemplary sensor device provided with liquid according to some embodiments of the present disclosure.

FIG. 36 is a schematic diagram illustrating a top view structure of an exemplary sensor device according to some embodiments of the present disclosure. FIG. 37 is a schematic diagram illustrating an exemplary structure of a sensor device according to some embodiments of the present disclosure. In some embodiments, since the mass of the liquid 2540 affects related values of the additional resonant system (i.e., the spring (Kp')-mass (Ml)-damping (Rp') system), which in turn affects the output of the sensor device 2500 (e.g., the intrinsic frequency of the sensor device 2500, the sensitivity of the output of the sensor device 2500, etc.) (as shown in FIG. 38 or FIG. 39), the parameters of the additional resonant system may be adjusted by adjusting the mass of the liquid 2540, thereby adjusting the output of the transducer unit 2520 to achieve the adjustment of the additional resonant frequency and the sensitivity of the output of the sensor device 2500.

In some embodiments, the liquid 2540 may not fully fill the front cavity 2501. The liquid 2540 may be filled in a cavity formed by the support structure (e.g., the support structure 2590 in FIG. 37) with the housing 2510 and/or a support plate (e.g., the support plate 2595 in FIG. 37). In some embodiments, the mass of the liquid 2540 in the sensor device 2500 may be adjusted by adjusting a ratio of a projected area of the liquid 2540 in the vibration direction of the vibration pickup structure 2521 to a projected area of the vibration pickup structure 2521 in the vibration direction. For example, when the projected area of the vibration pickup structure 2521 is constant, when the ratio is small, since an inner wall of the housing 2510 is close to the liquid 2540 above the vibration pickup structure 2521, a restraining effect on the liquid is relatively large, the flow of the liquid 2540 is blocked, and an effective mass is large at this time. When the ratio is large, since the inner wall of the housing 2510 is away from the liquid 2540 above the vibration pickup structure 2521, the restraining effect on the liquid is relatively small, the flow resistance of the liquid 2540 is relatively small, at this time the effective mass is small. Therefore, in a certain range, as the ratio increases, the effective mass of the liquid 2540 decreases. Further, beyond that range, as the ratio increases, the effective mass of the liquid 2540 remains essentially constant. In the present disclosure, the effective mass of the liquid may refer to an equivalent mass that acts on the vibration pickup structure 2521 along the vibration direction of the vibration pickup structure 2521 and becomes a portion of the mass in its spring-mass-damping system.

As an example only, as shown in FIG. 36, Sq denotes a projected area of the liquid 2540 in the vibration direction of the vibration pickup structure 2521, i.e., an area of the dotted box, and Sm denotes a projected area of the pickup vibration structure 2521 in its vibration direction, i.e., an area of a dotted circular box, then a ratio α between the two may be expressed as:

$$\alpha = \frac{Sq}{Sm}. \tag{5}$$

In some embodiments, in order to make the additional resonant frequency provided by the additional resonant system to be in a range of 200 Hz-2000 Hz, a ratio of the projected area Sq of the liquid 2540 in the vibration direction of the vibration pickup structure 2521 to the projected area Sm of the vibration pickup structure 2521 in the vibration direction is within a range of 1-30. Further, in order to make the additional resonant frequency provided by the additional resonant system to be in a range of 200 Hz-1500 Hz, a ratio of the projected area Sq of the liquid 2540 in the vibration direction of the vibration pickup structure 2521 to the projected area Sm of the vibration pickup structure 2521 in the vibration direction is within a range of 1-20. Further, in order to make the additional resonant frequency provided by the additional resonant system to be in a range of 200 Hz-1000 Hz, a ratio of the projected area Sq of the liquid 2540 in the vibration direction of the vibration pickup structure 2521 to the projected area Sm of the vibration pickup structure 2521 in the vibration direction is within a range of 1-15.

In some embodiments, the ratio α may be related to the difficulty of the packaging process of the sensor device. For example, when the sensor device is a MEMS sensor device, based on the 2.7 mm×1.8 mm package process of the MEMS sensor device, when the size of the vibration pickup structure 2521 is 0.9 mm×0.9 mm, the ratio α may be 6, allowing the transducer unit 2520 (or the sensor device 2500) to have a smaller size with a higher sensitivity and larger bandwidth. In some embodiments, based on the limits of the MEMS sensor device packaging process, the ratio α may be within a range of 1-7.

In some embodiments, the mass of the liquid 2540 in the sensor device 2500 may be adjusted by adjusting the ratio of a filling size of the liquid 2540 in the cavity (e.g., the front cavity 2501 or the rear cavity 2502) in the vibration direction of the vibration pickup structure 2521 to the size of the transducer unit 2520 in the vibration direction. For example, when the dimension of the transducer unit 2520 remains constant, the larger the ratio, the larger the filling size of the liquid 2540 in the cavity, and the larger the mass of the liquid 2540. Conversely, the smaller the ratio, the smaller the filling size of the liquid 2540 in the cavity, and the smaller the mass of the liquid 2540.

Merely by way of example, as shown in FIG. 37, $h_1$ denotes the dimension of the transducer unit 2520 in its vibration direction, $h_2$ denotes the filling size of the liquid 2540 in the front cavity 2501 in the vibration direction, then a ratio γ between the two may be expressed as:

$$\gamma = \frac{h_2}{h_1}. \tag{6}$$

In some embodiments, since the increase of the ratio γ of the sensor device makes a height dimension of an entire sensor device increase. Therefore, when considering the mass of the liquid 2540, it is necessary to consider the performance of the sensor device in conjunction with the size of the sensor device. In some embodiments, the ratio γ is not less than 0.5. For example, the ratio γ may be greater than or equal to 0.5. Further, the ratio γ may be within a range of 1 to 15. Further, the ratio γ may be within a range of 1-10. Further, the ratio γ may be within a range of 1-7.5.

FIG. 38 is a frequency response curve diagram of an exemplary sensor device provided with liquid 2540 according to some embodiments of the present disclosure. As shown in FIG. 38, a curve 3810 represents a frequency response curve of a sensor device when a ratio of the projected area Sq of the liquid 2540 in the vibration direction of the vibration pickup structure 2521 to the projected area Sm of the vibration pickup structure 2521 in the vibration direction is equal to 1 (i.e., α=1). A curve 3820 represents a frequency response curve of the sensor device when the ratio α=1.2. A curve 3830 represents a frequency response curve of the sensor device when the ratio α=2. A curve 3840 represents a frequency response curve of the sensor device when the ratio α=9.

As can be seen from FIG. 38, for the sensor device provided with the liquid 2540, within a certain range (e.g., in a condition that the ratio α is not greater than 2), as the value of α increases continuously, since the effective mass of the liquid 2540 decreases, the frequency (i.e., the resonant frequency) corresponding to the resonant peak (e.g., the resonant peak in the dotted coil X) of the sensor device 2500 gradually increases, and the sensitivity of the sensor device 2500 remains essentially unchanged. Therefore, by adjusting α, a sensor device with a wider frequency band and a relatively high sensitivity may be obtained. When exceeding a certain range (e.g. a is greater than 2), as the ratio α further increases, the effective mass of the liquid 2540 remains essentially constant, the resonant frequency of the sensor device 2500 remains essentially constant, and the electrical signal output by the sensor device 2500 is essentially the same.

In summary, by adjusting the ratio α (e.g., the ratio α is within a range of 1-30), the sensor device 2500 may be made to have a relatively wide frequency band (i.e., a flat frequency response range) and have a high sensitivity.

FIG. 39 is a frequency response curve diagram of an exemplary sensor device provided with liquid 2540 according to some embodiments of the present disclosure. As shown in FIG. 39, a curve 3910 represent a frequency response curve of a sensor device when a ratio of the filling size of the liquid 2540 in the front cavity 2501 to the size of the vibration pickup structure 2521 in the vibration direction is 1.25 (γ=1.25). A curve 3920 represents a frequency response curve of the sensor device when the ratio γ=2.5. A curve 3930 represents a frequency response curve of the sensor device when the ratio γ=3.75.

As can be seen from FIG. 39, for the sensor device provided with the liquid 2540, as the ratio γ constantly increases, the frequency (i.e., the resonant frequency) corresponding to the resonant peak (e.g., the resonant peak in a dotted coil Y) of the sensor device 2500 gradually decreases, and the sensitivity of the sensor device 2500 gradually increases. Therefore, by adjusting the ratio γ (e.g., the ratio γ is not less than 0.5), the sensor device 2500 can have a relatively high sensitivity and a suitable size.

Figure 40:
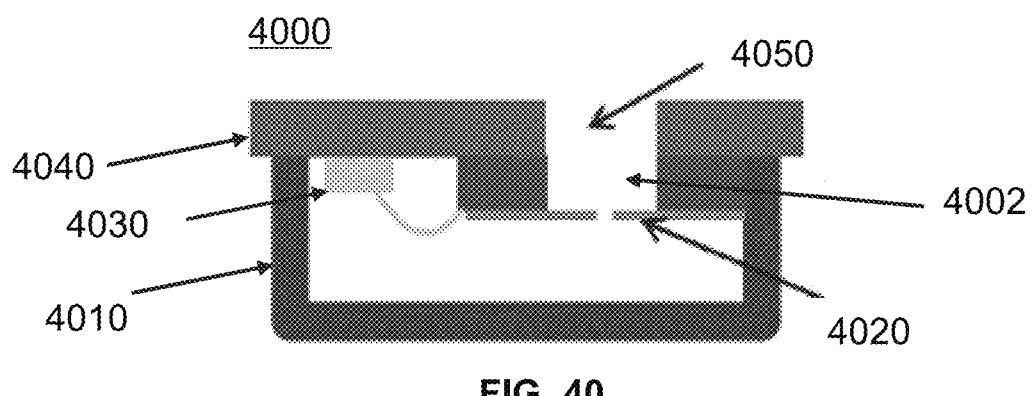
FIG. 40 is a schematic diagram illustrating an exemplary structure of an air-conduction microphone according to some embodiments of the present disclosure.

FIG. 40 is a schematic diagram illustrating an exemplary structure of an air-conduction microphone according to some embodiments of the present disclosure.

The difference between an air-conduction microphone 4000 and a bone-conduction microphone is that the air-conduction microphone 4000 produces an output signal in response to an air-conduction sound. In some embodiments, the vibrating membrane of the air-conduction microphone may separate the front cavity and the rear cavity, while the front cavity and the rear cavity of the bone-conduction microphone may be communicated with each other or not. As shown in FIG. 40, the air-conduction microphone 4000 includes a housing 4010, a transducer unit 4020, a processing circuit 4030, and a PCB 4040. Exemplarily, the air-conduction microphone 4000 is a piezoelectric microphone. The transducer unit 4020 may include the vibrating membrane and a piezoelectric transducer (not shown in the FIG. 40). When an air-conduction sound signal enters a sound inlet 4050 and a rear cavity 4002, the vibrating membrane may vibrate and the piezoelectric transducer produces an electrical signal in response to the sound pressure of the vibrating membrane. The electrical signal may be transmitted to the processing circuit 4030 through wires or be transmitted to other components through a circuit on the PCB 4040.

Figure 41:
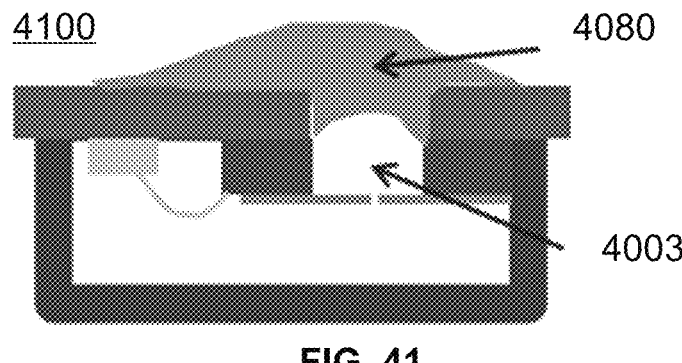
FIG. 41 is a schematic diagram illustrating a sensor device according to some embodiments of the present disclosure.

FIG. 41 is a schematic diagram illustrating a sensor device according to some embodiments of the present disclosure.

As shown in FIG. 41, a sensor device 4100 is formed by filling the air-conduction microphone 4000 with the liquid. In some embodiments, the sensor device 4100 is filled with the liquid 4080 at the sound inlet 4050. The size of the sound inlet 4050 is small and may be within a range of 0.01 mm to 5 mm in diameter. For example, the diameter of the sound inlet 4050 is 0.3 mm, 0.5 mm, 0.75 mm, 0.8 mm, 0.95 mm, 1.1 mm, 1.2 mm, 1.5 mm, 2 mm, 3 mm, 5 mm, etc. When the liquid 4080 is filled to the sound inlet 4050, in the rear cavity 4002 and the sound inlet 4050, the liquid 4080 and the vibrating membrane have undischarged air, and the undischarged air forms a bubble 4003. At this time, the cavity (i.e., the rear cavity 4002) at one side of the vibrating membrane of the sensor device 4000 has both the liquid 4080 and the bubble 4003, and the cavity at another side of the vibrating membrane is the empty cavity (not being filled with the liquid).

Figure 42:
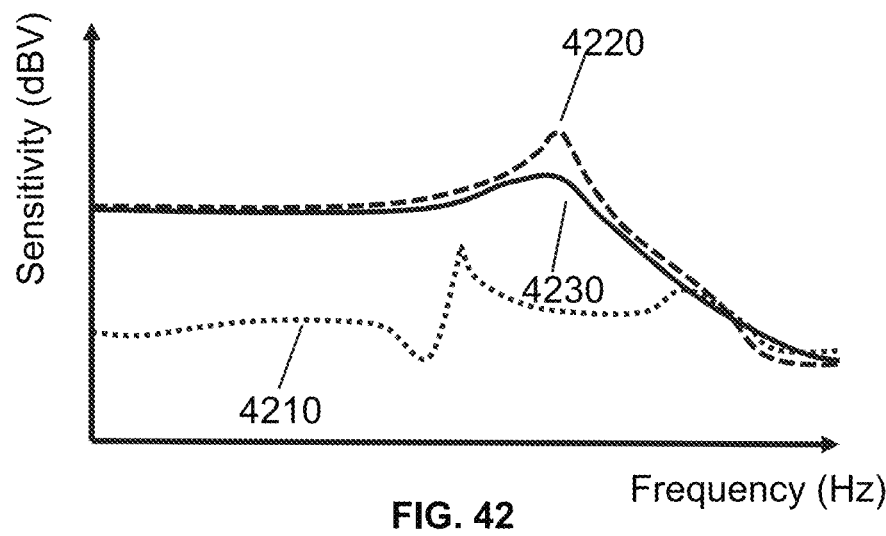
FIG. 42 is a frequency response curve diagram of an air-conduction microphone before and after being filled with liquid according to some embodiments of the present disclosure.

FIG. 42 is a frequency response curve diagram of an air-conduction microphone before and after being filled with liquid according to some embodiments of the present disclosure.

As shown in FIG. 42, frequency response curves 4210-4230 are respectively frequency response corves of an air-conduction microphone not filled with the liquid (e.g., the air-conduction microphone 4000), a sensor device (e.g., the sensor device 4100) filled with the first liquid (e.g., the liquid with a kinematic viscosity of 0.65 cst), and a sensor device filled with the second liquid (e.g., the liquid with a kinematic viscosity of 50 cst).

In conjunction with the frequency response curves 4210-4230, after the air-conduction microphone is partially filled with the liquid, a sensor device with the second resonant system 740 is formed, and the overall sensitivity is significantly increased (e.g., 15-50 dBV). Meanwhile, for the sensor device filled with liquid of different viscosities, for example, a sensor device filled with a kinematic viscosity of 50 cst and a sensor device filled with a kinematic viscosity of 0.65 cst, a difference between a sensitivity at the resonant peak (e.g., the first or third resonant peak) and a sensitivity in a flat region before the resonant peak is about 5-15 dBV and 15-40 dBV, respectively. It can be seen from the comparison that filling the sensor device with the liquid of a higher kinematic viscosity has a better effect on reducing the Q value of the sensor device.

In some embodiments, the kinematic viscosity range of the liquid filled in the piezoelectric air-conduction microphone is within a range of 0.1-500 cst. In some embodiments, the kinematic viscosity range of the liquid filled in the piezoelectric air-conduction microphone is within a range of 0.5-200 cst. In some embodiments, the kinematic viscosity range of the liquid filled in the piezoelectric air-conduction microphone is within a range of 10-200 cst.

Figure 43:
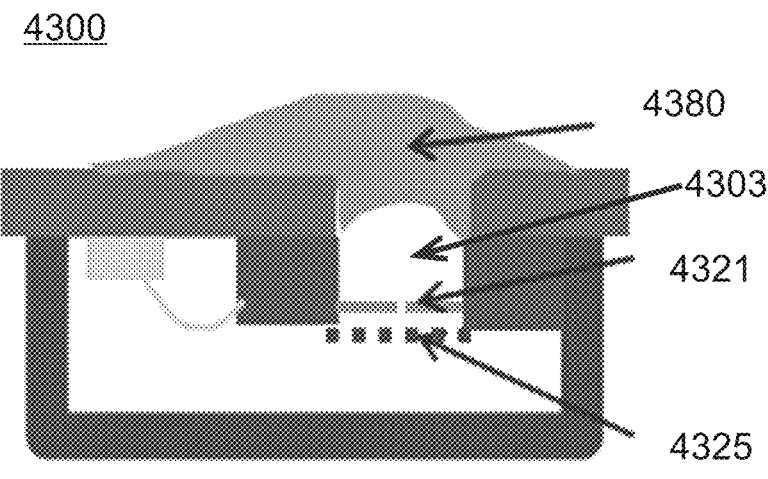
FIG. 43 is a schematic diagram illustrating a sensor device according to some embodiments of the present disclosure.

FIG. 43 is a schematic diagram illustrating a sensor device according to some embodiments of the present disclosure.

As shown in FIG. 43, a sensor device 4300 is an air-conduction microphone filled with the liquid. Exemplarily, the sensor device 4300 may be a capacitive microphone, and the transducer unit of the capacitive microphone may include a vibrating membrane 4321 (e.g., a vibrating electrode membrane) and a backplate 4325 (e.g., a perforated backplate). The vibrating membrane 4321 and the backplate 4325 are disposed parallel and close to each other to form the two poles of the capacitor. The power provides a voltage to both poles of the capacitor. When there is an external vibration signal, the vibrating membrane 4321 may vibrate based on the external vibration signal, while the backplate 4325 is fixed, thereby changing the distance between the two poles of the capacitor, such that the capacitance of the capacitor is changed. With the voltage maintained constant, the charge in the capacitor changes, thereby producing an electrical signal. Other structures and components of the sensor device 4300 are the same as or similar to the sensor device 4100 and may not be described herein.

Similar to the sensor device 4100, the sensor device 4300 is filled with the liquid 4380 at the sound inlet. When the liquid 4380 is filled to the sound inlet, in the rear cavity and the sound inlet, there is undischarged air between the liquid 4380 and the vibrating membrane, thereby forming the bubble 4303. At this time, both the liquid 4380 and the bubble 4303 are simultaneously located on one side of the vibrating membrane of the sensor device 4300, while the empty cavity (no liquid filling) is located on another side of the vibrating membrane.

Figure 44:
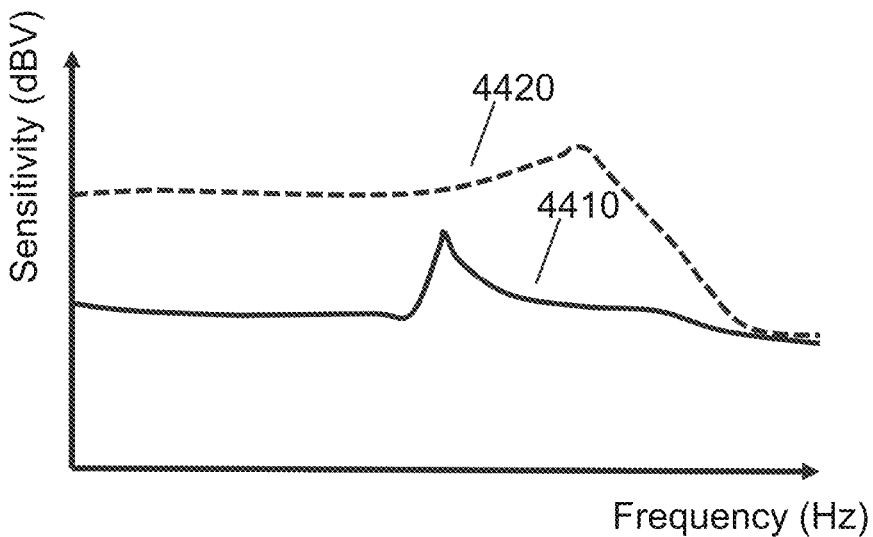
FIG. 44 is a frequency response curve diagram of a sensor device filled with liquid of different kinematic viscosities according to some embodiments of the present disclosure.

FIG. 44 is a frequency response curve diagram of a sensor device filled with liquid of different kinematic viscosities according to some embodiments of the present disclosure.

A frequency response curve 4410 and a frequency response curve 4420 are respectively a frequency response curve of an air-conduction microphone not filled with the liquid corresponding to the sensor device (e.g., the sensor device 4300) and a frequency response curve of an air-conduction microphone filled with liquid (e.g., the silicone oil with a kinematic viscosity of 0.65 cst).

In conjunction with the frequency response curves 4410 and 4420, it can be seen that relative to the air-conduction microphone not filled with the liquid, an increase of the overall sensitivity of the sensor device 4300 where the sound inlet is filled with the liquid is 10-50 dBV. In some embodiments, the increase of the overall sensitivity is 15-40 dBV. In some embodiments, the increase of the overall sensitivity is 20-35 dBV.

In some embodiments, the kinematic viscosity of the filled liquid is 200 cst or less. In some embodiments, the kinematic viscosity of the filled liquid is 100 cst. In some embodiments, the kinematic viscosity of the filled liquid is 80 cst or less. In some embodiments, the kinematic viscosity of the filled liquid is 50 cst or less.

Figure 45:
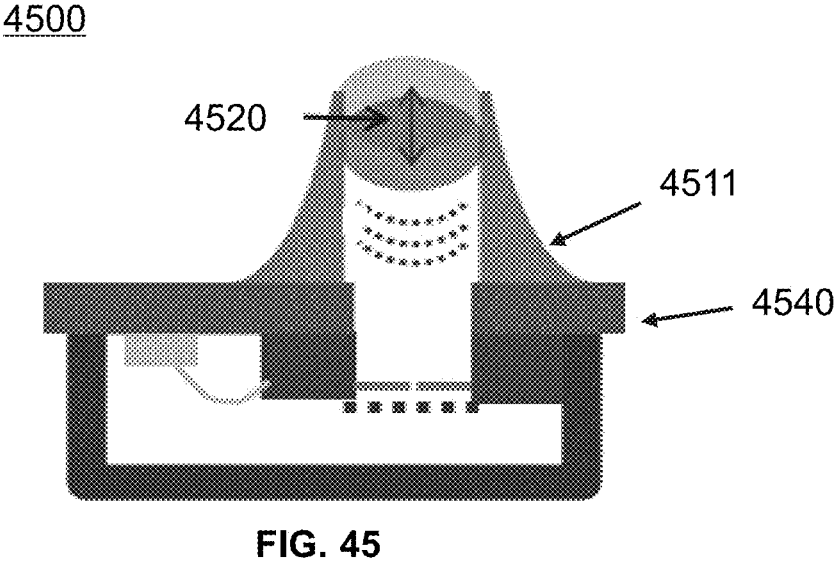
FIG. 45 is a schematic diagram illustrating an exemplary sensor device according to some embodiments of the present disclosure.

FIG. 45 is a schematic diagram illustrating an exemplary sensor device according to some embodiments of the present disclosure.

The sensor device 4500 is an air-conduction microphone filled with the liquid, where the diameter of the sound inlet and the diameter of the rear cavity are in the millimeter range, such that a volume to be filled with the liquid is relatively small. According to FIG. 44, an optional range of the kinematic viscosity of the filled liquid is relatively small, e.g., less than 50 cst. In some embodiments, a tube column may be added outside the sound inlet to obtain a larger cavity (a cavity jointly formed by the rear cavity, the sound inlet, and the tube column) for filling the liquid 4520. Exemplarily, as shown in FIG. 45, the sensor device 4500 is a capacitive microphone with a tube column 4511 provided outside the sound inlet. The tube column 4511 is fixedly connected to the PCB 4540. The diameter of the tube column 4511 is greater than or equal to the diameter of the sound inlet. The height of the tube column may be set according to the frequency response of the sensor device 4500 formed after being filled with the liquid or the kinematic viscosity of the filled liquid. For example, within a certain range (e.g., within 2 mm, within 3 mm, etc.), as the height of the tube column increases, the kinematic viscosity range of the optional filled liquid is increased. The height of the tube column may be any value in the range of 0.1 to 50 mm. The height of the tube column may be, for example, 0.1 mm, 0.3 mm, 0.5 mm, 0.8 mm, 1 mm, 1.2 mm, 1.5 mm, 2 mm, 2.2 mm, 5 mm, 10 mm, etc., or any other height of the tube column.

Figure 46:
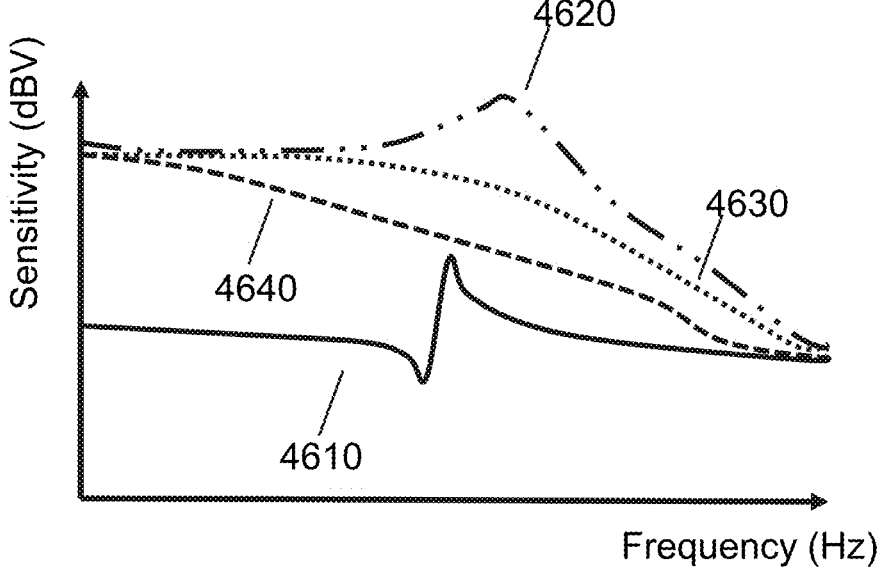
FIG. 46 is a frequency response curve diagram of a sensor device filled with liquid of different viscosities according to some embodiments of the present disclosure.

FIG. 46 is a frequency response curve diagram of a sensor device filled with liquid of different viscosities according to some embodiments of the present disclosure.

Frequency response curves 4610-4640 are frequency response curves of an air-conduction microphone corresponding to a sensor device (e.g., the sensor device 4500) before filled with liquid and filled with liquid of different kinematic viscosities (5 cst, 350 cst, and 1000 cst, respectively).

In conjunction with the frequency response curves 4610-4640, after filling the liquid, an increase of the overall sensitivity of the sensor device 4500 is about 10-50 dBV. In some embodiments, an increase of the overall sensitivity may be 15-40 dBV. In some embodiments, an increase of the overall sensitivity may be 20-35 dBV. The sensor device 4500 has the same increase in intensity as the sensor device (e.g., the sensor device 4300) without adding the tube column. With the addition of the tube column 4511, as the kinematic viscosity of the liquid increases, the sensitivity of the sensor device 4500 decreases gradually within a certain range (e.g., 200-6000 Hz, 200-5000 Hz, 500-3000 Hz, etc.). In a certain range of the liquid viscosity, the sensitivity of the sensor device 4500 increases more steadily. The kinematic viscosity range of the filled liquid may be greater than the optional kinematic viscosity range in FIG. 44. In some embodiments, the kinematic viscosity of the filled liquid may be 500 cst or less. In some embodiments, the kinematic viscosity of the filled liquid may be 350 cst or less. In some embodiments, the kinematic viscosity of the filled liquid may be 100 cst or less.

Figure 47:
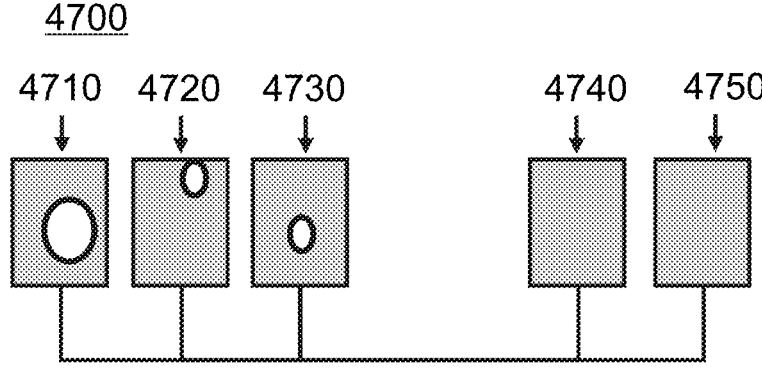
FIG. 47 is a schematic diagram illustrating an exemplary sensing device according to some embodiments of the present disclosure.

FIG. 47 is a schematic diagram illustrating an exemplary sensing device according to some embodiments of the present disclosure.

In some embodiments, a sensing device 4700 may include multiple sensor devices (e.g., the sensor devices 1200, 1810, 2500, 4100, 4300). At least a portion of the multiple sensor devices are the sensor devices including the first resonant system 530 or the sensor devices including the second resonant system 740. Exemplarily, at least a portion of the sensor devices are sensor devices filled with the liquid (e.g., the sensor devices 2500, 4100, 4300, 4500). In some embodiments, one or more of the sensor devices (e.g., the sensor devices 2500, 4100, 4300, 4500) among the at least a portion of the sensor devices filled with the liquid contain a bubble (in the present disclosure, the bubble may also be referred to as an air cavity). In some embodiments, the multiple sensor devices may be of the same type. For example, the multiple sensor devices may all be air-conduction microphones, bone-conduction microphones, energy harvesters, gyroscopes, etc. In other embodiments, at least one of the multiple sensor devices may be of a different type. For example, the multiple sensor devices include air-conduction microphones and bone-conduction microphones. Exemplarily, as shown in FIG. 47, the sensing device 4700 includes the bone-conduction microphones 4710-4750. The bone-conduction microphones 4710-4750 are respectively provided at different locations on the human body (e.g., different locations around the ear) for picking up sound of different locations of the human body and determining acoustic characteristics of the sound at a particular location (e.g., within the auricle) based on the sound at the different locations. In some embodiments, the bone-conduction microphones 4710-4750 are all sensor devices filled with the liquid. The filled liquid of the bone-conduction microphones 4710-4730 may contain bubbles. The bone-conduction microphones 4740 and 4750 may be filled with the liquid and contain no bubbles. In some embodiments, the bone-conduction microphones 4710-4730 and bone-conduction microphones 4740 and 4750 are used to output signals of different frequencies, respectively. As can be seen from the description of FIG. 11-FIG. 39, the sensor device with a bubble in the filled liquid has a better response at the mid-to-low frequency and can be used for the output of mid-to-low frequency electrical signals. The sensor device where the filled liquid does not have the bubbles may be used for the output of high frequency electrical signals. Therefore, the bone-conduction microphones 4710-4730 may be used for outputting electrical signals at mid-to-low frequency, and the bone-conduction microphones 4740 and 4750 may be used for outputting electrical signals at high frequency.

It should be noted that the above descriptions of the sensing device 4700 are merely the exemplary description, and does not limit the present disclosure to the scope of the cited embodiments. It may be understood that those skilled in the art, after understanding the principle of the system, arbitrary amendments to its structure and combination may be made without departing from this principle. Such variations are within the scope of protection of the present disclosure.

In some embodiments, the sensing device 4700 may include a first sensor device containing the first resonant system 530 (e.g., the sensor device 1200 filled with the liquid) and at least one sensor device containing only the transducer unit. The first sensor device outputs a mid-to-low frequency signal. The sensor device(s) containing only the transducer unit outputs a mid-to-high frequency signal.

In some embodiments, the sensing device 4700 may include the first sensor device containing the first resonant system 530 (e.g., the sensor device 1200 filled with the liquid) and a second sensor device containing the second resonant system 740 (e.g., the sensor device 2500 filled with the liquid and the bubble). The first sensor device outputs a mid-to-low frequency signal. The second sensor device outputs a mid-to-high frequency signal.

In some embodiments, the sensing device 4700 includes the first sensor device and a third sensor device containing the first resonant system 530 or the second resonant system 740 (e.g., the sensor device 2500 shown in FIG. 25A-FIG.

37). The first sensor device outputs a mid-to-low frequency signal. The third sensor device outputs a mid-to-high frequency signal.

In some embodiments, the sensing device 4700 includes the first sensor device and a fourth sensor device containing the second resonant system 740 (e.g., the sensor device 4100, 4300, or 4500 shown in FIGS. 40-45). The first sensor device outputs a mid-to-low frequency signal. The fourth sensor device outputs a mid-to-high frequency signal.

In some embodiments, the sensing device 4700 includes the second sensor device and at least one sensor device containing only the transducer unit. The second sensor device outputs a mid-to-low frequency signal. The at least one sensor device containing only the transducer unit outputs a mid-to-high frequency signal.

In some embodiments, the sensing device 4700 includes two second sensor devices. The two second sensor devices output a mid-to-low frequency signal and a mid-to-high frequency signal, respectively.

In some embodiments, the sensing device 4700 includes the second sensor device and the third sensor device. The second sensor device outputs a mid-to-low frequency signal. The third sensor device outputs a mid-to-high frequency signal.

In some embodiments, the sensing device 4700 includes the second sensor device and the fourth sensor device. The second sensor device outputs a mid-to-low frequency signal. The fourth sensor device outputs a mid-to-high frequency signal.

In some embodiments, the sensing device 4700 includes the third sensor device and the at least one sensor device containing only the transducer unit. The third sensor device outputs a mid-to-low frequency signal. The at least one sensor device containing only the transducer unit outputs a mid-to-high frequency signal.

In some embodiments, the sensing device 4700 includes the third sensor device and the first sensor device. The third sensor device outputs a mid-to-low frequency signal. The first sensor device outputs a mid-to-high frequency signal.

In some embodiments, the sensing device 4700 includes the third sensor device and the second sensor device. The third sensor device outputs a mid-to-low frequency signal. The second sensor device outputs a mid-to-high frequency signal.

In some embodiments, the sensing device 4700 includes the third sensor device and the fourth sensor device. The third sensor device outputs a mid-to-low frequency signal. The fourth sensor device outputs a mid-to-high frequency signal.

In some embodiments, the sensing device 4700 includes the fourth sensor device and the at least one sensor device containing only the transducer unit. The fourth sensor device outputs a mid-to-low frequency signal. The at least one sensor device containing only the transducer unit outputs a mid-to-high frequency signal.

In some embodiments, the sensing device 4700 includes the fourth sensor device and the first sensor device. The fourth sensor device outputs a mid-to-low frequency signal. The first sensor device outputs a mid-to-high frequency signal.

In some embodiments, the sensing device 4700 includes the fourth sensor device and the second sensor device. The fourth sensor device outputs a mid-to-low frequency signal. The second sensor device outputs a mid-to-high frequency signal.

In some embodiments, the sensing device 4700 includes the fourth sensor device and the third sensor device. The fourth sensor device outputs a mid-to-low frequency signal. The third sensor device outputs a mid-to-high frequency signal.

Figure 48:
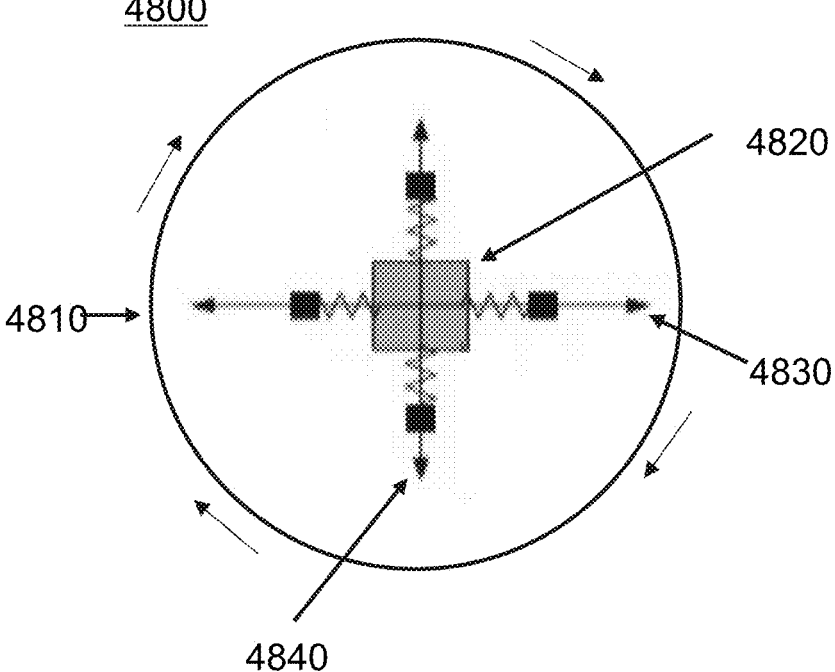
FIG. 48 is a schematic diagram illustrating an exemplary gyroscope according to some embodiments of the present disclosure.

FIG. 48 is a schematic diagram illustrating an exemplary gyroscope according to some embodiments of the present disclosure.

As shown in FIG. 48, a gyroscope 4800 includes a housing 4810 and a rotor 4820 that vibrates in the housing 4810. When the gyroscope 4800 is stationary or slightly wobbly, the rotor 4820 vibrates in a horizontal direction 4830. In some embodiments, the vibration of the rotor 4820 in the horizontal direction 4830 is driven by an electromagnetic force. As the gyroscope 4800 rotates, a Coriolis force is produced that drives the rotor 4820 to vibrate in a vertical direction 4840. The vibration of the rotor 4820 in the vertical direction 4840 then causes an inductor (not shown in FIG. 48) to produce an electrical potential difference proportional to an angular velocity of rotation, thereby converting the rotation into an electrical signal.

In the embodiment, the gyroscope 4800 also includes the first resonant system 530 or the second resonant system 740. Exemplarily, a hollow portion of the housing 4810 of the gyroscope 4800 is filled with the liquid. The liquid may or may not contain the bubbles. The frequency response output of the gyroscope may be improved through the first resonant system 530 or the second resonant system 740. By adjusting device parameters of the gyroscope 4800 and internal components (e.g., the mass and volume of the rotor 4820, the size, mass, and stiffness of the housing 4810, etc.) and/or the mechanical parameters of the first resonant system 530 or the second resonant system 740 (e.g., the parameters of the filled liquid or the combination of the liquid and the bubbles (e.g., the viscosity of the liquid, the count, volume, and location of the bubbles, etc.)), a required frequency response of the gyroscope 4800 may be obtained.

Figure 49:
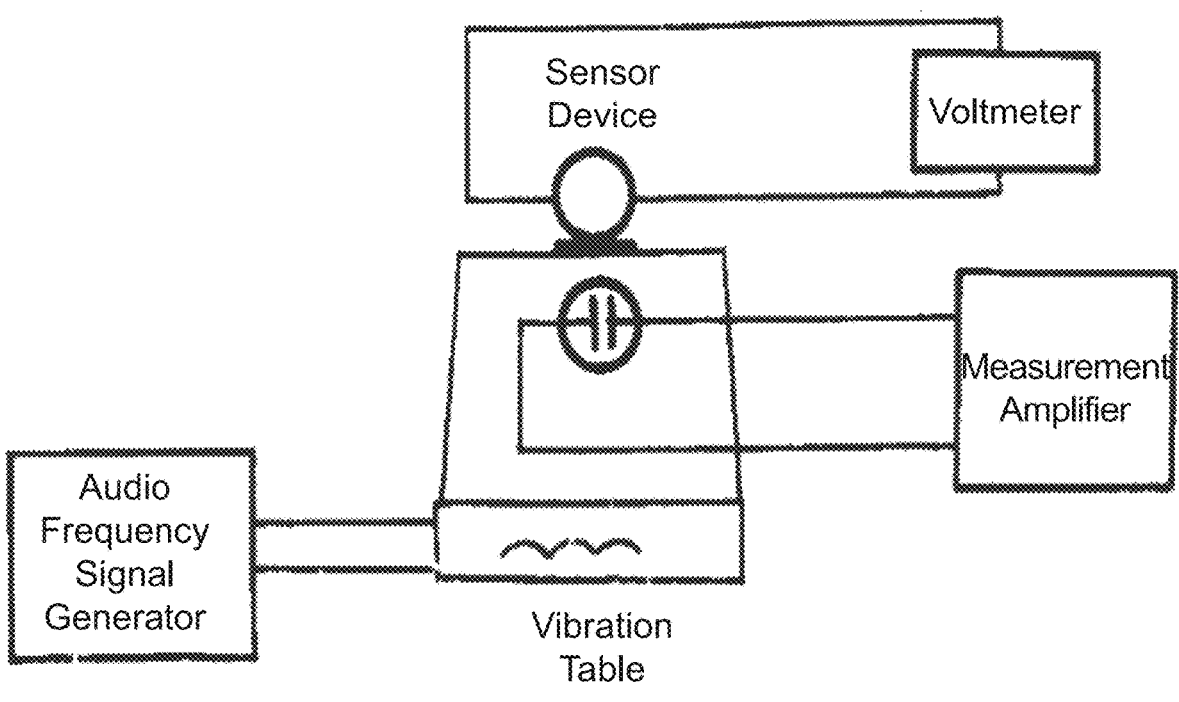
FIG. 49 is a schematic diagram illustrating an exemplary process for testing sensitivity of a sensor device according to some embodiments of the present disclosure.

FIG. 49 is a schematic diagram illustrating an exemplary process for testing the sensitivity of a sensor device according to some embodiments of the present disclosure. As shown in FIG. 49, when measuring the sensitivity of the sensor device, the sensor device may be fixed on a vibration table with a suitable fixture. An audio frequency signal generator may send a vibration signal to the vibration table. The vibration signal is amplified by a measurement amplifier to make the vibration table vibrate, wherein a corrected excitation acceleration is 3.16 m/s² or 1 g (i.e., 9.8 m/s²). The sensor device's open-circuit voltage is measured by a voltmeter. The measurement result may be calculated according to equation (7):

$$K = \frac{E}{a}, \tag{7}$$

where K denotes the sensitivity of the sensor device under test, and the corresponding dimension is V·s²/m; E denotes an open-circuit output voltage of the sensor device under test, and the corresponding is V; and a denotes the excitation acceleration of the sensor device under test, and the corresponding is m/s². In some embodiments, the sensitivity may be calculated according to Equation (8):

$$K = 20 \times \log_{10}\left(\frac{E}{a}\right), \tag{8}$$

where the dimension of sensitivity K is dBV.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristics described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, unless specifically described in the claims, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the required properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Therefore, by way of example, but not of limitation, alternative configurations of the embodiments of the application may be utilized in accordance with the teachings herein. Accordingly, embodiments of the present application are not limited to that precisely as shown and described.

What is claimed is:

1. A sensor device, comprising:

a housing, the housing having an accommodating cavity;

a transducer unit, including a vibration pickup structure configured to pick up a vibration of the housing and produce an electrical signal, the transducer unit in the accommodating cavity separating the accommodating cavity to form a front cavity and a rear cavity located on opposite sides of the vibration pickup structure, wherein at least one cavity of the front cavity and the rear cavity is filled with liquid, the liquid is in contact with the vibration pickup structure, and an air cavity is formed between the liquid and the housing, wherein a first flexible membrane is arranged between the liquid and the air cavity, the first flexible membrane is provided with a mass block.

2. The sensor device of claim 1, wherein the transducer unit includes a capacitive transducer, and the capacitive transducer at least includes a perforated backplate and a vibrating electrode membrane.

3. The sensor device of claim 2, wherein the liquid is capable of permeating into a space between the perforated backplate and the vibrating electrode membrane through holes on the perforated backplate.

4. The sensor device of claim 3, wherein an air domain is formed between the perforated backplate and the vibrating electrode membrane.

5. The sensor device of claim 4, wherein the air domain is confined in a slit structure between the vibrating electrode membrane and the perforated backplate.

6. The sensor device of claim 5, wherein the liquid is located between the vibrating electrode membrane and the perforated backplate to form a medium layer.

7. The sensor device of claim 6, wherein the air domain and the liquid form an additional resonant system that provides an additional resonant peak for the transducer unit.

8. The sensor device of claim 6, wherein sizes of the air domain and the liquid domain in the slit are adjustable to adjust a frequency response of a capacitive transducer of the transducer unit.

9. The sensor device of claim 2, wherein the vibrating electrode membrane and the perforated backplate are disposed parallel and close to each other.

10. A microphone, comprising the sensor device of claim 1.

11. The sensor device of claim 1, wherein the first flexible membrane adopts a film structure with at least one of high yield limit, no high temperature deterioration, low stiffness, and easy deformation.

12. The sensor device of claim 1, wherein the sensor device is filled with the liquid at a sound inlet, a bubble forms between the liquid and a vibrating membrane in the rear cavity and the sound inlet, both the liquid and the bubble are simultaneously located on one side of the vibrating membrane of the sensor device, and an empty cavity is located on another side of the vibrating membrane.

13. The sensor device of claim 1, wherein a tube column is added outside a sound inlet to obtain a larger cavity for filling the liquid, the larger cavity is jointly formed by the rear cavity, the sound inlet, and the tube column, and a diameter of the tube column is greater than or equal to a diameter of the sound inlet.

14. The sensor device of claim 13, wherein a height of the tube column is set according to a frequency response of the sensor device formed after being filled with the liquid or a kinematic viscosity of the filled liquid.

15. The sensor device of claim 1, the liquid filled in the at least one cavity of the front cavity and the rear cavity includes one or more bubbles, and the one or more bubbles are located between the housing and the liquid.

64

16. A sensor device, comprising:
a housing, the housing having an accommodating cavity;
a transducer unit, including a vibration pickup structure configured to pick up a vibration of the housing and produce an electrical signal, the transducer unit in the accommodating cavity separating the accommodating cavity to form a front cavity and a rear cavity located on opposite sides of the vibration pickup structure, wherein at least one cavity of the front cavity and the rear cavity is filled with liquid, the liquid is in contact with the vibration pickup structure, and an air cavity is formed between the liquid and the housing, wherein the housing further has a gas cavity, one cavity of the front cavity and the rear cavity is filled with the liquid, and the gas cavity is communicated with another cavity of the front cavity and the rear cavity that is not filled with the liquid.

17. The sensor device of claim 16, wherein a porous medium material or a metamaterial is provided in the gas cavity.

18. A sensor device, comprising:
a housing, the housing having an accommodating cavity;
a transducer unit, including a vibration pickup structure configured to pick up a vibration of the housing and produce an electrical signal, the transducer unit in the accommodating cavity separating the accommodating cavity to form a front cavity and a rear cavity located on opposite sides of the vibration pickup structure, wherein at least one cavity of the front cavity and the rear cavity is filled with liquid, the liquid is in contact with the vibration pickup structure, and an air cavity is formed between the liquid and the housing, wherein the transducer unit includes a substrate structure, a layered structure, and at least one damping structure layer, a damping of the at least one damping structure layer being different under different stress states.

* * * * *